US010397013B1

(12) United States Patent
Hill et al.

(10) Patent No.: US 10,397,013 B1
(45) Date of Patent: Aug. 27, 2019

(54) USER INTERFACES, SYSTEMS AND METHODS FOR CONFIGURING SMART DEVICES FOR INTEROPERABILITY WITH A SMART HUB DEVICE

(71) Applicant: GOOGLE LLC, Mountain View, CA (US)

(72) Inventors: Edward Hill, Boulder, CO (US); John Kozura, Boulder, CO (US); Haley A. Taylor, Boulder, CO (US); Jeff Mathews, Boulder, CO (US); Andrew Zimmer, Boulder, CO (US)

(73) Assignee: GOOGLE LLC, Mountain View, CA (US)

( * ) Notice: Subject to any disclaimer, the term of this patent is extended or adjusted under 35 U.S.C. 154(b) by 173 days.

(21) Appl. No.: 14/940,139

(22) Filed: Nov. 12, 2015

Related U.S. Application Data

(63) Continuation-in-part of application No. 14/927,406, filed on Oct. 29, 2015, now Pat. No. 9,485,790, which
(Continued)

(51) Int. Cl.
*H04L 12/28* (2006.01)
*H04L 29/08* (2006.01)

(52) U.S. Cl.
CPC ........ *H04L 12/2803* (2013.01); *H04L 67/306* (2013.01); *H04L 67/36* (2013.01); *H04L 2012/2841* (2013.01)

(58) Field of Classification Search
CPC ....... H04L 12/66; H04L 12/281; H04L 41/12; H04N 21/43615; H04W 4/08; G05B 15/02
See application file for complete search history.

(56) References Cited

U.S. PATENT DOCUMENTS

| 4,049,973 A | 9/1977 | Lambert |
| 4,393,342 A | 7/1983 | Matsuoka et al. |

(Continued)

OTHER PUBLICATIONS

Y. Zatout, "Using wireless technologies for healthcare monitoring at home: A survey," 2012 IEEE 14th International Conference on e-Health Networking, Applications and Services (Healthcom), Beijing, 2012, pp. 383-386. URL: http://ieeexplore.ieee.org/stamp/stamp.jsp?tp=&arnumber=6379443&isnumber=6379371.*

(Continued)

*Primary Examiner* — Wutchung Chu
(74) *Attorney, Agent, or Firm* — Morgan, Lewis & Bockius LLP

(57) ABSTRACT

This application discloses a method implemented at a client device for adding a smart device in a smart home environment. The client device executes a client-side application associated with a user account, and the client-side application is associated with an electronic device that is coupled to the client device over a first communication network. A first user interface is then displayed by the client-side application for adding a new smart device. The first user interface includes a first affordance that when selected causes the electronic device to initiate a plurality of commissioning options. The client device then displays a device-specific control user interface associated with the new smart device in response to receiving an indication that the new smart device has been added into the smart home environment via communication between the electronic device and the new smart device using one of a plurality of communication protocols.

20 Claims, 41 Drawing Sheets

Related U.S. Application Data is a continuation of application No. 13/839,828, filed on Mar. 15, 2013, now Pat. No. 9,198,204.

(60) Provisional application No. 61/622,620, filed on Apr. 11, 2012, provisional application No. 62/078,934, filed on Nov. 12, 2014, provisional application No. 62/078,932, filed on Nov. 12, 2014.

(56) References Cited

U.S. PATENT DOCUMENTS

| | | | |
|---|---|---|---|
| 5,838,226 | A | 11/1998 | Houggy |
| 6,597,396 | B1 | 7/2003 | Quendt |
| 7,260,597 | B1* | 8/2007 | Hofrichter .......... H04L 12/2803 707/999.01 |
| 7,352,930 | B2 | 4/2008 | Lowles |
| 7,570,485 | B2 | 8/2009 | Krah |
| 7,830,258 | B2 | 11/2010 | McAllister |
| 7,953,327 | B2 | 5/2011 | Pereira et al. |
| 7,961,674 | B2* | 6/2011 | Jing .................... H04L 12/2809 370/328 |
| 7,965,983 | B1* | 6/2011 | Swan ................. H04L 63/0485 455/41.1 |
| 8,049,434 | B2 | 11/2011 | Crouse et al. |
| 8,096,695 | B2 | 1/2012 | Ong |
| 8,156,500 | B2 | 4/2012 | Helander |
| 8,161,420 | B2* | 4/2012 | Ding ................... H04L 12/2834 713/168 |
| 8,204,979 | B2 | 6/2012 | Vutharkar et al. |
| 8,228,198 | B2 | 7/2012 | McAllister |
| 8,239,928 | B2* | 8/2012 | Huang .................. H04L 63/067 380/255 |
| 8,265,674 | B2 | 9/2012 | Choong et al. |
| 8,279,158 | B2 | 10/2012 | Lowles et al. |
| 8,295,990 | B2* | 10/2012 | Venkatakrishnan ... G06Q 50/06 700/296 |
| 8,370,370 | B2 | 2/2013 | Huang et al. |
| 8,406,819 | B2 | 3/2013 | Steer et al. |
| 8,407,347 | B2 | 3/2013 | Zhang et al. |
| 8,409,001 | B2 | 4/2013 | Chang |
| 8,471,500 | B2 | 6/2013 | Fletcher et al. |
| 8,478,450 | B2* | 7/2013 | Lu ....................... H04L 12/2807 361/104 |
| 8,508,465 | B2 | 8/2013 | Broga et al. |
| 8,519,844 | B2 | 8/2013 | Richey et al. |
| 8,543,688 | B1 | 9/2013 | Ramamurthy |
| 8,576,276 | B2 | 11/2013 | Bar-zeev et al. |
| 8,577,378 | B2* | 11/2013 | Nagaraja ............ H04W 36/0061 370/331 |
| 8,606,645 | B1 | 12/2013 | Applefeld |
| 8,613,070 | B1 | 12/2013 | Borzycki et al. |
| 8,653,760 | B1 | 2/2014 | Pearce et al. |
| 8,688,392 | B2 | 4/2014 | Tam et al. |
| 8,823,795 | B1 | 9/2014 | Scalisi et al. |
| 8,843,995 | B2* | 9/2014 | Buckley ................. H04L 63/08 726/2 |
| 8,942,694 | B2* | 1/2015 | Woo ....................... G08C 17/02 455/420 |
| 9,009,805 | B1* | 4/2015 | Kirkby ............... G06K 9/00711 726/7 |
| 9,207,659 | B1 | 12/2015 | Sami |
| 9,325,516 | B2* | 4/2016 | Pera .................... H04L 12/2803 |
| 9,326,126 | B2* | 4/2016 | Yang ....................... H04W 4/70 |
| 9,401,901 | B2* | 7/2016 | Huang ................... H04L 63/06 |
| 9,412,266 | B2* | 8/2016 | Chen ...................... G08C 19/16 |
| 9,419,871 | B2 | 8/2016 | Foley et al. |
| 9,462,624 | B2* | 10/2016 | Logue ................. H04W 52/0212 |
| 9,479,504 | B2* | 10/2016 | Bae ..................... H04L 63/104 |
| 9,488,994 | B2* | 11/2016 | Zywicki ............... G05D 23/1905 |
| 9,528,861 | B1 | 12/2016 | Haupt ...................... G01D 7/00 |
| 9,547,980 | B2* | 1/2017 | Chen ...................... G08C 17/02 |
| 9,554,061 | B1* | 1/2017 | Proctor, Jr. ............ H04N 5/268 |
| 9,800,429 | B2* | 10/2017 | Crayford ............ H04L 12/2803 |
| 9,948,685 | B2* | 4/2018 | Na ....................... H04L 12/2818 |
| 2002/0016639 | A1 | 2/2002 | Smith et al. |
| 2002/0178385 | A1 | 11/2002 | Dent et al. |
| 2003/0061284 | A1 | 3/2003 | Mandarino et al. |
| 2003/0067394 | A1 | 4/2003 | Tsui |
| 2003/0169728 | A1 | 9/2003 | Choi |
| 2004/0083393 | A1 | 4/2004 | Jordan et al. |
| 2004/0243257 | A1 | 12/2004 | Theimer |
| 2005/0041686 | A1 | 2/2005 | Roy et al. |
| 2005/0281277 | A1 | 12/2005 | Killian |
| 2006/0109988 | A1 | 5/2006 | Metcalf |
| 2006/0174102 | A1 | 8/2006 | Smith et al. |
| 2006/0259183 | A1 | 11/2006 | Hayes et al. |
| 2007/0014303 | A1 | 1/2007 | Schulz et al. |
| 2007/0105542 | A1* | 5/2007 | Friedman ................. H04W 4/00 455/420 |
| 2007/0250592 | A1* | 10/2007 | Reckamp ............... H04L 12/66 709/217 |
| 2007/0294335 | A1 | 12/2007 | Gershom |
| 2008/0037444 | A1 | 2/2008 | Chhabra |
| 2008/0066093 | A1* | 3/2008 | Igoe ..................... H04L 12/2809 725/25 |
| 2008/0089300 | A1 | 4/2008 | Yee |
| 2008/0122606 | A1 | 5/2008 | Bradley |
| 2008/0168523 | A1* | 7/2008 | Ansari ..................... G06Q 30/04 725/131 |
| 2008/0219672 | A1 | 9/2008 | Tam et al. |
| 2008/0277486 | A1 | 11/2008 | Seem et al. |
| 2008/0278100 | A1 | 11/2008 | Hwang |
| 2009/0033485 | A1* | 2/2009 | Naeve ..................... H04W 8/005 340/539.23 |
| 2009/0070681 | A1* | 3/2009 | Dawes ..................... G08B 25/08 715/736 |
| 2009/0080896 | A1 | 3/2009 | Pereira et al. |
| 2009/0244097 | A1 | 10/2009 | Estevez |
| 2010/0068997 | A1 | 3/2010 | Dunko |
| 2010/0083356 | A1* | 4/2010 | Steckley ............... H04L 12/2818 726/5 |
| 2010/0130166 | A1 | 5/2010 | Tsuria et al. |
| 2010/0138007 | A1* | 6/2010 | Clark .................. H04L 12/2809 700/90 |
| 2010/0141153 | A1 | 6/2010 | Recker et al. |
| 2010/0192212 | A1 | 7/2010 | Raleigh |
| 2010/0246825 | A1 | 9/2010 | Baras et al. |
| 2010/0248707 | A1 | 9/2010 | Hoffner et al. |
| 2010/0283579 | A1* | 11/2010 | Kraus ................. G07C 9/00944 340/5.7 |
| 2010/0283584 | A1 | 11/2010 | McAllister |
| 2011/0046798 | A1 | 2/2011 | Imes et al. |
| 2011/0107364 | A1 | 5/2011 | Lajoie et al. |
| 2011/0121654 | A1 | 5/2011 | Recker et al. |
| 2011/0172847 | A1 | 7/2011 | Choong et al. |
| 2011/0199004 | A1 | 8/2011 | Henig et al. |
| 2011/0202151 | A1 | 8/2011 | Covaro et al. |
| 2011/0225373 | A1 | 9/2011 | Ito et al. |
| 2012/0011567 | A1 | 1/2012 | Cronk et al. |
| 2012/0045060 | A1* | 2/2012 | Maestrini ................. H04L 63/08 380/274 |
| 2012/0049765 | A1 | 3/2012 | Lu et al. |
| 2012/0082062 | A1 | 4/2012 | McCormack |
| 2012/0144469 | A1 | 6/2012 | Ainslie et al. |
| 2012/0167063 | A1 | 6/2012 | Detwiler et al. |
| 2012/0216296 | A1 | 8/2012 | Kidron |
| 2012/0239936 | A1 | 9/2012 | Holtmanns et al. |
| 2013/0026947 | A1 | 1/2013 | Economy et al. |
| 2013/0064132 | A1 | 3/2013 | Low et al. |
| 2013/0073705 | A1* | 3/2013 | Hester ................. H04L 12/2809 709/223 |
| 2013/0076491 | A1 | 3/2013 | Brandsma et al. |
| 2013/0041516 | A1 | 4/2013 | Rockenfeller et al. |
| 2013/0086665 | A1 | 4/2013 | Filippi et al. |
| 2013/0124855 | A1 | 5/2013 | Varadarajan et al. |
| 2013/0191755 | A1* | 7/2013 | Balog ................... H04L 41/0806 715/735 |
| 2013/0198786 | A1* | 8/2013 | Cook ................... H05B 37/0272 725/81 |
| 2013/0227656 | A1 | 8/2013 | Holtmanns et al. |
| 2013/0236183 | A1 | 9/2013 | Chao et al. |
| 2013/0268357 | A1 | 10/2013 | Heath |

(56) References Cited

U.S. PATENT DOCUMENTS

| | | |
|---|---|---|
| 2013/0276140 A1 | 10/2013 | Coffing et al. |
| 2013/0340050 A1 | 12/2013 | Harrison |
| 2014/0007222 A1 | 1/2014 | Qureshi et al. |
| 2014/0068705 A1 | 3/2014 | Chambers et al. |
| 2014/0068789 A1 | 3/2014 | Watts et al. |
| 2014/0099933 A1 | 4/2014 | Yerrabommanahalli et al. |
| 2014/0129006 A1* | 5/2014 | Chen ................ G05B 15/02 700/90 |
| 2014/0137188 A1 | 5/2014 | Bartholomay et al. |
| 2014/0157370 A1 | 6/2014 | Plattner et al. |
| 2014/0164758 A1 | 6/2014 | Ramamurthy |
| 2014/0164776 A1 | 6/2014 | Hook et al. |
| 2014/0173692 A1 | 6/2014 | Srinivasan et al. |
| 2014/0189359 A1 | 7/2014 | Marien et al. |
| 2014/0189808 A1 | 7/2014 | Mahaffey et al. |
| 2014/0245411 A1 | 8/2014 | Meng et al. |
| 2014/0245461 A1 | 8/2014 | O'Neill et al. |
| 2014/0248852 A1* | 9/2014 | Raleigh ............... H04M 15/723 455/407 |
| 2014/0266600 A1 | 9/2014 | Alberth, Jr. et al. |
| 2014/0273963 A1 | 9/2014 | Su et al. |
| 2014/0281497 A1 | 9/2014 | Medvinsky et al. |
| 2014/0282570 A1 | 9/2014 | Prasanna |
| 2014/0282877 A1 | 9/2014 | Mahaffey et al. |
| 2014/0310509 A1 | 10/2014 | Potlapally et al. |
| 2014/0310510 A1 | 10/2014 | Potlapally et al. |
| 2015/0015369 A1 | 1/2015 | Lamb |
| 2015/0043377 A1* | 2/2015 | Cholas ................ H04W 48/08 370/254 |
| 2015/0071052 A1 | 3/2015 | Hershberg et al. |
| 2015/0126153 A1 | 5/2015 | Spitz et al. |
| 2015/0160634 A1 | 6/2015 | Smith et al. |
| 2015/0177292 A1 | 6/2015 | Silveira Filho et al. |
| 2015/0195100 A1* | 7/2015 | Imes ................ H04L 12/282 455/420 |
| 2015/0215297 A1 | 7/2015 | Rathod et al. |
| 2015/0249855 A1* | 9/2015 | Dewa ............... H04N 21/41407 725/116 |
| 2015/0282216 A1* | 10/2015 | Reshef ................ H04W 8/005 455/39 |
| 2016/0044032 A1* | 2/2016 | Kim ................ H04L 63/0876 726/5 |
| 2016/0089457 A1 | 3/2016 | Liao |
| 2016/0132031 A1 | 5/2016 | Kozura et al. |
| 2016/0142263 A1* | 5/2016 | Erdmann ............... H04W 8/005 455/41.2 |
| 2016/0191264 A1* | 6/2016 | Kim .................... H04L 12/6418 340/539.25 |
| 2016/0370208 A1 | 12/2016 | Patel et al. |
| 2016/0380945 A1 | 12/2016 | Wood et al. |
| 2016/0381500 A1 | 12/2016 | Larson |
| 2017/0285893 A1 | 10/2017 | Shim et al. |

OTHER PUBLICATIONS

"INSTEON Compared" www.insteon.com/pdf/insteoncompared.pdf version.2 2013.*

"Thread Group Information Event" https://www.threadgroup.org/Portals/0/documents/events/Threadintro.pdf; Sep. 30, 2014.*

Goadrich, Mark H., and Michael P. Rogers. "Smart smartphone development: iOS versus Android.", In Proceedings of the 42nd ACM technical symposium on Computer science education, pp. 607-612. ACM, 2011.

Manashty, Ali Reza, Amir Rajabzadeh, and Zahra Forootan Jahromi. "A Scenario-Based Mobile Application for Robot-Assisted Smart Digital Homes." arXiv preprint arXiv:1009.5398 (2010).

Armac, Ibrahim, and Daniel Retkowitz. "Simulation of smart environments." In IEEE International Conference on Pervasive Services, pp. 257-266. IEEE, 2007.

Ramlee, Ridza Azri, Man Hong Leong, Ranjit Singh A. Sarban Singh, Mohd Muzafar Ismail, Mohd Azlishah Othman, Hamzah Asyrani Sulaiman, Mohamad Harris Misran, Meor Said, and Maizatul Alice. "Bluetooth remote home automation system using android application." (2013): 1-5.

Van Nguyen, Tam, Jin Gook Kim, and Deokjai Choi. "ISS: the interactive smart home simulator." In Advanced Communication Technology, 2009. ICACT 2009. 11th International Conference on, vol. 3, pp. 1828-1833. IEEE, 2009.

Rajabzadeh, Amir, Ali Reza Manashty, and Zahra Forootan Jahromi. "A Mobile Application for Smart House Remote Control System." arXiv preprint arXiv:1009.5557 (2010).

Gavalas, Damianos, and Daphne Economou. "Development platforms for mobile applications: Status and trends." IEEE software 28, No. 1 (2011): 77-86.

Detailed Technical Specification of Security for Heterogeneous Access, May 31, 2002, 161 pgs, www.isrc.rhul.ac.uk/shaman/docs/d09v1.pdf.

Google Inc., International Search Report and Written Opinion, PCT/US2015/053291, dated Feb. 5, 2016, 18 pgs.

Google Inc., International Search Report and Written Opinion, PCT/US2015/060405, dated Feb. 25, 2016, 9 pgs.

* cited by examiner

USER INTERFACES, SYSTEMS AND METHODS FOR CONFIGURING SMART DEVICES FOR INTEROPERABILITY WITH A SMART HUB DEVICE

CROSS REFERENCE TO RELATED APPLICATIONS

This application claims priority to U.S. Provisional Patent Application No. 62/078,934, titled "Systems and Methods for Commissioning a Smart Hub Device," filed on Nov. 12, 2014, and U.S. Provisional Patent Application No. 62/078,932, titled "User Interfaces, Systems and Methods for Configuring Smart Devices for Interoperability with a Smart Hub Device," filed on Nov. 12, 2014, which are hereby incorporated by reference in their entirety. This application is also a continuation in part of and claims priority to U.S. Utility patent application Ser. No. 14/927,406, filed Oct. 29, 2015, titled "Apparatus and Method for Seamless Commissioning of Wireless Devices," which is a continuation of and claims priority to U.S. Utility patent application Ser. No. 13/839,828, filed Mar. 15, 2013, titled "Apparatus and Method for Seamless Commissioning of Wireless Devices," which in turn claims priority to and the benefit of U.S. Provisional Application No. 61/622,620, filed on Apr. 11, 2012, titled "Apparatus and Method for Seamless Commissioning of Wireless Devices." Content of each of the above applications is herein incorporated by reference in its entirety.

This application is related to U.S. patent application Ser. No. 14/938,806, filed Nov. 11, 2015, entitled "Data Processing Systems and Methods for Smart Hub Devices," U.S. patent application Ser. No. 14/939,629, filed Nov. 12, 2015, entitled "Data Communication Systems and Methods for Smart Hub," U.S. patent application Ser. No. 14/940,135, filed Nov. 12, 2015, entitled "Systems and Methods for Commissioning a Smart Hub Device," and U.S. patent application Ser. No. 14/940,132, filed Nov. 12, 2015, entitled "User Interfaces, Systems and Methods for Configuring Smart Devices for Interoperability with a Smart Hub Device," which are hereby incorporated by reference in their entirety.

This application is also related to U.S. patent application Ser. No. 14/265,121, filed Apr. 29, 2014, titled "Apparatus and Method for the Virtual Demonstration of a Smart Phone Controlled Smart Home Using a Website," which claims priority to and the benefit of U.S. Provisional Application No. 61/817,778, filed on Apr. 30, 2013, titled "Apparatus and Method for Seamless Commissioning of Wireless Devices." Content of each of these applications is herein incorporated by reference in its entirety.

This application is also related to U.S. patent application Ser. No. 14/474,926, filed Sep. 2, 2014, titled "Apparatus And Method For Efficient Two-Way Optical Communication Where Transmitter May Interfere With Receiver," which claims priority to and the benefit of U.S. Provisional Application Nos. 61/872,330 and 61/918,716, filed on Aug. 30, 2013 and Dec. 20, 2013, respectively, both titled "Apparatus And Method For Efficient Two-Way Optical Communication Where Transmitter May Interfere With Receiver." Content of each of these applications is herein incorporated by reference in its entirety.

This application is also related to U.S. patent application Ser. No. 14/581,994, filed Dec. 23, 2014, titled "Systems and Methods for Programming and Controlling Devices with Sensor Data and Learning," which claims priority to and the benefit of U.S. Provisional Application No. 61/919,893, filed on Dec. 23, 2013, titled "System and Method for Programming and Controlling Devices with Sensor Data, Learning, and Repetition." Content of each of these applications is herein incorporated by reference in its entirety.

TECHNICAL FIELD

This relates generally to computer technology, including but not limited to methods and systems for commissioning a smart hub device by associating a user account with the smart hub device and establishing a secure network connection for the electronic device.

BACKGROUND

Smart home automation devices are being developed and fielded at such a rapid pace that new devices appear on the market practically every day. Because of the proliferation of low-power wireless network and smart phone technologies, it is not uncommon to find home and business owners in possession of smart home devices such as wireless lights, music systems, door locks, thermostats and alarm systems. And wireless white goods are just over the horizon. Based on current trends, it is expected that the average consumer will own as many as five to ten smart home devices in just a few years.

One issue with this proliferation of devices is that many such smart home devices use different communication protocols (e.g., Z-Wave, ZigBee or Insteon) so devices that use different protocols cannot interoperate seamlessly out of the box. In addition, many such devices are configured with different set-up procedures (sometimes called commissioning or provisioning procedures) depending on one or more of: the type of the device, capabilities of the device (e.g., degree of smartness of the device) and/or the particular communication protocol employed by that device. As a result, owners of these devices often face a confusing experience every time they attempt to configure and/or commission a new device. Furthermore, different devices of the same type (e.g., thermostats) can have different capabilities, so users might not have access to expected or desirable product features for a particular type of device depending on the specific device they purchased.

Therefore, it would be desirable to develop user-friendly solutions to address the above-recited issues associated with smart home devices.

SUMMARY

In accordance with one aspect of the application, a method is implemented at an electronic device to commission the electronic device in a smart home environment. The electronic device has one or more processors, and memory storing one or more programs for execution by the one or more processors. Device identification information associated with the electronic device is stored in the memory of the electronic device. The device commissioning method includes receiving from a client device one-way signals that are encoded with communication data. The client device is located in proximity to the electronic device. The client device is executing a client-side application associated with a user account that generates the one-way signals. The encoded communication data includes at least one or more network credentials of a local area network and an authentication token, and the authentication token provides sufficient information to identify the user account of the client-side application. The device commissioning method further includes generating a link approval request including at least the authentication token and the device identification information, and the device identification information is obtained from the memory of the electronic device. The device commissioning method further includes accessing the local area network using the one or more network credentials provided by the client device, and sending the link approval request to a server via the local area network. The server is configured to confirm availability of the electronic device for commissioning and to link the electronic device with the user account according to the authentication token and the device identification information.

In accordance with one aspect of the application, a method is implemented at a client device for adding a smart device in a smart home environment. The smart home environment includes one or more smart devices. The client device has one or more processors and memory storing one or more programs for execution by the one or more processors. The smart device adding method includes executing a client-side application associated with a user account, and the client-side application is associated with an electronic device that is coupled to the client device over a first communication network. The smart device adding method further includes displaying by the client-side application a first user interface for adding a new smart device. The first user interface includes a first affordance that when selected causes the electronic device to initiate a plurality of commissioning options. The plurality of commissioning options are defined according to at least one of a device type of a new smart device, a communication protocol associated with a new smart device, and a level of user interaction involved in a process of adding a smart device. The smart device adding method includes displaying a device-specific control user interface associated with the new smart device in response to receiving an indication from the electronic device that the new smart device has been added into the smart home environment via communication between the electronic device and the new smart device using one of a plurality of communication protocols.

In accordance with another aspect of the application, a method is implemented at an electronic device for adding a smart device in a smart home environment. The electronic device has one or more processors and memory storing one or more programs for execution by the one or more processors, and is configured to communicate with a client device and a plurality of smart devices through a plurality of communication networks. The smart device adding method includes receiving from the client device a request to add a new smart device to the smart home environment over a first communication network of the plurality of communication networks. The request is issued by a client-side application executed by the client device, and the client-side application is associated with a user account. The smart device adding method further includes in response to the request, determining that a new smart device is available to add to the smart home environment using a second communication protocol associated with a second communication network of the plurality of communication networks. The smart device adding method further includes connecting to the new smart device via the second communication network, obtaining device information of the new smart device via the second communication network, and causing a notification to be provided to a user concerning association of the new smart device with the user account and addition of the new smart device to the smart home environment.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Figure 1:
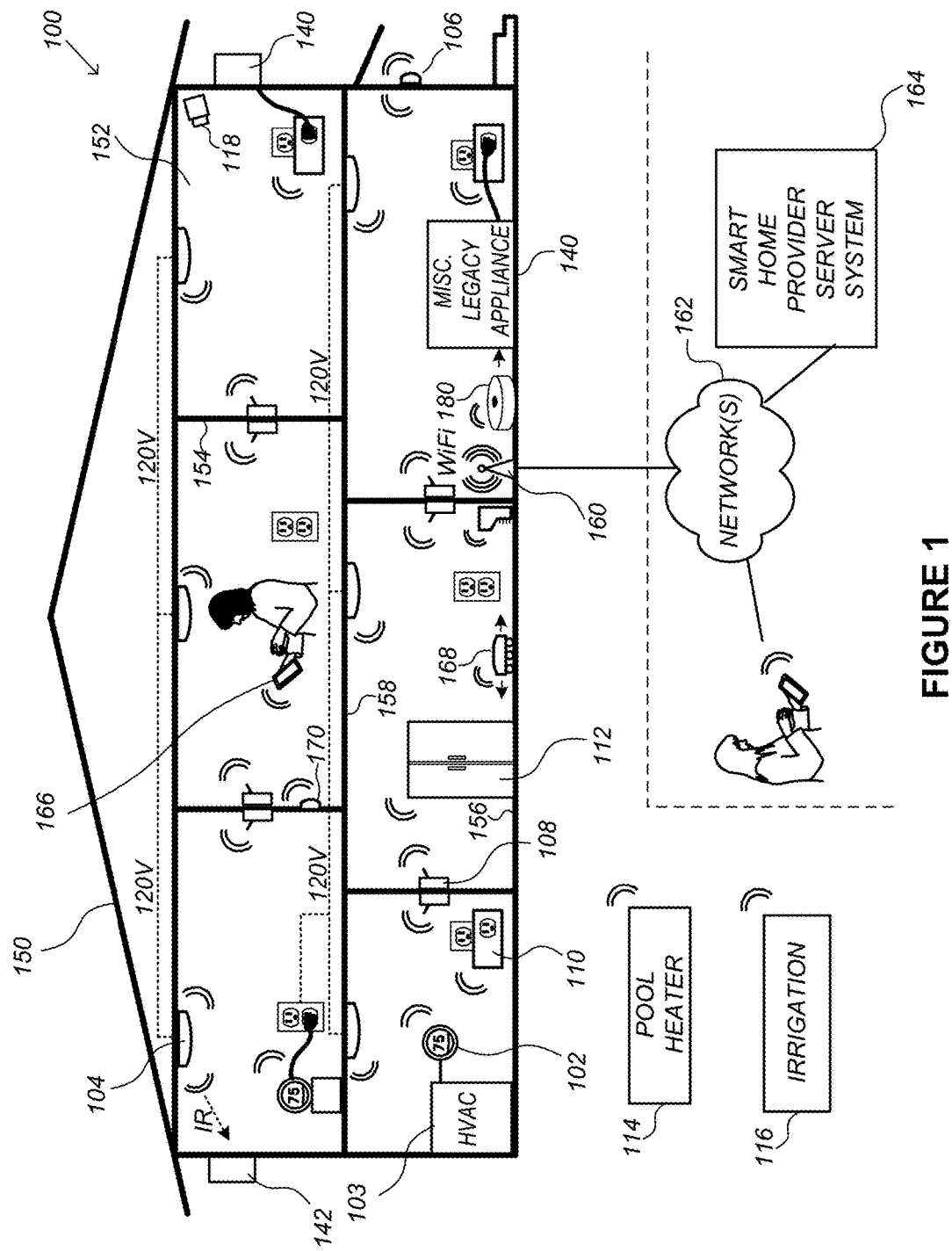
FIG. 1 is an example smart home environment in accordance with some embodiments.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first type of request could be termed a second type of request, and, similarly, a second type of request could be termed a first type of request, without departing from the scope of the various described embodiments. The first type of request and the second type of request are both types of requests, but they are not the same type of request.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the embodiments, such identity should not be construed in the descriptions that follow as necessarily limiting the scope of the present teachings to those particular individuals having those particular identities.

FIG. 1 is an example smart home environment 100 in accordance with some embodiments. Smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some embodiments, the integrated devices of the smart home environment 100 include intelligent, multi-sensing, network-connected devices that integrate seamlessly with each other in a smart home network (e.g., 202 FIG. 2) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), and one or more intelligent, multi-sensing, network-connected entryway interface devices 106 (hereinafter referred to as "smart doorbells 106").

In some embodiments, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 may detect a person's approach to or departure from a location (e.g., an outer door), control doorbell functionality, announce a person's approach or departure via audio or visual means, and/or control settings on a security system (e.g., to activate or deactivate the security system when occupants go and come).

In some embodiments, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some embodiments, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some embodiments, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some embodiments, the smart home environment 100 includes one or more network-connected cameras 118 that are configured to provide video monitoring and security in the smart home environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gate). The smart home environment 100 may additionally or alternatively include one or more other occupancy sensors (e.g., the smart doorbell 106, smart doorlocks, touch screens, IR sensors, microphones, ambient light sensors, motion detectors, smart nightlights 170, etc.). In some embodiments, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device (e.g., a mobile phone, such as a smart phone) 166. A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some embodiments, in addition to containing processing and sensing capabilities, devices 102, 104, 106, 108, 110, 112, 114, 116 and/or 118 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some embodiments, the smart devices serve as wireless or wired repeaters. In some embodiments, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 164 (also called a central server system and/or a cloud-computing system herein). The smart home provider server system 164 may be associated with a manufacturer, support entity, or service provider associated with the smart device(s). In some embodiments, a user is able to contact customer support using a smart device itself rather than needing to use other communication means, such as a telephone or Internet-connected computer. In some embodiments, software updates are automatically sent from the smart home provider server system 164 to smart devices (e.g., when available, when purchased, or at routine intervals).

In some embodiments, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected thermostats 102, hazard detectors 104, doorbell 106, wall switches 108, wall plugs 110, appliances 112, cameras 118 and the like. Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some embodiments, a user of such controller application can view status of the hub device or coupled smart devices, configure the hub to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub.

Generally, in some embodiments, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected thermostats 102, hazard detectors 104, doorbell 106, wall switches 108, wall plugs 110, appliances 112, cameras 118 and the like. Each of these smart devices optionally communicates with the hub device 180 using a radio communication network available at least in the smart home environment 100.

Figure 2:
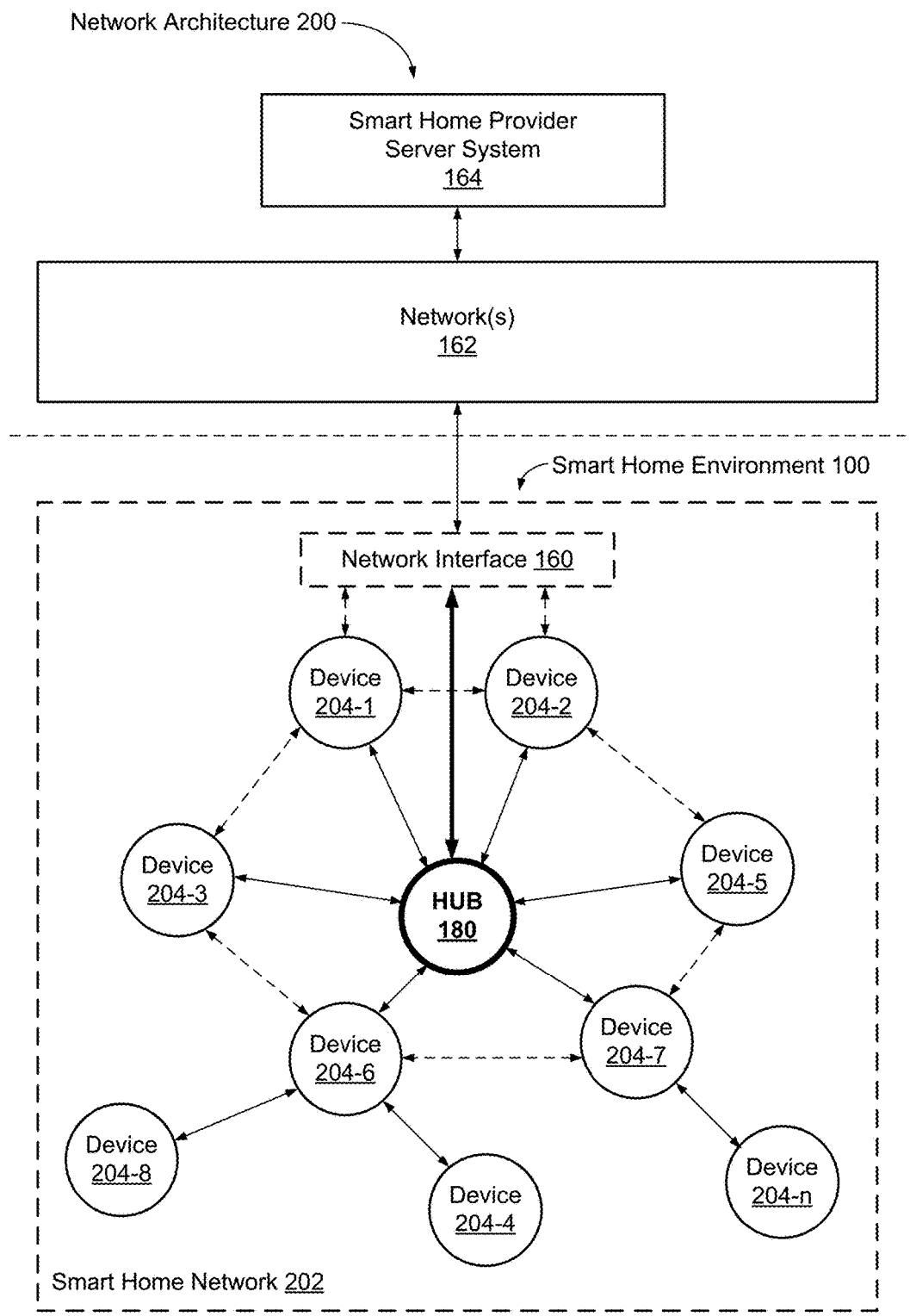
FIG. 2 is a block diagram illustrating an example network architecture that includes a smart home network in accordance with some embodiments.

FIG. 2 is a block diagram illustrating an example network architecture 200 that includes a smart home network 202 in accordance with some embodiments. In some embodiments, the smart devices 204 in the smart home environment 100 (e.g., devices 102, 104, 106, 108, 110, 112, 114, 116 and/or 118) combine with hub device 180 to create a mesh network in smart home network 202. In some embodiments, one or more smart devices 204 in the smart home network 202 operate as a smart home controller. Additionally and/or alternatively, hub device 180 operates as the smart home controller. In some embodiments, a smart home controller has more computing power than other smart devices. In some embodiments, a smart home controller processes inputs (e.g., from smart devices 204, electronic device 166, and/or smart home provider server system 164) and sends commands (e.g., to smart devices 204 in the smart home network 202) to control operation of the smart home environment 100. In some embodiments, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the smart home provider server system 164. In some embodiments, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, 6LoWPAN, etc.

In some embodiments, some low-power nodes are incapable of bidirectional communication. These low-power nodes send messages, but they are unable to "listen". Thus, other devices in the smart home environment 100, such as the spokesman nodes, cannot send information to these low-power nodes.

In some embodiments, some low-power nodes are capable of only a limited bidirectional communication. For example, other devices are able to communicate with the low-power nodes only during a certain time period.

As described, in some embodiments, the smart devices serve as low-power and spokesman nodes to create a mesh network in the smart home environment 100. In some embodiments, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some embodiments, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the smart home provider server system 164 (using, e.g., the relatively high-power communication protocol). Thus, the low-powered nodes using low-power communication protocols are able to send and/or receive messages across the entire smart home network 202, as well as over the Internet 162 to the smart home provider server system 164. In some embodiments, the mesh network enables the smart home provider server system 164 to regularly receive data from most or all of the smart devices in the home, make inferences based on the data, facilitate state synchronization across devices within and outside of the smart home network 202, and send commands back to one or more of the smart devices to perform tasks in the smart home environment.

As described, the spokesman nodes and some of the low-powered nodes are capable of "listening." Accordingly, users, other devices, and/or the smart home provider server system 164 may communicate control commands to the low-powered nodes. For example, a user may use the electronic device 166 (e.g., a smart phone) to send commands over the Internet to the smart home provider server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the smart home provider server system 164.

In some embodiments, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some embodiments, the smart nightlight 170 is configured to activate the light source when its ambient light sensor detects that the room is dark and when its occupancy sensor detects that someone is in the room. In other embodiments, the smart nightlight 170 is simply configured to activate the light source when its ambient light sensor detects that the room is dark. Further, in some embodiments, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the smart home provider server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 may send messages that correspond to each of the respective sensors to the other devices and/or the smart home provider server system 164, such as by using the mesh network as described above.

Examples of spokesman nodes include smart doorbells 106, smart thermostats 102, smart wall switches 108, and smart wall plugs 110. These devices 102, 106, 108, and 110 are often located near and connected to a reliable power source, and therefore may include more power-consuming components, such as one or more communication chips capable of bidirectional communication in a variety of protocols.

In some embodiments, the smart home environment 100 includes service robots 168 (FIG. 1) that are configured to carry out, in an autonomous manner, any of a variety of household tasks.

As explained above with reference to FIG. 1, in some embodiments, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. The hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. It is also noted that in some embodiments, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 3:
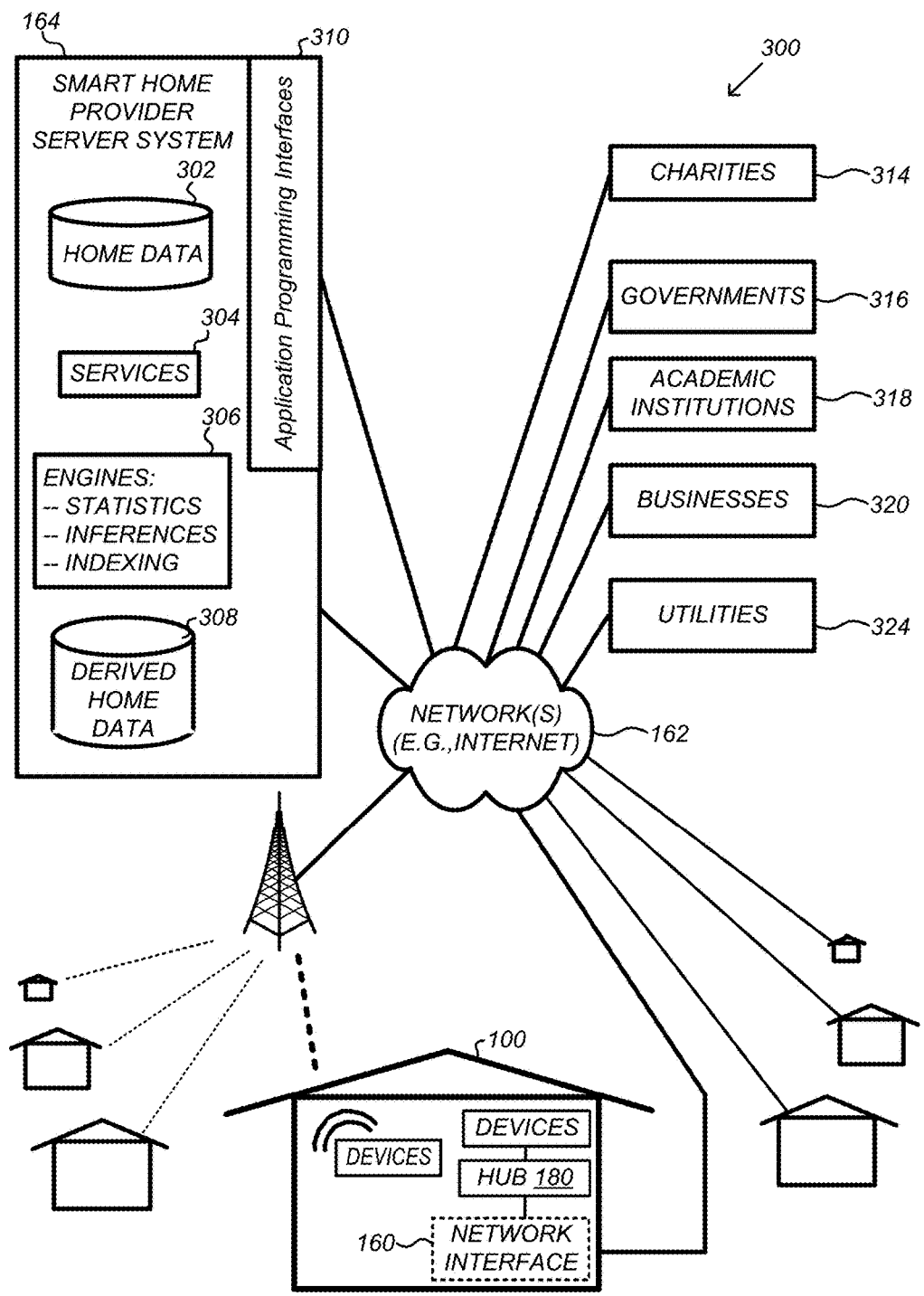
FIG. 3 illustrates a network-level view of an extensible devices and services platform with which the smart home environment of FIG. 1 is integrated, in accordance with some embodiments.

FIG. 3 illustrates a network-level view of an extensible devices and services platform with which the smart home environment of FIG. 1 is integrated, in accordance with some embodiments. The extensible devices and services platform 300 includes smart home provider server system 164. Each of the intelligent, network-connected devices described with reference to FIG. 1 (e.g., 102, 104, 106, 108, 110, 112, 114, 116 and 118, identified simply as "devices" in FIGS. 2-4) may communicate with the smart home provider server system 164. For example, a connection to the Internet 162 may be established either directly (for example, using 3G/4G connectivity to a wireless carrier), or through a network interface 160 (e.g., a router, switch, gateway, hub, or an intelligent, dedicated whole-home controller node), or through any combination thereof.

In some embodiments, the devices and services platform 300 communicates with and collects data from the smart devices of the smart home environment 100. In addition, in some embodiments, the devices and services platform 300 communicates with and collects data from a plurality of smart home environments across the world. For example, the smart home provider server system 164 collects home data 302 from the devices of one or more smart home environments 100, where the devices may routinely transmit home data or may transmit home data in specific instances (e.g., when a device queries the home data 302). Exemplary collected home data 302 includes, without limitation, power consumption data, blackbody radiation data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, pressure data, video data, etc.

In some embodiments, the smart home provider server system 164 provides one or more services 304 to smart homes and/or third parties. Exemplary services 304 include, without limitation, software updates, customer support, sensor data collection/logging, remote access, remote or distributed control, and/or use suggestions (e.g., based on collected home data 302) to improve performance, reduce utility cost, increase safety, etc. In some embodiments, data associated with the services 304 is stored at the smart home provider server system 164, and the smart home provider server system 164 retrieves and transmits the data at appropriate times (e.g., at regular intervals, upon receiving a request from a user, etc.).

In some embodiments, the extensible devices and services platform 300 includes a processing engine 306, which may be concentrated at a single server or distributed among several different computing entities without limitation. In some embodiments, the processing engine 306 includes engines configured to receive data from the devices of smart home environments 100 (e.g., via the Internet 162 and/or a network interface 160), to index the data, to analyze the data and/or to generate statistics based on the analysis or as part of the analysis. In some embodiments, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some embodiments, use statistics, use statistics relative to use of other devices, use patterns, and/or statistics summarizing sensor readings are generated by the processing engine 306 and transmitted. The results or statistics may be provided via the Internet 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some embodiments, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some embodiments, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications, such as web applications or mobile applications that integrate with the smart home provider server system 164 to provide services and information to users. Such programs and applications may be, for example, designed to help users reduce energy consumption, to pre-emptively service faulty equipment, to prepare for high service demands, to track past service performance, etc., and/or to perform other beneficial functions or tasks.

Figure 4:
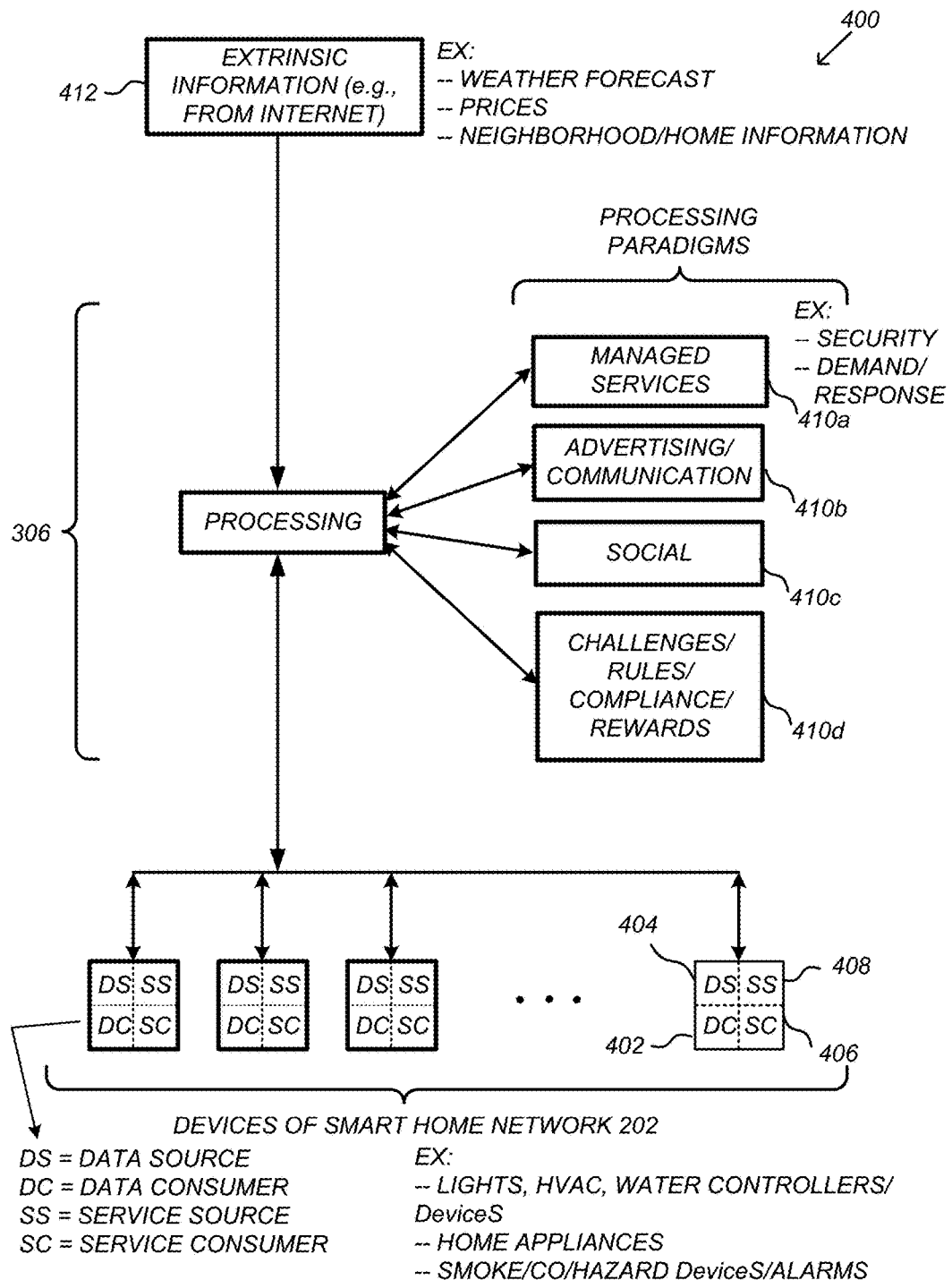
FIG. 4 illustrates an abstracted functional view of the extensible devices and services platform of FIG. 3, with reference to a processing engine as well as devices of the smart home environment, in accordance with some embodiments.

FIG. 4 illustrates an abstracted functional view 400 of the extensible devices and services platform 300 of FIG. 3, with reference to a processing engine 306 as well as devices of the smart home environment, in accordance with some embodiments. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows processing engine 306 as including a number of processing paradigms 410. In some embodiments, processing engine 306 includes a managed services paradigm 410a that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, providing a heat-source alert, and/or alerting a user of a current or predicted future event or characteristic. In some embodiments, processing engine 306 includes an advertising/communication paradigm 410b that estimates characteristics (e.g., demographic information), desires and/or products of interest of a user based on device usage. Services, promotions, products or upgrades may then be offered or automatically provided to the user. In some embodiments, processing engine 306 includes a social paradigm 410c that uses information from a social network, provides information to a social network (for example, based on device usage), and/or processes data associated with user and/or device interactions with the social network platform. For example, a user's status as reported to their trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some embodiments, processing engine 306 includes a challenges/rules/compliance/rewards paradigm 410d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing the occurrence of heat-source alerts) (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some embodiments, processing engine 306 integrates or otherwise uses extrinsic information 412 from extrinsic sources to improve the functioning of one or more processing paradigms. Extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

Figure 5A:
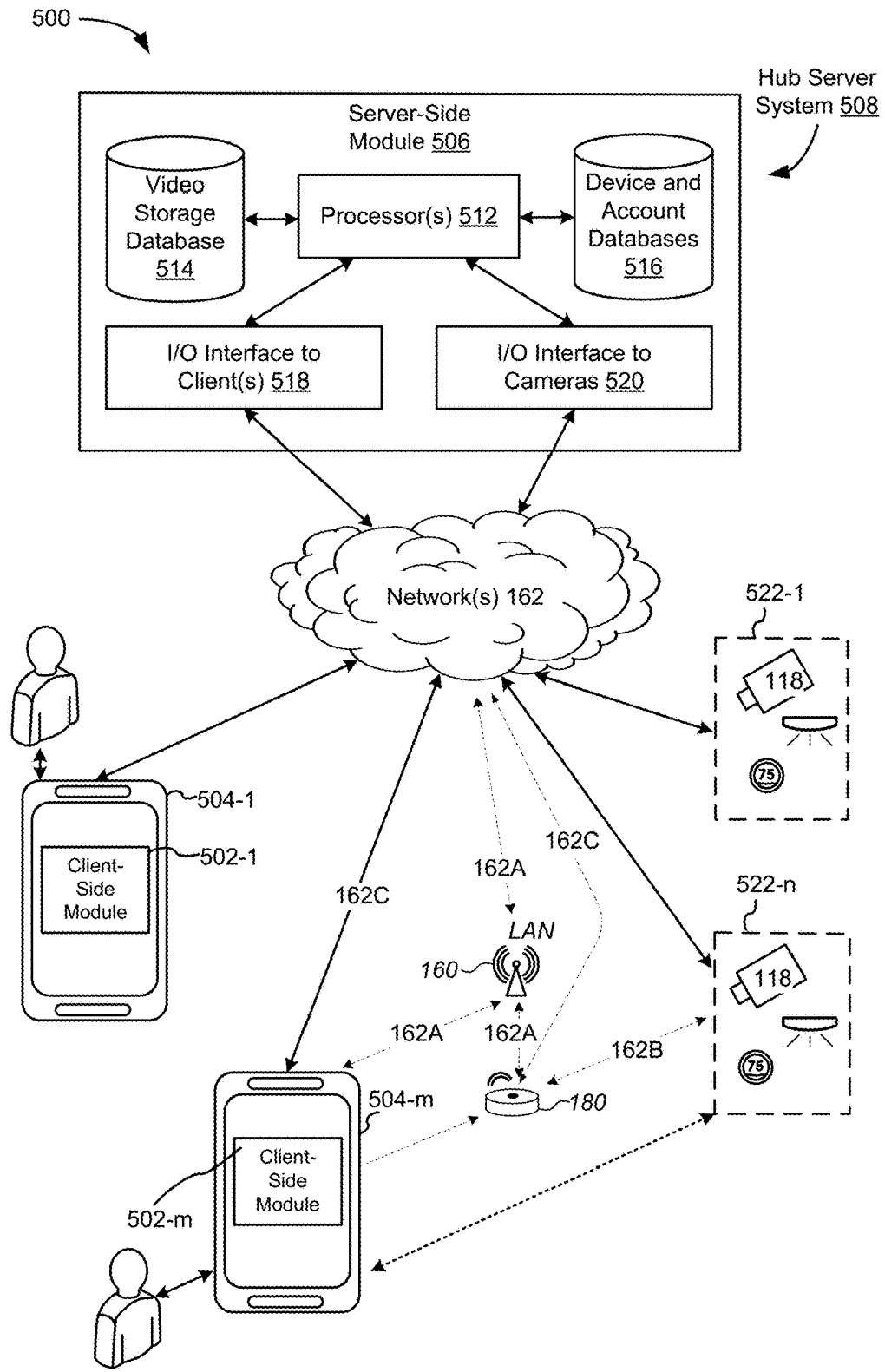
FIG. 5A is a representative operating environment in which a hub server system interacts with client devices and hubs communicatively coupled to local smart devices in accordance with some implementations.

FIG. 5A illustrates a representative operating environment 500 in which a hub server system 508 provides data processing for monitoring and facilitating review of motion events in video streams captured by video cameras 118. As shown in FIG. 5A, the hub server system 508 receives video data from video sources 522 (including cameras 118) located at various physical locations (e.g., inside homes, restaurants, stores, streets, parking lots, and/or the smart home environments 100 of FIG. 1). Each video source 522 may be bound to one or more reviewer accounts, and the hub server system 508 provides video monitoring data for the video source 522 to client devices 504 associated with the reviewer accounts. For example, the portable electronic device 166 is an example of the client device 504.

In some implementations, the smart home provider server system 164 or a component thereof serves as the hub server system 508. In some implementations, the hub server system 508 is a dedicated video processing server that provides video processing services to video sources and client devices 504 independent of other services provided by the hub server system 508.

In some implementations, each of the video sources 522 includes one or more video cameras 118 that capture video and send the captured video to the hub server system 508 substantially in real time. In some implementations, each of the video sources 522 optionally includes a controller device (not shown) that serves as an intermediary between the one or more cameras 118 and the hub server system 508. The controller device receives the video data from the one or more cameras 118, optionally, performs some preliminary processing on the video data, and sends the video data to the hub server system 508 on behalf of the one or more cameras 118 substantially in real time. In some implementations, each camera has its own on-board processing capabilities to perform some preliminary processing on the captured video data before sending the processed video data (along with metadata obtained through the preliminary processing) to the controller device and/or the hub server system 508.

As shown in FIG. 5A, in accordance with some implementations, each of the client devices 504 includes a client-side module 502. The client-side module 502 communicates with a server-side module 506 executed on the hub server system 508 through the one or more networks 162. The client-side module 502 provides client-side functionalities for the event monitoring and review processing and communications with the server-side module 506. The server-side module 506 provides server-side functionalities for event monitoring and review processing for any number of client-side modules 502 each residing on a respective client device 504. The server-side module 506 also provides server-side functionalities for video processing and camera control for any number of the video sources 522, including any number of control devices and the cameras 118.

In some implementations, the server-side module 506 includes one or more processors 512, a video storage database 514, device and account databases 516, an I/O interface to one or more client devices 518, and an I/O interface to one or more video sources 520. The I/O interface to one or more clients 518 facilitates the client-facing input and output processing for the server-side module 506. The databases 516 store a plurality of profiles for reviewer accounts registered with the video processing server, where a respective user profile includes account credentials for a respective reviewer account, and one or more video sources linked to the respective reviewer account. The I/O interface to one or more video sources 520 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, and event masks, for use in data processing for event monitoring and review for each reviewer account.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the hub server system 508 is implemented on one or more standalone data processing apparatuses or a distributed network of computers. In some implementations, the hub server system 508 also employs various virtual devices and/or services of third party service providers (e.g., third-party cloud service providers) to provide the underlying computing resources and/or infrastructure resources of the hub server system 508. In some implementations, the hub server system 508 includes, but is not limited to, a handheld computer, a tablet computer, a laptop computer, a desktop computer, or a combination of any two or more of these data processing devices or other data processing devices.

The server-client environment 500 shown in FIG. 5A includes both a client-side portion (e.g., the client-side module 502) and a server-side portion (e.g., the server-side module 506). The division of functionalities between the client and server portions of operating environment 500 can vary in different implementations. Similarly, the division of functionalities between the video source 522 and the hub server system 508 can vary in different implementations. For example, in some implementations, client-side module 502 is a thin-client that provides only user-facing input and output processing functions, and delegates all other data processing functionalities to a backend server (e.g., the hub server system 508). Similarly, in some implementations, a respective one of the video sources 522 is a simple video capturing device that continuously captures and streams video data to the hub server system 508 without no or limited local preliminary processing on the video data. Although many aspects of the present technology are described from the perspective of the hub server system 508, the corresponding actions performed by the client device 504 and/or the video sources 522 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the hub server system 508, the client device 504, and the video sources 522 cooperatively.

It should be understood that operating environment 500 that involves the hub server system 508, the video sources 522 and the video cameras 118 is merely an example. Many aspects of operating environment 500 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, appliances 112 and the like).

The electronic devices, the client devices or the server system communicate with each other using the one or more communication networks 162. In an example smart home environment, two or more devices (e.g., the network interface device 160, the hub device 180, and the client devices 504-*m*) are located in close proximity to each other, such that they could be communicatively coupled in the same sub-network 162A via wired connections, a WLAN or a Bluetooth Personal Area Network (PAN). The Bluetooth PAN is optionally established based on classical Bluetooth technology or Bluetooth Low Energy (BLE) technology. This smart home environment further includes one or more other radio communication networks 162B via which at least some of the electronic devices 522-*m* exchange data with the hub device 180. Alternatively, in some situations, some of the electronic devices 522-*m* communicate with the network interface device 160 directly via the same sub-network 162A that couples devices 160, 180 and 504-*m*. In some implementations (e.g., in the network 162C), both the client device 504-*m* and the electronic devices 522-*n* communicate directly via the network(s) 162 without passing the network interface device 160 or the hub device 180.

In some implementations, during normal operation, the network interface device 160 and the hub device 180 communicate with each other to form a network gateway through which data are exchanged with the electronic device 522-*n*. As explained above, the network interface device 160 and the hub device 180 optionally communicate with each other via a sub-network 162A. However, a provisioning process is required to establish the communication between the network interface device 160 and the hub device 180 via the sub-network 162A. Specifically, a new hub device 180 has to receive a network identification and a network password associated with the sub-network 162A, such that the hub device 180 could communicate device information of the hub device 180 to the server 508 and allow the server 508 to associate the hub device 180 with one or more user accounts.

In some implementations, at least an optical link is formed between the client device 504-*m* and the hub device 180. The client device 504-*m* is configured to generate optical data (e.g., light flashes) coded with network information and user account information. The hub device 180 includes a light sensor that captures the optical data and recovers the network and user account information. Then, the hub device 180 uses the recovered network and user account information to access the sub-network 162A, the network(s) 162 and the server 508 and associate with a user account on the server 508.

Figure 5B:
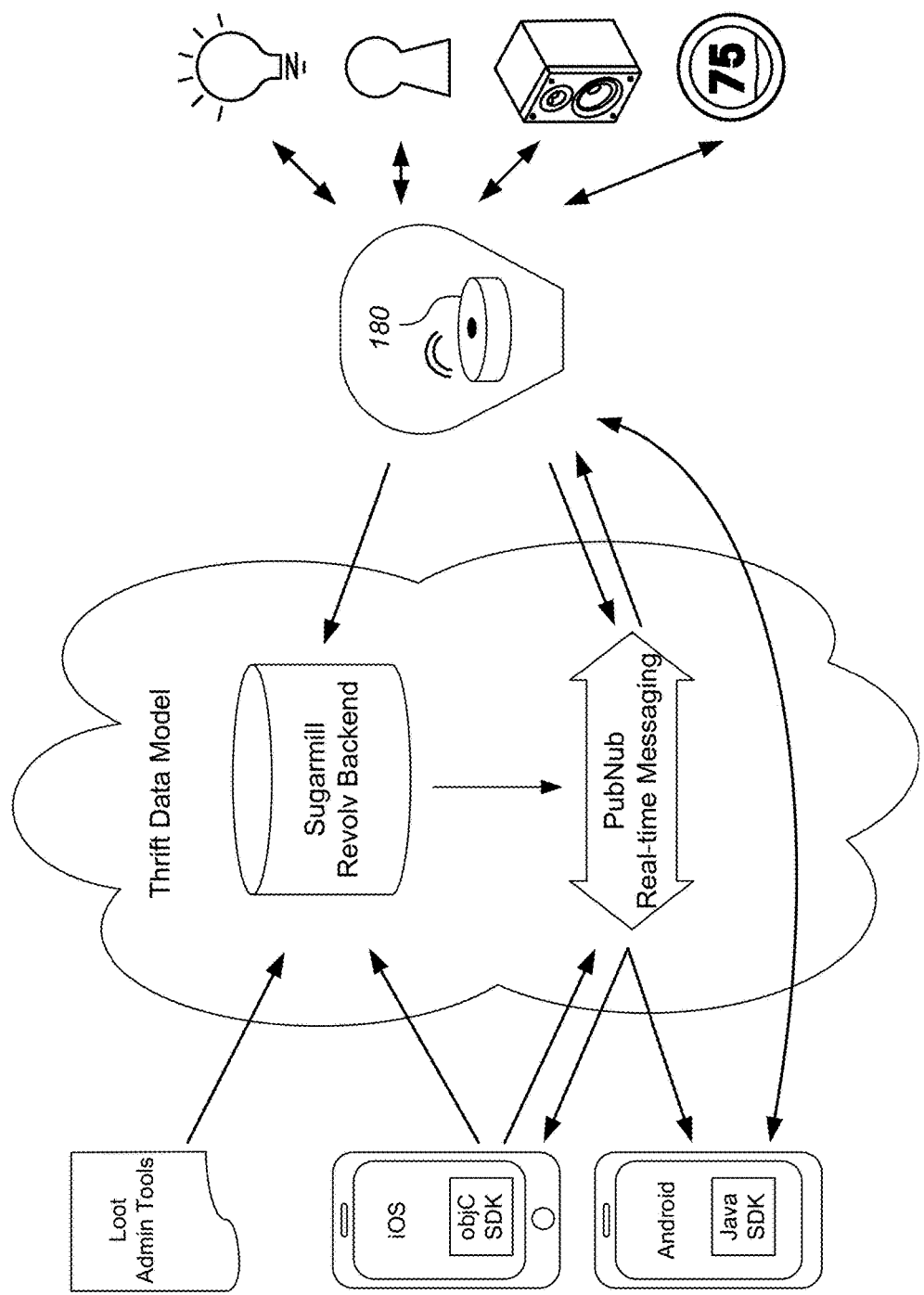
FIG. 5B is a block diagram of a Revolv Home Automation System in accordance with some implementations.

FIG. 5B is a block diagram of a Revolv Home Automation System in accordance with some embodiments of the application. The Revolv Home Automation System is an example of a smart home environment 100. Revolv Home Automation System includes a set of hardware and software that allows for secure local and remote control of home automation devices. A typical setup comprises a Gateway that resides within the LAN of a user's home to communicate with various HA Devices, Revolv's Cloud services which enable remote access, and mobile Apps and other Clients which allow users to interact with the system. These components interact with each other using Apache Thrift, an IDL and binary protocol which ensures correct by-design communications. This document describes the system and the Thrift protocol needed to set up and control the Revolv system.

A Gateway represents a single Revolv hardware Gateway. It is brought online through the FlashLink commissioning process, at which point it is also associated with an App. The Gateway is Revolv's hardware which is typically joined to a user's WiFi router within their home. It communicates with the Devices within the user's home directly via various radio protocols, and through the LAN to IP-based devices. The Gateway is the main command and control center of the System, including command queuing, scenes, and the rules engine for automating devices.

The Cloud facilitates communications and persistence between Clients and the Gateway, and comprises Revolv's restful service called Sugarmill, and a third-party PubSub service called PubNub. Sugarmill provides component authentication, authorization, and persistence of all relational data that can be accessed regardless of the online state of the various components. For example, a Client can access the Gateways it is connected to, Devices on each Gateway, and access and modify Rules controlling those devices even if the Gateway itself is disconnected. Sugarmill uses standard HTTPS endpoints with POST, PUT, and DELETE methods.

Beyond the standard endpoints used for normal user operation, Sugarmill provides a set of admin endpoints used for management of multiple systems. This is used by Revolv customer support, but certain of these can be exposed as needed via developer key.

All real time command and control is done over PubNub, a third-party solution which provides secure, reliable real time message passing with minimal latency over the internet. This allows normal remote Revolv communication to operate in an efficient asynchronous manner, while keeping all system components up-to-date with the current state. It also optimizes battery and data usage on mobile devices. Revolv also offers a more direct socket mode which can be used for even faster communications when a Client is operating locally within the same LAN as the Gateway.

A Device represents a single physical controllable piece of home automation hardware, such as a switch or a lock. Devices are tied to a single Gateway. Devices have a deviceType field, which describes at a high level what the Device is, and a set of Features that describe the capabilities of the device. For example, two Devices may have On/Off and Level features, but one could have a device Type of LIGHT (i.e. a light bulb) and the other SWITCH (i.e. a wall dimmer). The Device id is the identifier used for accessing and controlling the Device.

On the Client side, Revolv offers an iOS and an Android app designed for user-friendly operation of the Revolv system. Each of these is built on top of a platform specific SDK, which Revolv will provide to third parties for building their own clients. The Android SDK is built on top of a Java SDK, which allows command and control of Revolv from any JVM based platform. The SDK's generally manage all of the communications between the Client, Cloud, and Gateway, providing the developer with a simple live data model to operate upon.

All interfaces and data objects used in the system are described by an Apache Thrift definition. These compile to language specific bindings that are available for most commonly used languages, and provide a compact and correct by-design protocol for the Revolv system. While the SDKs hide much of the detail around building and manipulating Thrift objects for most Client's needs, it is necessary to understand the Thrift when building administrative applications that fall outside of the normal end user use cases.

Revolv's Thrift definition is split into files by functional unit, with data model, real-time (PubNub), and Sugarmill request interfaces required for a given unit maintained in one file. A maven build file is included in the source repository, which first combines these into a single Thrift file with all dependency ordering handled, then build language bindings for Java, Objective C, Python, Go, and JavaScript. Thrift also supports many other language bindings.

A Thrift definition comprises structs, unions, and enums, and also has sets, lists, and maps for collection objects. Most fields are optional, so it is easy to pass partial values for an object and have the recipient detect empty fields.

Figure 6:
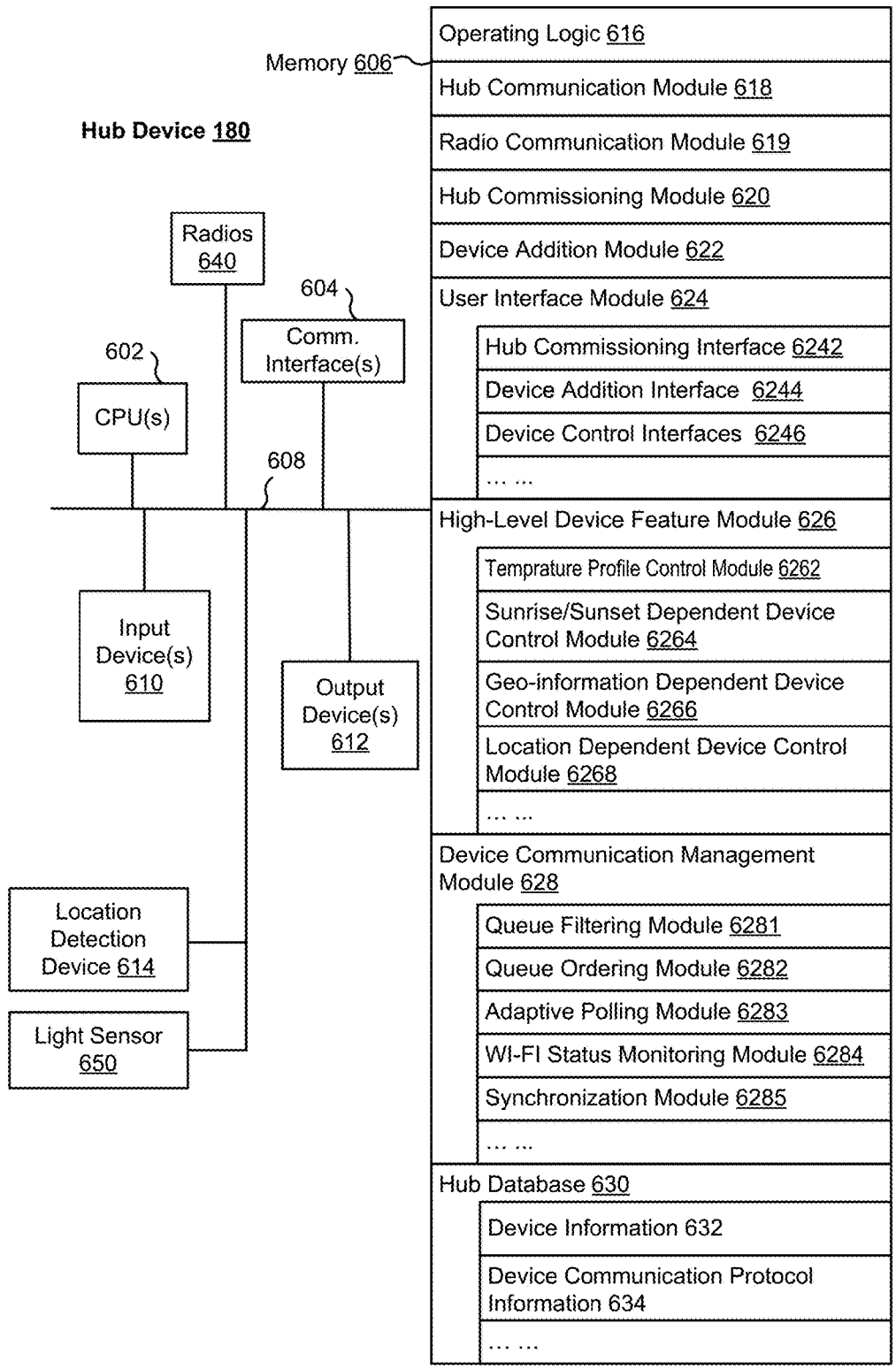
FIG. 6 is a block diagram illustrating a representative hub device in accordance with some implementations.

FIG. 6 is a block diagram illustrating a representative hub device 180 in accordance with some implementations. In some implementations, the hub device 180 includes one or more processing units (e.g., CPUs, ASICs, FPGAs, microprocessors, and the like) 602, one or more communication interfaces 604, memory 606, radios 640, light sensor 650, and one or more communication buses 608 for interconnecting these components (sometimes called a chipset). In some implementations, the hub device 180 includes one or more input devices 610 such as one or more buttons for receiving input. In some implementations, the hub device 180 includes one or more output devices 612 such as one or more indicator lights, a sound card, a speaker, a small display for displaying textual information and error codes, etc. Furthermore, some the hub device 180 uses a microphone and voice recognition or a camera and gesture recognition to supplement or replace the keyboard. In some implementations, the hub device 180 includes a location detection device 614, such as a GPS (global positioning satellite) or other geo-location receiver, for determining the location of the hub device 180.

The radios 640 enable one or more radio communication networks in the smart home environments, and allow a hub device 180 to communicate with smart devices. In some embodiments, the radios 640 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document. The light sensor 650 senses light flashes from a device that is placed in proximity to the light sensor 650.

Communication interfaces 604 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/ or any of a variety of custom or standard wired protocols (e.g., Ethernet, HomePlug, etc.), or any other suitable communication protocol, including communication protocols not yet developed as of the filing date of this document.

Memory 606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 606, or alternatively the non-volatile memory within memory 606, includes a non-transitory computer readable storage medium. In some implementations, memory 606, or the non-transitory computer readable storage medium of memory 606, stores the following programs, modules, and data structures, or a subset or superset thereof:

- Operating logic 616 including procedures for handling various basic system services and for performing hardware dependent tasks;
- Hub communication module 618 for connecting to and communicating with other network devices (e.g., network interface 160, such as a router that provides Internet connectivity, networked storage devices, network routing devices, server system 508, etc.) connected to one or more networks 162 via one or more communication interfaces 604 (wired or wireless);
- Radio Communication Module 619 for connecting the hub device 180 to other client devices (e.g., controller devices, smart devices 204 in smart home environment 100) via one or more radio communication devices (e.g., radios 640)
- Hub provisioning module 620 for provisioning the hub and electronic devices, which optionally includes: an account hub device link module (not shown) for associating one or more electronic devices 522 or hub 180 with a corresponding user account, and a secure network setup module (not shown) for setting up secure network connections for both the hub and the electronic devices;
- Device addition module 622 for adding a new electronic device (e.g., smart device 204-1 in smart home environment 100 in FIG. 1) after a hub has been properly set up;
- User interface module 624, including but not limited to:
  - Hub provisioning interface 6242 for providing and displaying a user interface during the device provisioning process (e.g., performed by hub provisioning module 620);
  - Sensor addition interface 6244 for providing and displaying a user interface when a new device is being added (e.g., performed by device addition module 622); and
  - Sensor control interfaces 6246 for providing and displaying a user interface in which settings, captured data, and/or other data for one or more sensor devices (e.g., light sensor 650) can be modified and/or viewed;
- High-level sensor feature module 626, including but not limited to:
  - Temperature profile control module 6262 for creating and maintaining temperature profiles of one or more devices (e.g., one or more smart devices in smart home environment 100), wherein temperature profiles include operations settings (e.g., scheduling) for manipulating the temperature of the one or more devices;
  - Sunrise/sunset dependent device control module 6264 for computing (e.g., based on information retrieved from geo-information dependent device control module 6266, and/or location dependent device control module 6268) sunrise and/or sunset times, and accordingly adjusting operations settings for one or more smart devices (e.g., dimming a light, closing a smart curtain, adjusting a thermostat, etc.);
  - Geo-information dependent device control module 6266 for detecting surrounding environmental characteristics of hub device 180, such as information of surrounding terrain (e.g., mountain ranges, desert, etc.) and/or nearby obstructions (e.g., tall buildings, trees, etc.);
  - Location dependent device control module 6268 for detecting a location of hub device 180 (e.g., GPS coordinates);
- Sensor communication management module 628, including but not limited to:
  - Queue filtering module 6281 for manipulating and processing commands received from one or more devices (e.g., splitting commands into commands for specific devices, translating commands in accordance with protocols of corresponding devices, etc.)
  - Queue ordering module 6282 for determining an order of commands (e.g., received and processed by queue filtering module 6281) in a command queue of hub device 180;
  - Adaptive polling module 6283 for storing device information (e.g., device type, protocol, application state, changes to device state, time of last poll, etc. of smart devices in smart home environment 100, FIG. 1), configuring polling modes (e.g., frequency of polling), and sending polling commands to the one or more devices;
  - Wi-Fi Status monitoring module 6284 for determining a status of one or more communication interfaces 604 (e.g., Wi-Fi);
  - Synchronization module 6285 for receiving messages from, and transmitting messages to, one or more devices (e.g., smart devices in smart home environment 100, FIG. 1), wherein messages include control requests (e.g., a command to adjust thermostat), responses, and state information (e.g., information conveying changes in device state); and
- Hub database 630, including but not limited to:
  - Sensor information 632 for storing and managing data received, detected, and/or transmitted by one or more sensors (e.g., light sensor 650) of hub device 180; and
  - Device communication protocol information 634 for storing and managing protocol information for one or more protocols (e.g., standard wireless protocols, such as ZigBee, Z-Wave, etc., and/or custom or standard wired protocols, such as Ethernet).

Each of the above identified elements (e.g., modules stored in memory 206 of hub device 180) may be stored in one or more of the previously mentioned memory devices (e.g., the memory of any of the smart devices in smart home environment 100, FIG. 1), and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

Figure 7:
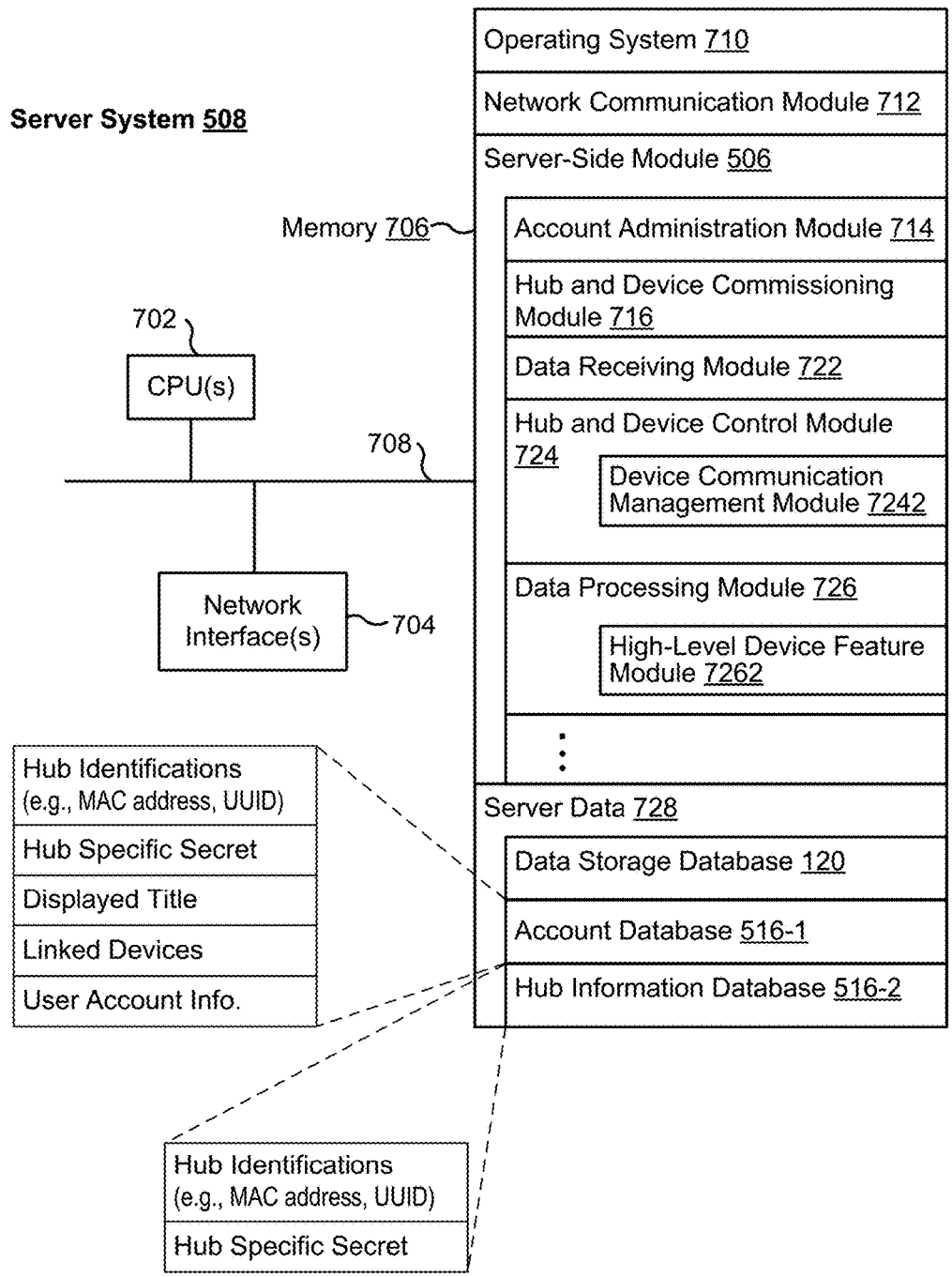
FIG. 7 is a block diagram illustrating server system in accordance with some implementations.

FIG. 7 is a block diagram illustrating the server system 508 in accordance with some implementations. The server system 508, typically, includes one or more processing units (CPUs) 702, one or more network interfaces 704 (e.g., including I/O interface to one or more clients 86 and I/O interface to one or more the electronic devices), memory 116, and one or more communication buses 708 for interconnecting these components (sometimes called a chipset). Memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 118. Memory 706, or alternatively the non-volatile memory within memory 706, includes a non-transitory computer readable storage medium. In some implementations, memory 706, or the non-transitory computer readable storage medium of memory 706, stores the following programs, modules, and data structures, or a subset or superset thereof:

Operating system 710 including procedures for handling various basic system services and for performing hardware dependent tasks;

Network communication module 712 for connecting the server system 508 to other client devices (e.g., the client devices and the electronic devices (including e.g., cameras) connected to one or more networks 162 via one or more network interfaces 704 (wired or wireless);

Server-side module 506, which provides server-side functionalities for account management, device provision, device control, data processing and data review, including but not limited to:

Account administration module 714 for creating user accounts, and providing account login-services to client devices;

Hub and device provisioning module 716 for provisioning hubs and smart devices (sometimes in cooperation with the account registration module 714), which optionally includes: an account hub device link module (not shown) for associating one or more smart devices 204 (e.g., electronic devices 522 or hub 180 with a corresponding user account, a secure network setup module (not shown) for setting up secure network connections for both the hub and the smart devices, and a device addition module (not shown) for adding a new smart electronic device after a hub has been properly set up;

Data receiving module 722 for receiving data (e.g., video data) from smart devices via the hub device, and preparing the received data for further processing and long-term storage in the data storage database 120;

Hub and device control module 724 for generating and sending server-initiated control commands to modify operation modes of the smart devices, and/or receiving and forwarding user-initiated control commands to modify operation modes of the smart devices, wherein the hub and device control module 86 at least includes a device communication management module 7242;

Data processing module 726 for processing the data provided by the smart devices such that the processed data could be forwarded to a client device and reviewed by a user who logs onto a corresponding user account on the specific client device, wherein in some implementations, the data processing module 726 includes a high-level device feature module 7262; and server data 736 storing data for use in account management, hub provision and control, device provision and control, data processing and data review, including but not limited to:

Data storage database 120 for storing data associated with each electronic device 802 (e.g., each camera) of each user account, as well as data processing models, processed data results, and other relevant metadata (e.g., names of data results, location of electronic device 802, creation time, duration, settings of the electronic device 802, etc.) associated with the data, wherein (optionally) all or a portion of the data and/or processing associated with the hub 180 or smart devices stored securely;

Account database 516-1 for storing account information for user accounts, including user account information, information for linked hubs and smart devices (e.g., hub identifications), hub specific secrets, relevant user and hardware characteristics (e.g., service tier, device model, storage capacity, processing capabilities, etc.), user interface settings, data review preferences, etc., where the information for associated smart devices includes, but is not limited to, one or more device identifiers (e.g., MAC address and UUID), device specific secrets, and displayed titles; and Device Information Database 516-2 for storing device information related to one or more hub devices, e.g., device identifiers and hub specific secrets, independently of whether the corresponding hub devices have been associated with any user account.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 116, optionally, stores a subset of the modules and data structures identified above. Furthermore, memory 116, optionally, stores additional modules and data structures not described above.

Figure 8:
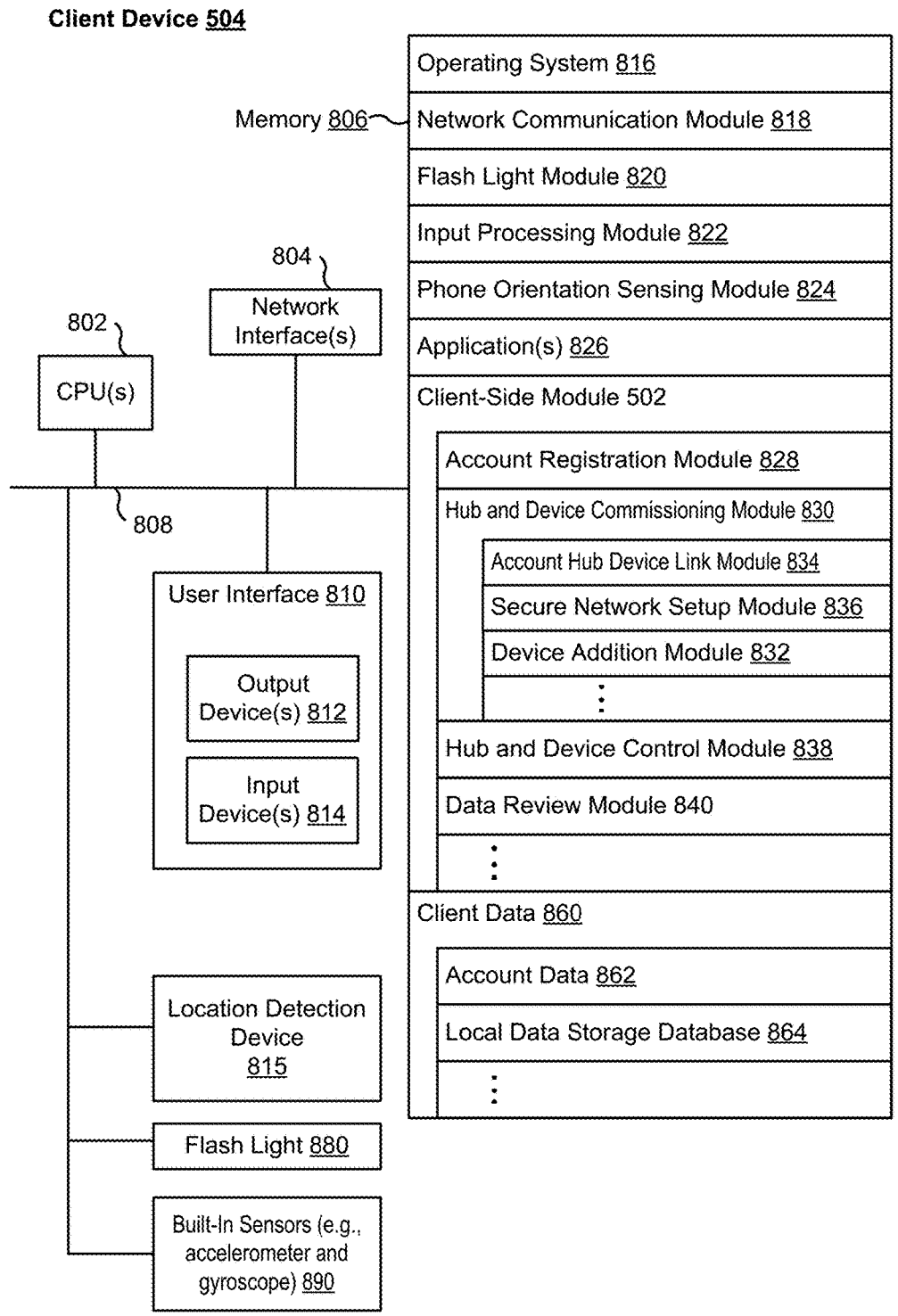
FIG. 8 is a block diagram illustrating a representative client device associated with a user account in accordance with some implementations.

FIG. 8 is a block diagram illustrating a representative client device 504 associated with a user account in accordance with some implementations. The client device 604, typically, includes one or more processing units (CPUs) 802, one or more network interfaces 804, memory 806, and one or more communication buses 808 for interconnecting these components (sometimes called a chipset). The client device also includes a user interface 810, a flash light 880, and one or more built-in sensors 890 (e.g., accelerometer and gyroscope). User interface 810 includes one or more output devices 812 that enable presentation of media content, including one or more speakers and/or one or more visual displays. Optionally, output devices 812 (e.g., a visual display) is used for sending signals (e.g., to light sensor 650 of hub 180) during a provisioning/commissioning process. User interface 810 also includes one or more input devices 814, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images, for example, of graphic series codes printed on the smart devices. Optionally, the client device includes a location detection device 815, such as a GPS (global positioning satellite) or other geo-location receiver, for determining the location of the client device.

Memory 806 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 806, optionally, includes one or more storage devices remotely located from one or more processing units 802. Memory 806, or alternatively the non-volatile memory within memory 806, includes a non-transitory computer readable storage medium. In some implementations, memory 806, or the non-transitory computer readable storage medium of memory 806, stores the following programs, modules, and data structures, or a subset or superset thereof:

- Operating system 816 including procedures for handling various basic system services and for performing hardware dependent tasks;
- Network communication module 818 for connecting the client device to other client devices (e.g., server system 508 and the electronic devices) connected to one or more networks 162 via one or more network interfaces 804 (wired or wireless);
- Flash light module 820 for producing flashes of light (e.g., for detection by light sensor 650 of hub 180) as signals during a provisioning/commissioning process;
- Input processing module 822 for detecting one or more user inputs or interactions from one of the one or more input devices 814 and interpreting the detected input or interaction;
- Phone orientation sensing module 824 for determining the orientation of the client device 504 based on data sensed by the built-in sensors 890;
- One or more applications 826 for execution by the client device (e.g., games, social network applications, smart home applications, and/or other web or non-web based applications) for controlling hubs and electronic devices (e.g., sending commands, configuring settings, etc.) and for reviewing data captured by the electronic devices (e.g., device status and settings, captured data, or other information regarding the hub or other connected devices);
- Client-side module 502, which provides client-side functionalities for device provisioning, device control, data processing and data review, including but not limited to:
  - Account registration module 828 for establishing a user account;
  - Hub and device provisioning module 830 that provisions hubs and electronic devices (sometimes in cooperation with the account registration module 828) and includes an account hub device link module 834 for associating one or more electronic devices 522 or hub 180 with a corresponding user account, a secure network setup module 836 for setting up secure network connections for both the hub and the electronic devices, and a device addition module 832 for adding a new smart electronic device after a hub has been properly set up;
  - Hub and device control module 838 for generating control commands for modifying an operating mode of the hub or the electronic devices in accordance with user input; and
  - Data review module 840 for providing user interfaces for reviewing the data that are processed by server system 508 and displayed on the display of the client device; and
- client data 860 storing data associated with the user account and electronic devices, including, but is not limited to:
  - Account data 862 storing information related with both user accounts loaded on the client device 604 and electronic devices 522 associated with the user accounts, wherein such information includes cached login credentials, hub identifiers (e.g., MAC addresses and UUIDs), electronic device identifiers (e.g., MAC addresses and UUIDs), user interface settings, display preferences, authentication tokens and tags, password keys, etc.; and
  - Local data storage database 864 for selectively storing raw or processed data associated with electronic devices 522 (e.g., a camera) that has been linked to the user accounts.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

In some implementations, at least some of the functions of the server system 508 are performed by the client device 604, and the corresponding sub-modules of these functions may be located within the client device rather than server system 508. In some implementations, at least some of the functions of the client device are performed by the server system 508, and the corresponding sub-modules of these functions may be located within the server system 508 rather than client device 604. The client device 604 and the server system 508 shown in FIGS. 7 and 8, respectively, are merely illustrative, and different configurations of the modules for implementing the functions described herein are possible in various implementations.

Figure 9A:
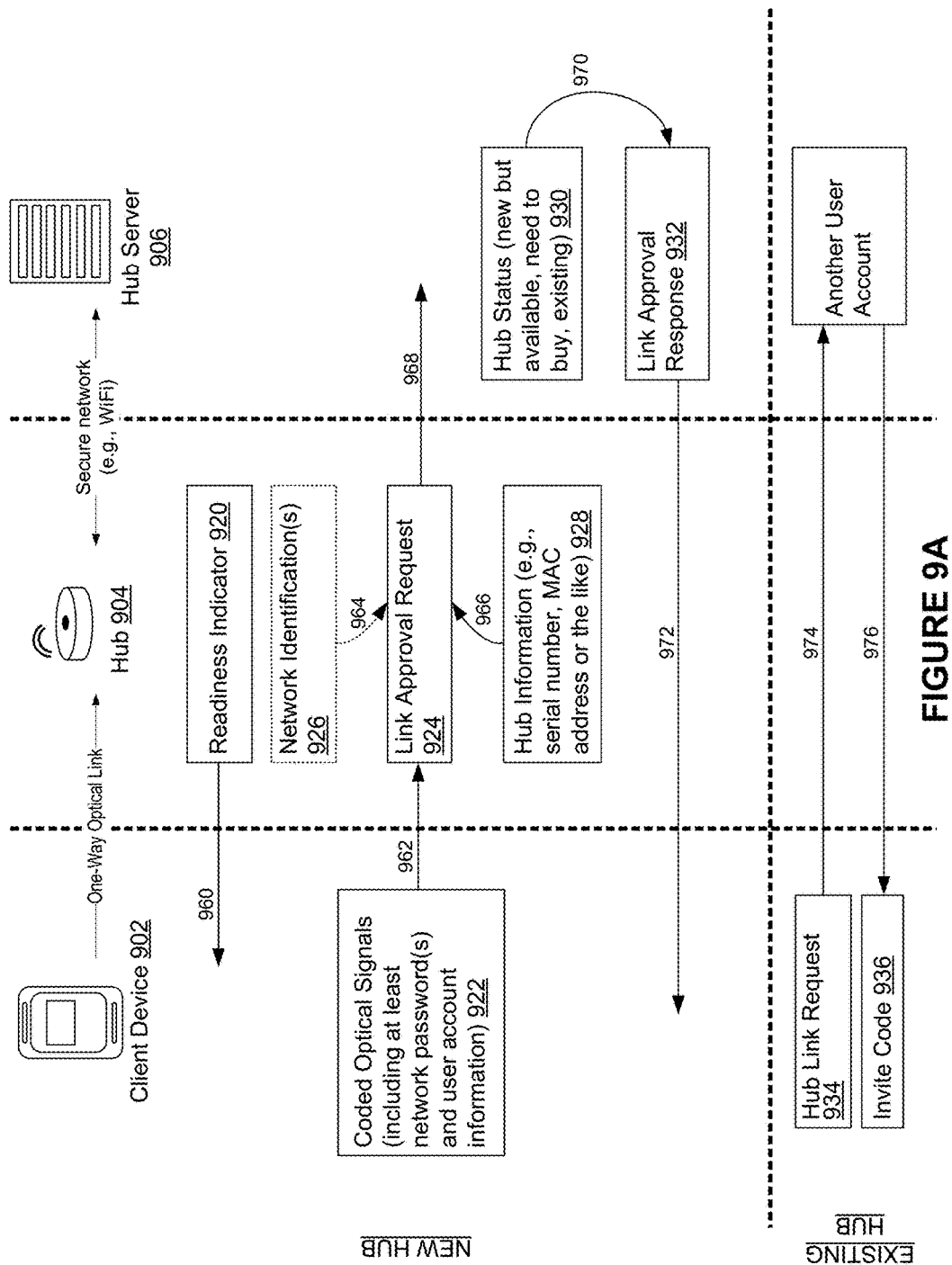
FIG. 9A is an example diagram illustrating information flows during the course of commissioning a hub device in an operating environment as shown in FIG. 5A in accordance with some implementations.

FIG. 9A is an example diagram illustrating information flow during the course of commissioning a hub device 180 (e.g., hub device 904) in an operating environment as shown in FIG. 5A in accordance with some implementations. Prior to commissioning a new hub device 904 for secure communication in the smart home environment, a user registers a user account on a client-side application associated with the hub device 904, and logs onto the user account on a client device 902. In some implementations, after the new hub device 904 is plugged onto a wall outlet (i.e., after it is powered up), the hub device 904 broadcasts (960) a readiness indicator signal 920. For example, the hub device 904 includes a LED light indicator that stays on, shines with a specific color (e.g., green), or flashes with a light pattern, when the hub device 904 is ready for a commissioning process. In some situations, the client device 902 is required to receive the readiness indicator 920 prior to commissioning the hub device 904.

The client device 902 generates optical signals that are encoded with specific communication data, and broadcasts (962) the encoded optical signals to the hub device 904. In a specific example, the flash light or a display screen of the client device 902 is flashed to deliver the encoded optical signals to a light sensor on the hub device 904. The client device 902 is flipped over to face downward, and placed in close proximity to the light sensor on the hub 904. In some implementations, a built-in mechanical sensor (e.g., an accelerometer or a gyroscope) detects that the user has flipped over the client device 902, and automatically initializes the device commissioning process for the hub device 904.

The specific communication data include one or more of network credentials, user account information, user/device authentication information and integrity check data. In one situation, the hub device 904 scans to obtain a network identification 926, and the client device 902 provides network passwords to allow the hub device 904 to access the corresponding network. Alternatively, in another situation, both network identification and network password are provided by the client device 902 via the optical link.

In some implementations, Hub cannot search for a service set identifier (SSID) as they may be hidden, so we send both the SSID and the password. One mechanism for shortening the message even more is creating a 2 byte hash of the SSID and sending that instead of the full SSID, and having the hub determine SSID from its own scan; in the end it was simpler just to send the full SSID. The essence of the authentication part of the invention is that we DON'T have to send complicated authentication information for connecting to the service and the app. Instead we use the entropy of the SSID and password of the WiFi network, and a small 2 byte authentication token (e.g., salt) to create a unique secure authentication token which is then used to connect the Hub with the application in the Server. The user never needs to create an account with credentials to make this system work, which simplifies the setup. Once the link is made, all further data is sent over the network link without any further use of the optical link (although additional phones can subsequently commission to the Hub with the same mechanism).

After receiving the encoded optical signals, the hub device 904 generates a link approval request 924, including user account information and hub information. The hub information includes a hub identifier, e.g., a serial number, a media control access (MAC) address, and a universally unique identifier (UUID). The hub device 904 then uses the network credentials to access the secure network that communicatively couples the hub device 904 to a hub server 906, and sends (968) the link approval request 924 to the hub server 906 via the secure network.

Upon receiving the link approval request 924, the hub server 906 checks a hub information database to identify a hub status 930 for the hub device 904 according to the hub information. The hub status 930 is optionally new but available, not sold yet (i.e., need to buy from a hub provider), and existing. An existing hub has been commissioned in another smart home environment, and associated with another user account. In some implementations, the hub server 906, on behalf the client device 902, sends a request to link to an existing hub 934 to the other user account, and provides an invite code to the client device 902 if the other user account approves sharing of the existing hub with the client device 902. Alternatively, if the hub device 904 is new and available, the hub server 906 associates (970) the hub device 904 with the user account on the client device 902, stores the hub information 928 in association with the hub device 904 in its account database, and returns (972) a link approval response 932.

In some implementations, a user of the client device 902 intends to link her user account with an existing hub. The client device 902 issues (974) a hub link request 934 to the hub server 906. The hub server 906 forwards the hub link request 934 to another user account that is currently in charge of the hub device 904, and returns (976) an invite code to the client device 902 if the other user account approves sharing of the existing hub with the client device 902. When the client device 902 uses the invite code to commission the existing hub, the hub server 906 associates the hub device 904 with the user account on the client device 902, stores the hub information 928 in association with the hub device 904 in its account database, and returns a link approval response 932.

When the client device 902 receives the link approval response, the user account logged onto by the user is associated with the hub device 904, and a representation of the hub device 904 is displayed on the user interface of the client device 902 to represent the hub device 904.

Figure 9B:
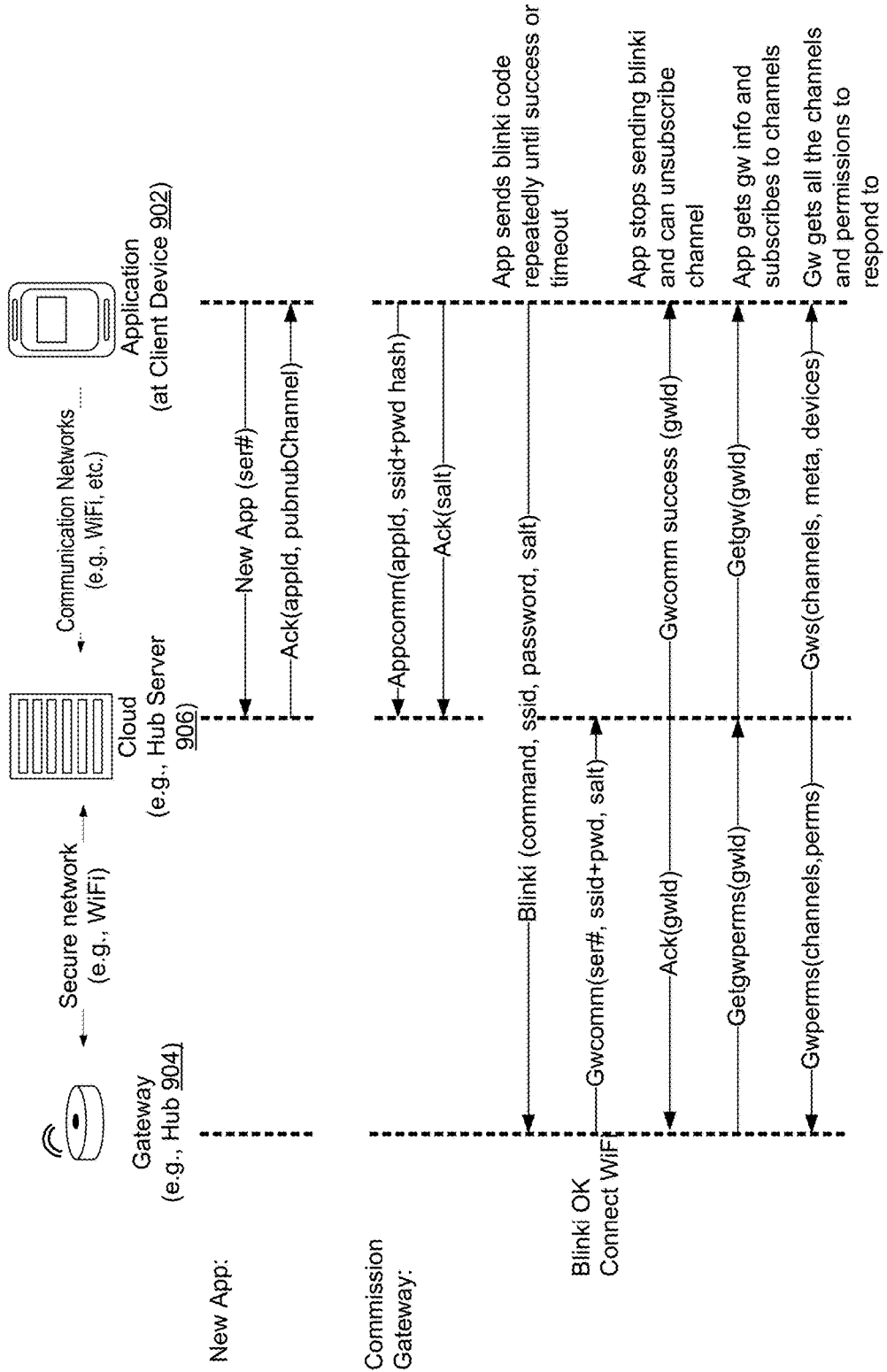
FIG. 9B is an example flow diagram for commissioning a hub device in an operating environment as shown in FIG. 5A in accordance with some implementations.

FIG. 9B is an example flow diagram for commissioning a hub device in an operating environment as shown in FIG. 5A in accordance with some implementations. When a new application comes online, a user makes a request at the client device to register and get a unique identification (ID) along with information of an application notification channel. The application at the client device uses a flash link to connect to the gateway (e.g., hub device 704), and uses the same information to create a flash link hash to authenticate that the application can connect to the gateway through the cloud (e.g, hub server 706). The flash link communication (as explained in FIG. 9A) contains a command, SSID (or short hash thereof), password, and an authentication token (also called as a salt in this application). The authentication token is used to uniquely identify a user account of a client-side application. In some implementations, the authentication token is provided by a server associated with a hub device. To notify the application when the commissioning is successful, the cloud sends over a message (e.g., "gwcomm success") to the application over the pubnub Channel created when the application first registers. At the end, the cloud sends over gw-notification, gw-to-app and app-to-gw (pub nub) channels to the gateway. The cloud also sends over gw-to-app and app-to-gw (pub nub) channels to the application.

An example appcomm call is reproduced as follows:

```
{
    "commissioningKey" : "IW2kM4Ezsn",
    "geoPoint" : {
        "latitude" : 47.6838,
        "longitude" : -122.301
    }
}
```

An example ack Response is reproduced as follows:

```
{
    "location" : {
        "geoPoint" : {
            "latitude" : 47.6838,
            "longitude" : -122.301
        },
```

-continued

```
        "street" : "7523 25th Ave NE",
        "city" : {
            "name" : "Seattle",
            "principalSubdivision" : {
                "country" : {
                    "name" : "United States of America",
                    "code" : "US"
                },
                "code" : "WA",
                "name" : "Washington"
            }
        },
        "postalCode" : "98115"
    },
    "channel" : "f2952c3c-ec3f-4032-a965-43cd2a372a32"
}
```

As shown below in Table 1, an example optical data item includes a plurality of constants (e.g., Frame bits, Command, SSID, PW length, Salt, and CRC) and a password. The plurality of constants shares six bytes of the optical data item, and the password optionally has a variable length). Such an optical data item is encoded in an optical signal and communicated from the client device 902 to the hub device 904 via an optical communication path.

TABLE 1

An Optical Data Item

| Frame | Command | SSID | PW Length | Password | Salt | Cyclic Redundancy Check (CRC) | Frame |
|---|---|---|---|---|---|---|---|
| 4 bits | 1 byte | 1 byte hash | 1 byte | Encoded String | 1 byte | 1 byte | 4 bits |
| 0 × 6 | 0 × 20 | 0 × A3 | 0 × 05 | "mypwd" | 0 × 82 | 0 × 99 | 0 × 6 |

Further, in some implementations, the data is a Manchester encoded data stream, operating at a variable rate from 10-60 Hz with a sync byte pattern to frame the message. On top of that we added a very simple protocol for passing the SSID, password, and salt; if it's interesting, it just includes SYNC, LEN, VER/TYPE, and PAYLOAD. SYNC is 0xFE. LEN covers VER/TYPE and PAYLOAD. For VER/TYPE, the most significant nibble is a version field, and the least significant nibble is MSGTYPE. For example, VER/TYPE could include VER 0x0 and MSGTYPE (lower nibble), and MSGTYPE (lower nibble) further include:
- 0x00—plaintext to be printed as a debug message
- 0x01—reserved
- 0x02—salt, data is 2 byte signed integer
- 0x03—SSID string (no null termination—length based)
- 0x04—Network password string (no null termination—length based)

In another example, VER 0x1 . . . 0xF is reserved, and future versions may incorporate a CRC as the last byte of the PAYLOAD.

Figure 9C:
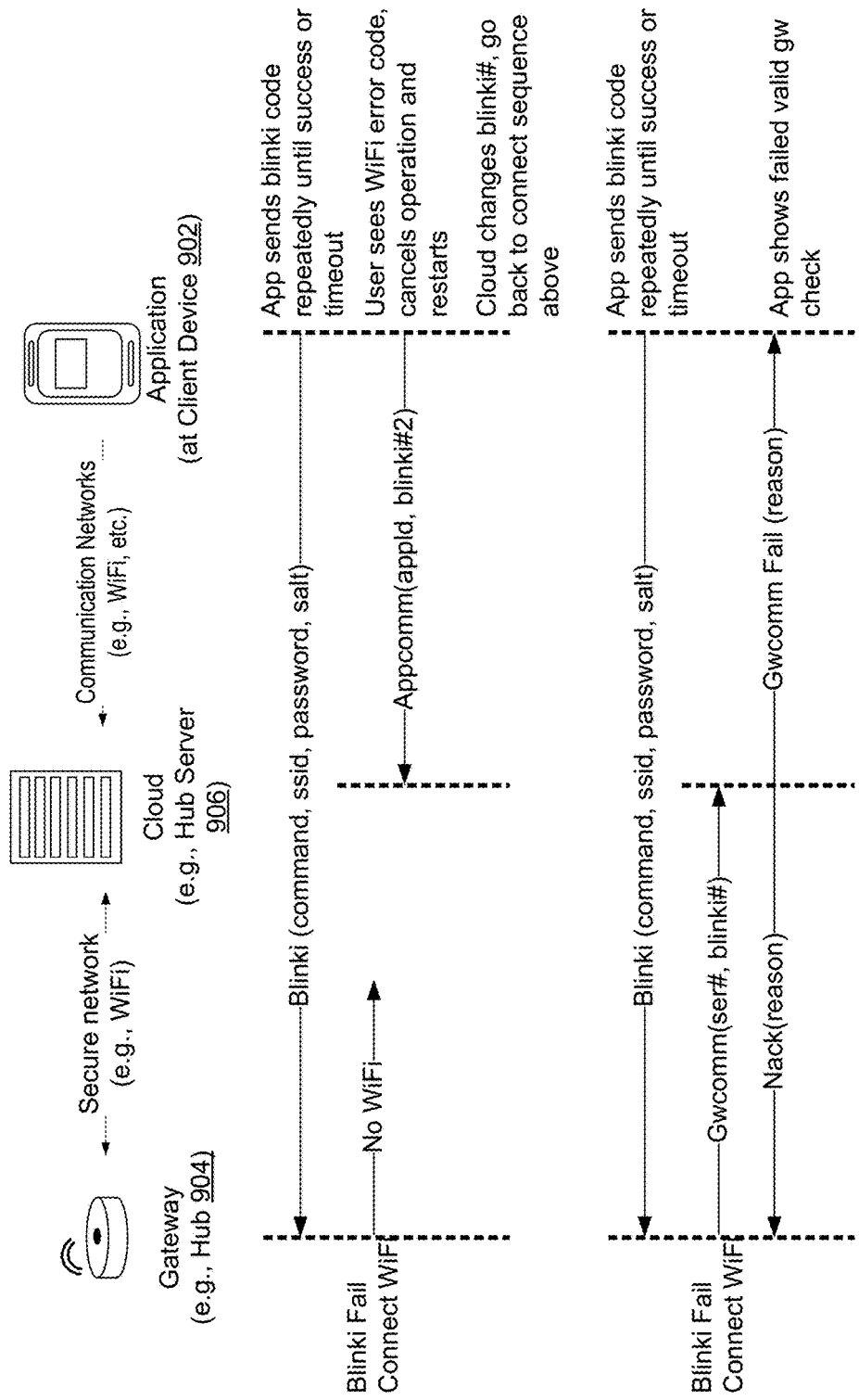
FIG. 9C is an example flow diagram for commissioning a hub device with a failure in an operating environment as shown in FIG. 5A in accordance with some implementations.

FIG. 9C is an example flow diagram for commissioning a hub device with a failure in an operating environment as shown in FIG. 5A in accordance with some implementations. Commissioning can fail in several ways such that the hub device 904 could not connect to the cloud. The hub device 904 includes one or more LED light indicators that are configured to provide blink codes as user remedies messages. In some implementations, the blink codes emitted by the LED light indicators are garbled, and indicate that a CRC failure occurs in the commissioning process. In some implementations, the LED light indicators blink in yellow to indicate that the hub device 904 is trying to receive data, and goes to solid yellow when the hub device 904 receives a coherent message.

In some implementations, the LED light indicators alternate between yellow and white blinks to indicate that a WiFi connection has failed. The commissioning process is therefore canceled, and the user is requested to enter a new network name or a new network password. In some implementations, when a connection to the cloud fails, the user needs to check the Internet and gateway, and give another try to connect to the cloud.

In some implementations, the LED light indicators blink in white to indicate that the Internet is down, and turn to solid white when the Internet connection is good. In some situations, a timeout occurs in the commissioning process because the application or the cloud does not respond.

In some implementations, when the cloud (e.g., the hub server 906) fails to validate the gateway serial number, it sends a failure notification to both the gateway (e.g., the hub device 904) and the application at the client device 902.

Specifically, in some implementations, after the hub device 180 is communicatively coupled to the hub server system 508, communication is established between the hub device 180 and one or more smart electronic devices (e.g. devices 102-118) via radio communication networks available in the local smart home environment 100.

Each of a client device 902, a hub device 904 and a hub server 906 has one or more processors, and memory storing one or more programs for execution by the one or more processors of the respective device or server. The one or more programs of the respective device or server include instructions for implementing operations shown in FIGS. 9A-9C to commission a new hub device in a smart home environment.

Figure 9D:
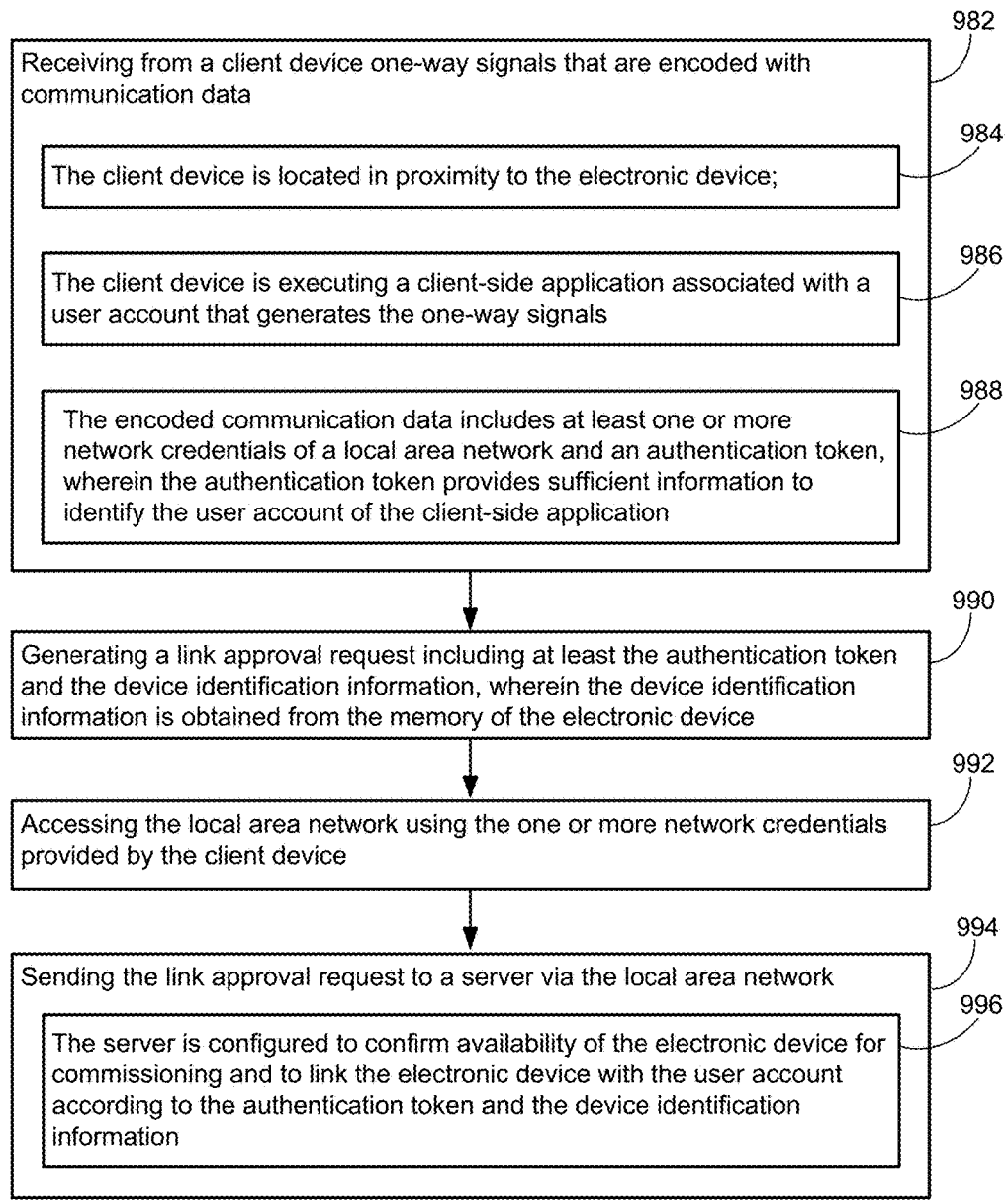
FIG. 9D is a flow chart for an example method of commissioning an electronic device (e.g., a hub device) in a smart home environment in accordance with some implementations of the application.

FIG. 9D is a flow chart for an example method 980 of commissioning an electronic device (e.g., a hub device 180 or 904) in a smart home environment in accordance with some implementations of the application. The method 980 is implemented at the electronic device, and the electronic device have one or more processors, and memory storing one or more programs for execution by the one or more processors. Device identification information associated with the electronic device is stored in the memory of the electronic device (e.g., as part of the device information 632 stored in the hub database 632 of the hub device 180). In some implementations, the device identification information includes a device identification identifier represented by one of a serial number, a media control access (MAC) address, and a universally unique identifier (UUID).

The electronic device receives (982) from a client device one-way signals that are encoded with communication data. The client device is located (984) in proximity to the electronic device. The client device is executing (986) a client-side application associated with a user account that generates the one-way signals. The encoded communication data includes (988) at least one or more network credentials of a local area network and an authentication token, and the authentication token provides sufficient information to identify the user account of the client-side application. In some implementations, the one-way signals are communicated via a communication path having a substantially narrow bandwidth. Further, in some implementations, the one-way signals include optical signals, and the client device is configured to provide the optical signals by one of a flash light and a display screen of the client device. In some implementations, prior to receiving the one-way signals, the electronic device broadcasts a readiness indicator signal, wherein the readiness indicator signal indicates to the client device that the electronic device is ready for a commissioning process. Specifically, in an example, the electronic device includes a LED light indicator that generates the readiness indicator signal, and in accordance with the readiness indicator signal, the LED light stays on, shines with a specific color, or flashes with a light pattern.

In some implementations, the electronic device scans to obtain a network identification of the local area network, and the one or more network credentials include a network password associated with the network identification. In some implementations, the one or more network credentials include a network identification and a network password that are associated with the local area network. Alternatively, in some implementations, the one or more network credentials include a hash value associated with a network identification and a network password that are used to access the local area network. The electronic device determines locally at the electronic device the network identification based on the hash value.

Then, the electronic device generates (990) a link approval request including at least the authentication token and the device identification information, and the device identification information is obtained from the memory of the electronic device. In some implementations, the authentication token has been provided by the server to the client device, and the link approval request includes the authentication token when it is sent to the server for authenticating the commissioning process.

The electronic device accesses (992) the local area network using the one or more network credentials provided by the client device. The electronic device sends (994) the link approval request to a server via the local area network, and the server is configured (996) to confirm availability of the electronic device for commissioning and to link the electronic device with the user account according to the authentication token and the device identification information.

In some implementations, the client device includes a sensor configured to detect that the user has positioned the client device (e.g., flipped over the client device) for coupling the one-way signals to a corresponding sensor of the electronic device configured to detect the one-way signals, and automatically initializes the commissioning process for the electronic device in response to the detecting. In an example, the built-in sensor includes at least one of an accelerometer and a gyroscope.

In some implementations, the electronic device is an existing hub device that has been commissioned in another smart home environment or associated with another user account, and the server is configured to send the link approval response to the client device only when the other user account approves the link approval request.

In some implementations, after being commissioned in the smart home environment, the electronic device establishes communication with one or more smart devices via one or more communication networks. The one or more communication networks are implemented based on at least one communication protocol of a group consisting of Insteon, IEEE 802.15.4, Wi-Fi, ZigBee, 6LoWPAN, Thread, Z-Wave, Bluetooth Smart, Bluetooth Low Energy, ISA100.11a, WirelessHART, MiWi, OSIAN, Ethernet, and HomePlug. In some implementations, the one or more communication networks are distinct from the local area network.

More details on the method 980 for commissioning the electronic device in a smart home environment are explained above with reference to FIGS. 9A-9C.

Another aspect of the application is directed to an electronic device including one or more processors, and memory storing one or more programs for execution by the one or more processors. The one or more programs include instructions causing the one or more processors to implement the method 980 for commissioning the electronic device. Further, another aspect of the application includes non-transitory computer-readable storage medium storing one or more programs for execution by one or more processors of an electronic device. The one or more programs include instructions causing the one or more processors to implement the method 980 for commissioning the electronic device. Specifically, for both the electronic device and the non-transitory computer-readable storage medium, the one or more programs include a hub commissioning interface module 6242 and a hub commissioning module 620 that function together to commission the hub device in the smart home environment.

It should be understood that the particular order in which the operations in FIG. 9D have been described are merely example and are not intended to indicate that the described order is the only order in which the operations could be performed. One of ordinary skill in the art would recognize various ways to implement the respective smart device adding method as described herein. Additionally, it should be noted that details of other processes described herein with respect to method 980 (e.g., FIG. 9D) are also applicable in an analogous manner to the other methods discussed in this application. For brevity, these details are not repeated here.

Figure 10:
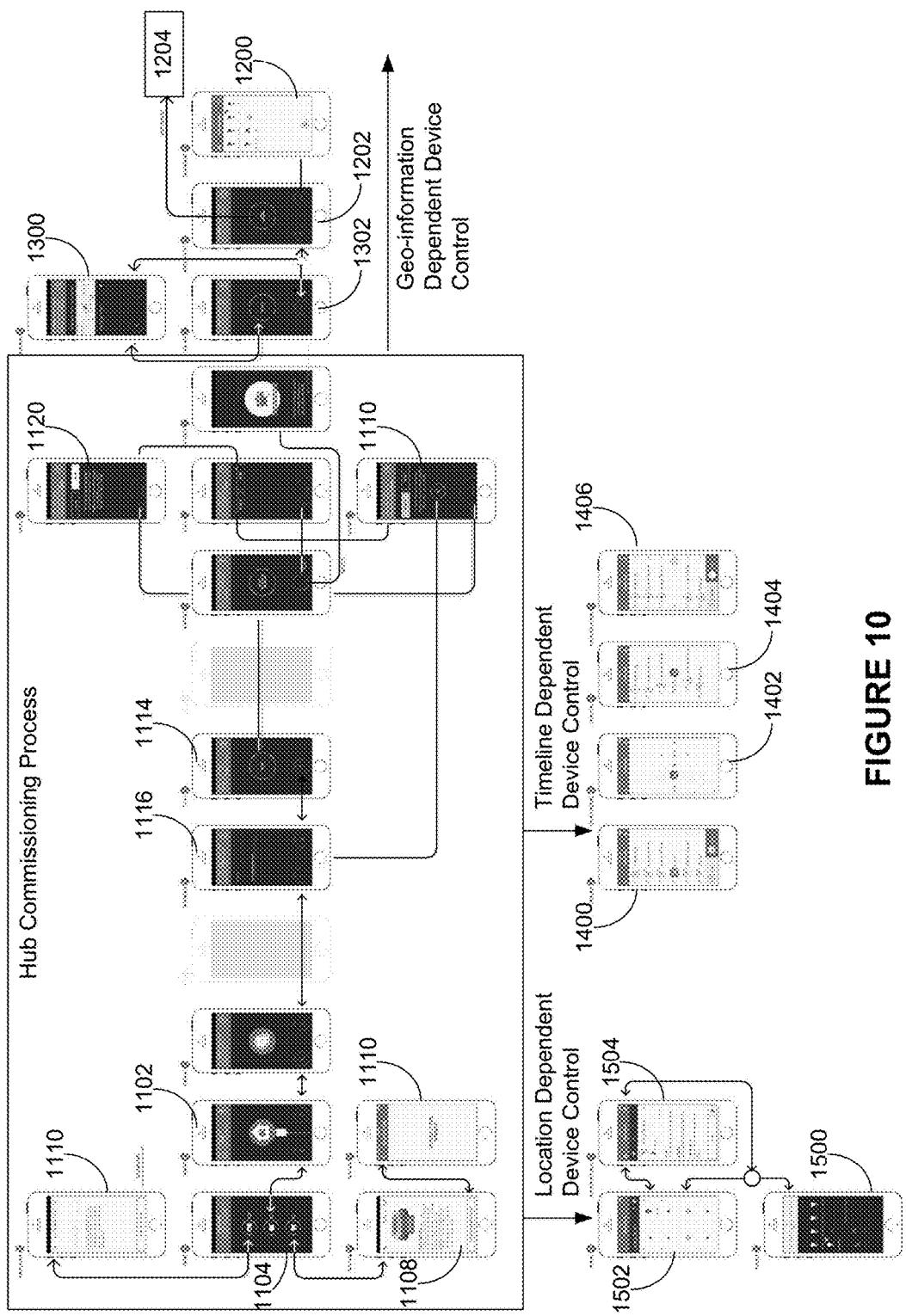
FIG. 10 illustrates graphic user interfaces (GUI) displayed for commissioning a hub and controlling smart devices that are communicatively coupled to the hub in accordance with some implementations.
Figure 11A:
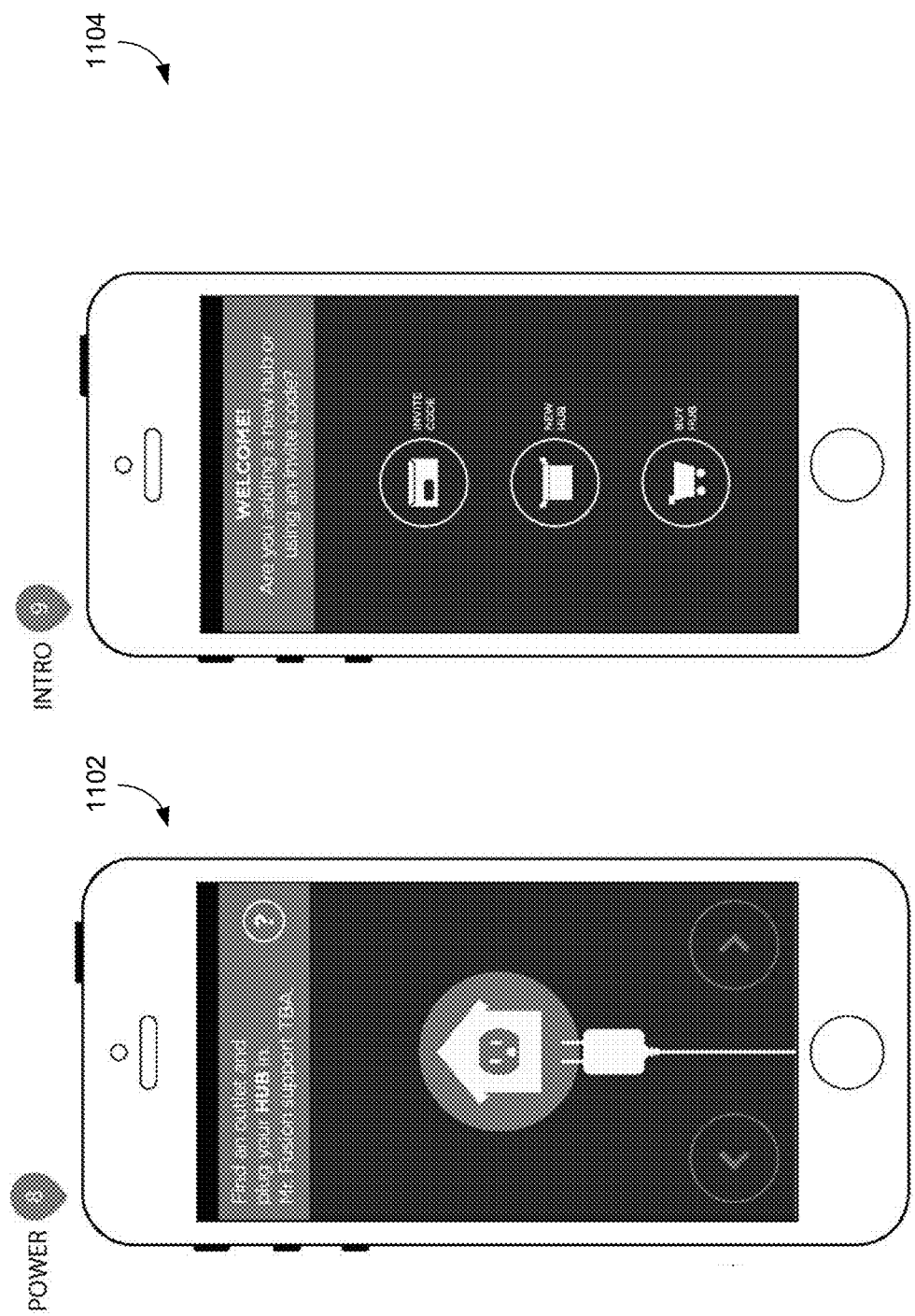
FIGS. 11A-11G illustrate example GUIs displayed for commissioning a hub in accordance with some implementations.
Figure 11B:
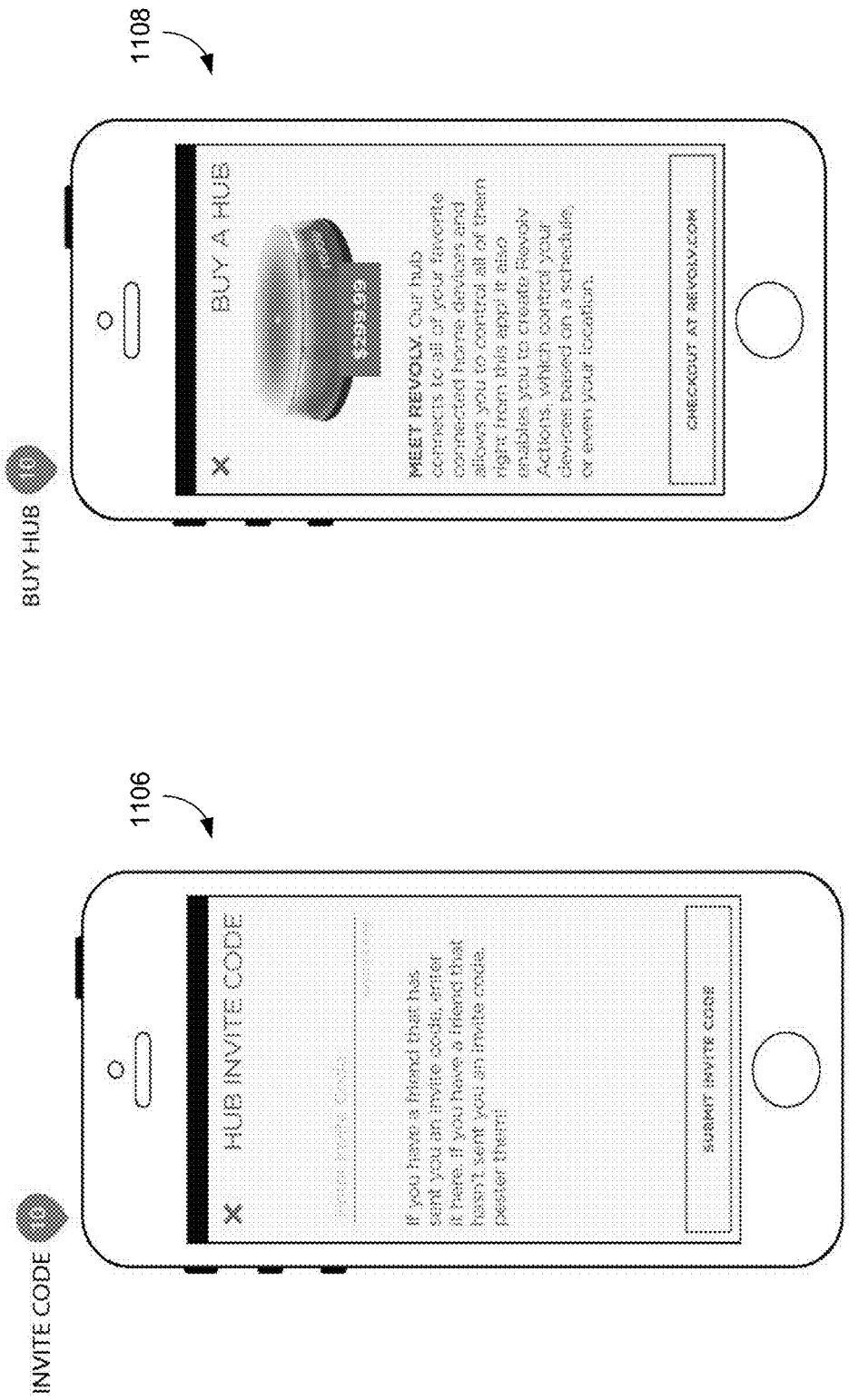
Figure 11C:
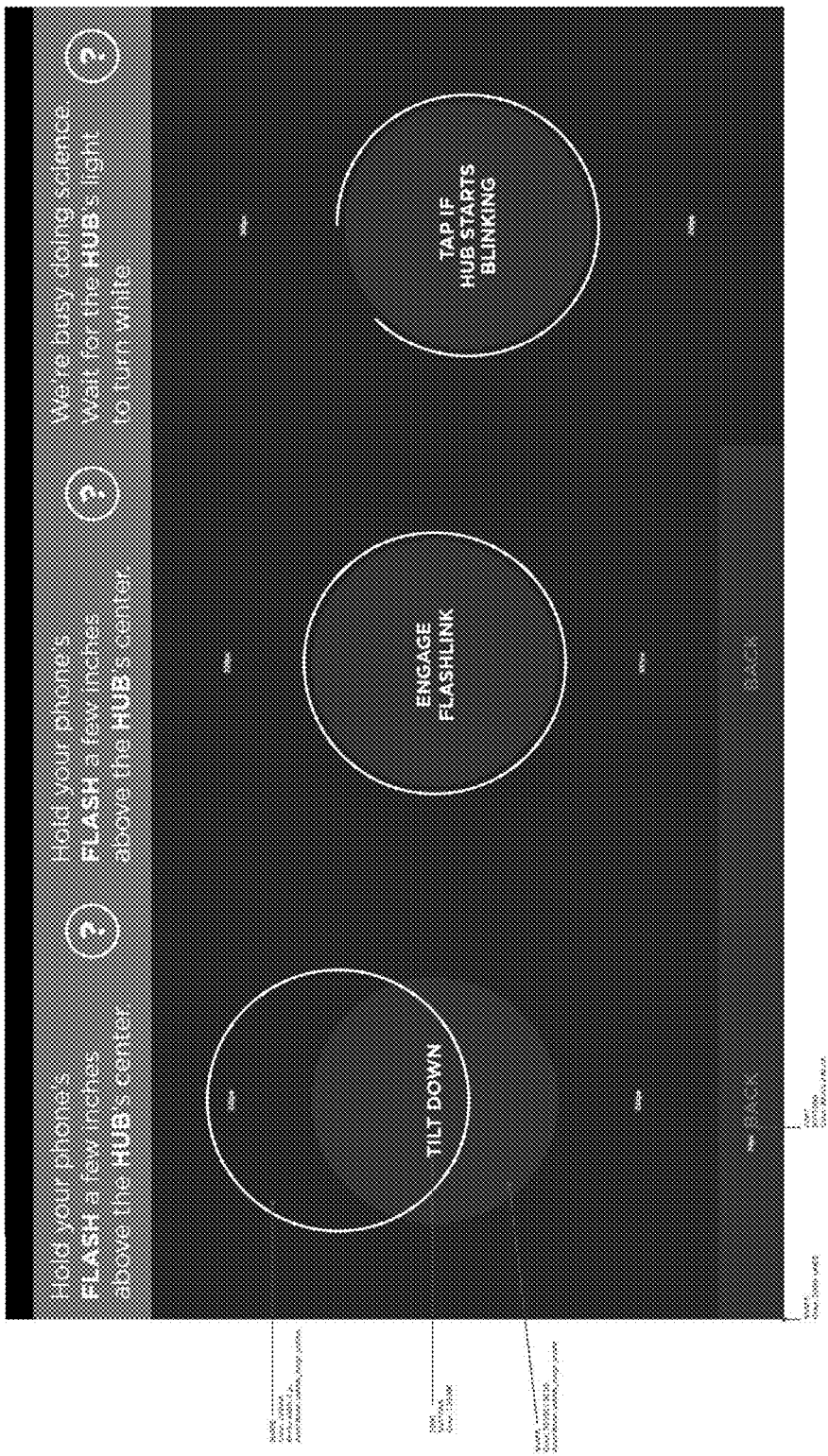
Figure 11D:
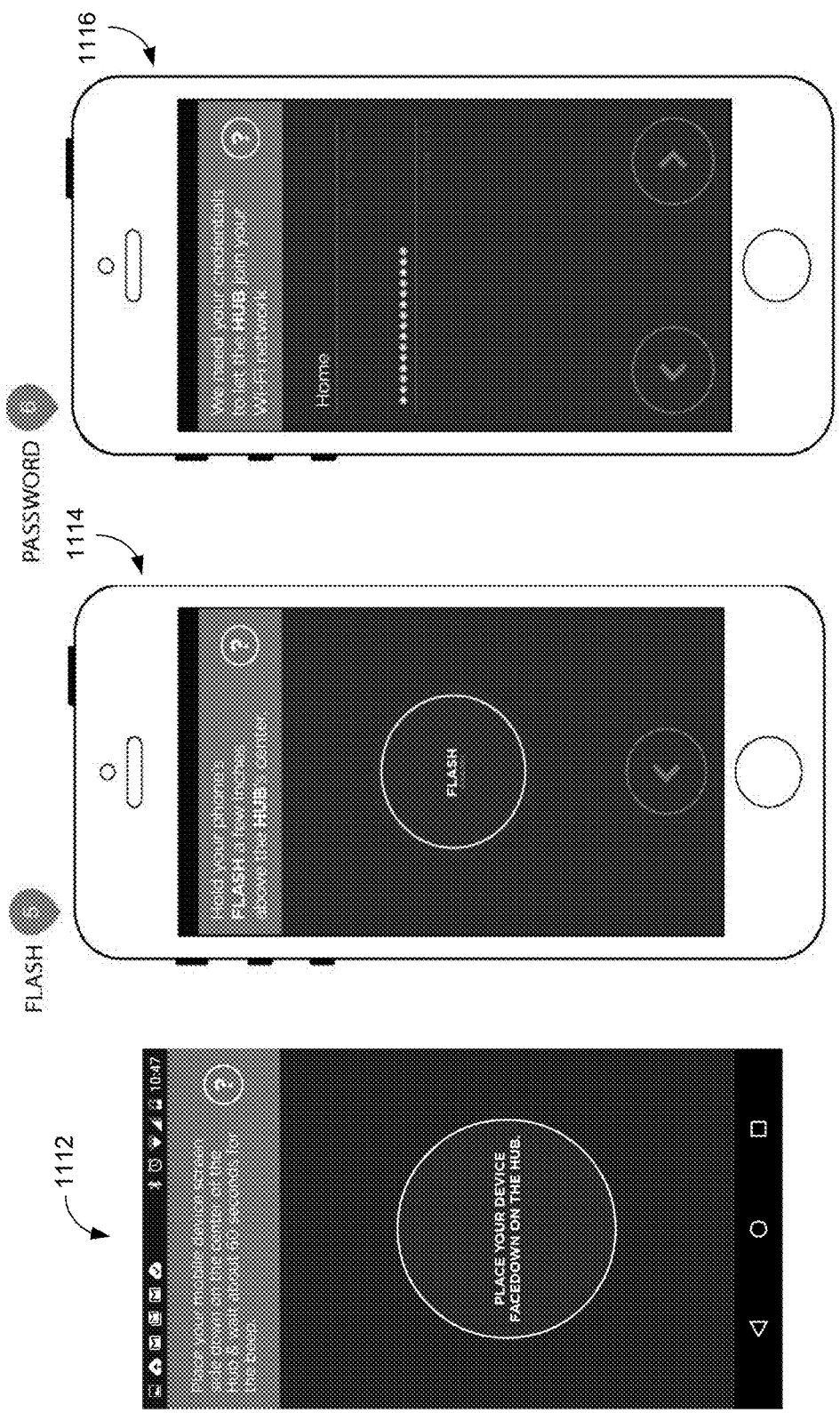
Figure 11E:
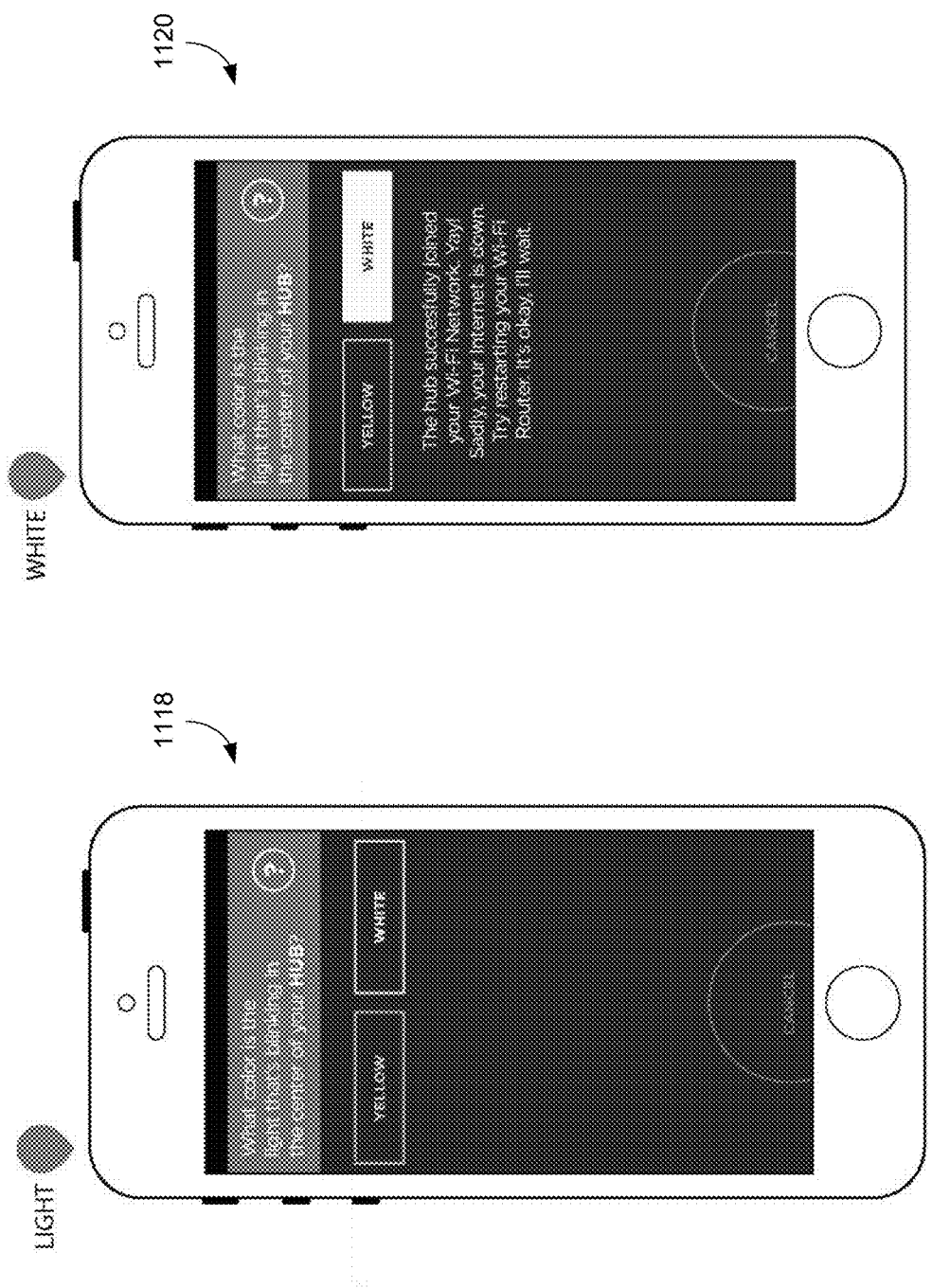
Figure 11F:
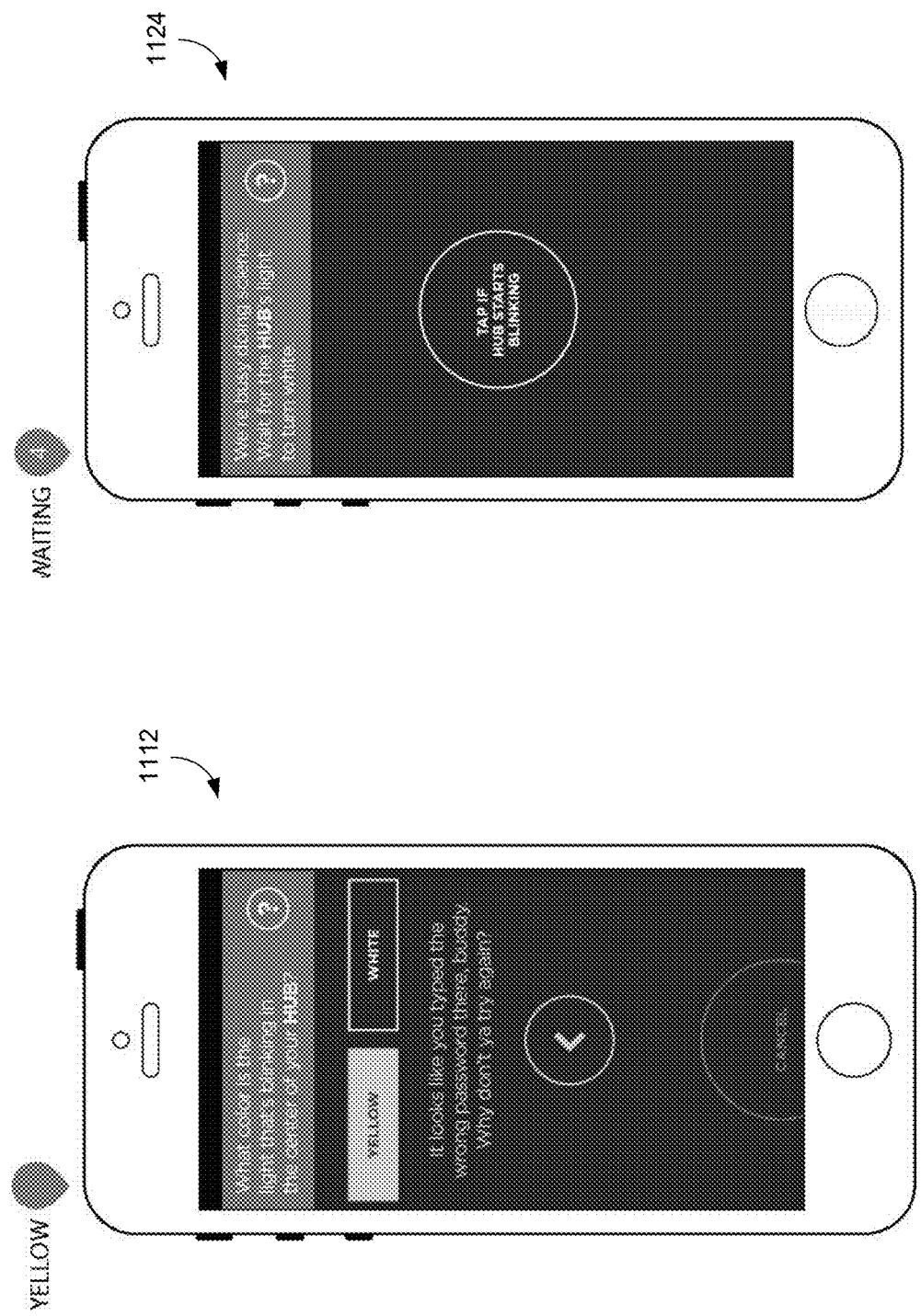
Figure 11G:
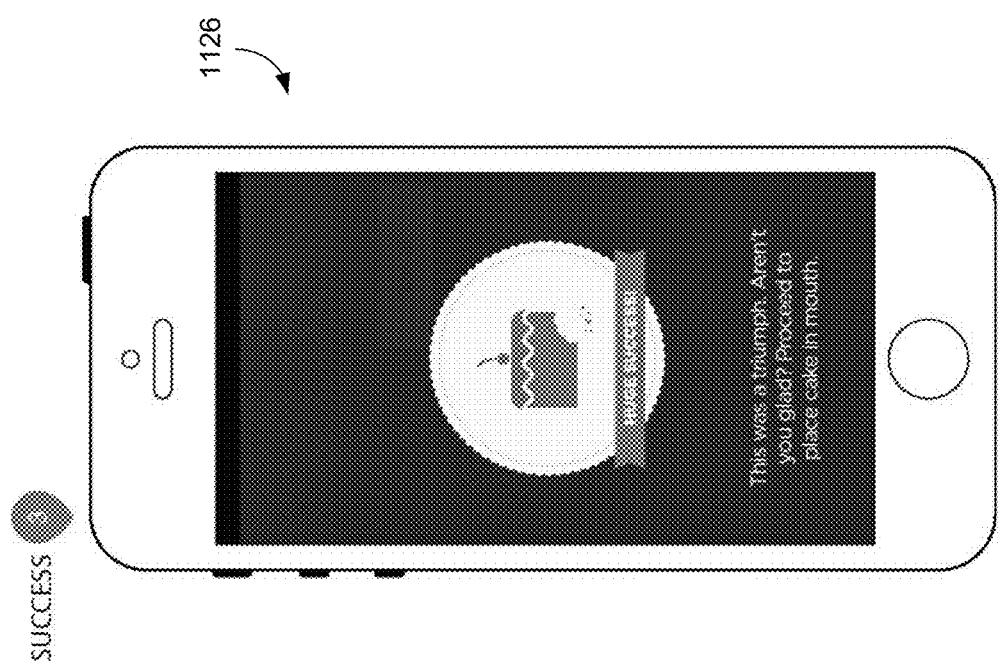
Figure 12A:
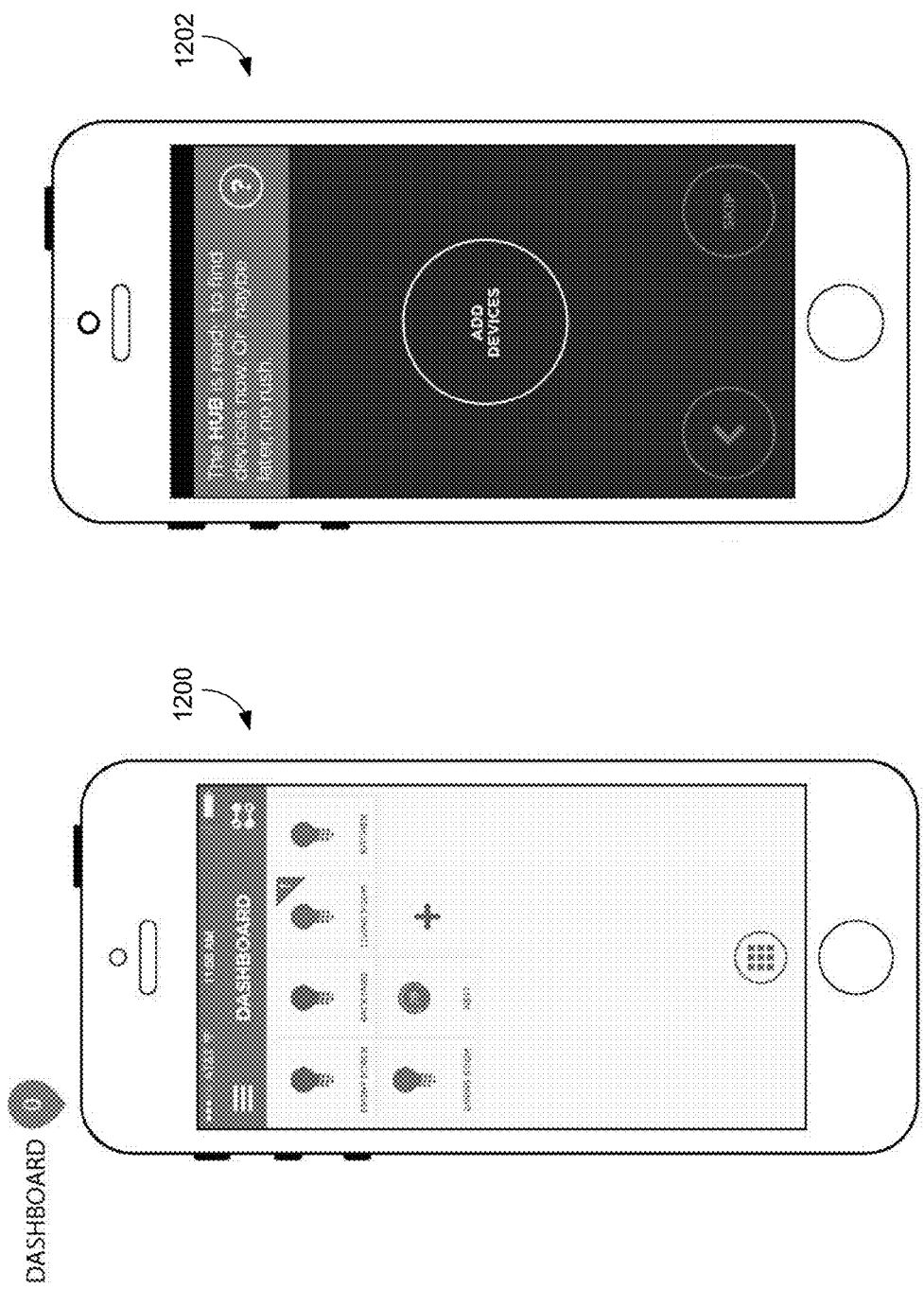
FIGS. 12A-12G illustrate example GUIs displayed for adding and controlling sensors that are communicatively coupled to a hub in accordance with some implementations.
Figure 12B:
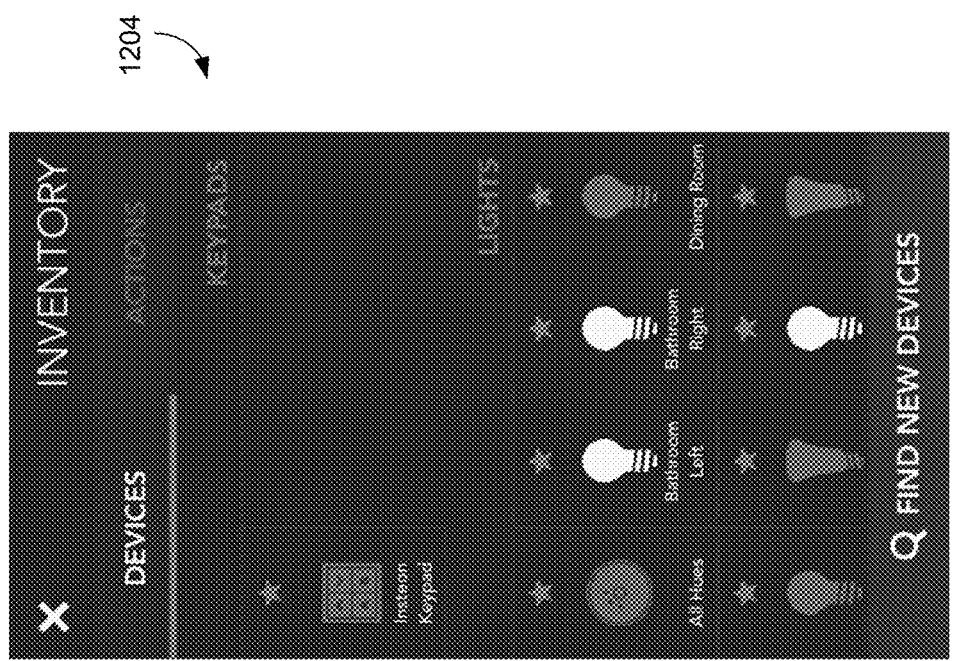
Figure 12C:
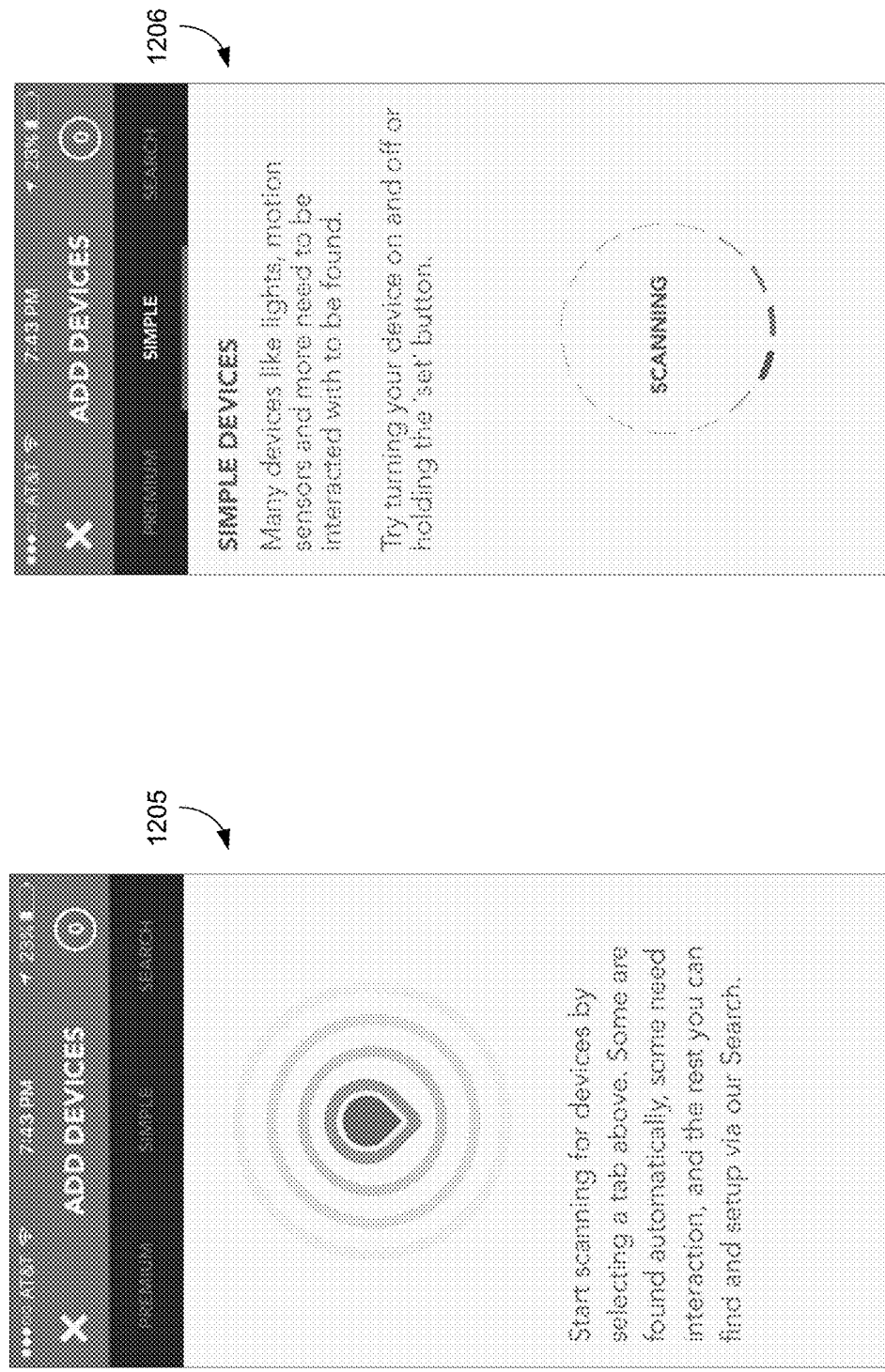
Figure 12D:
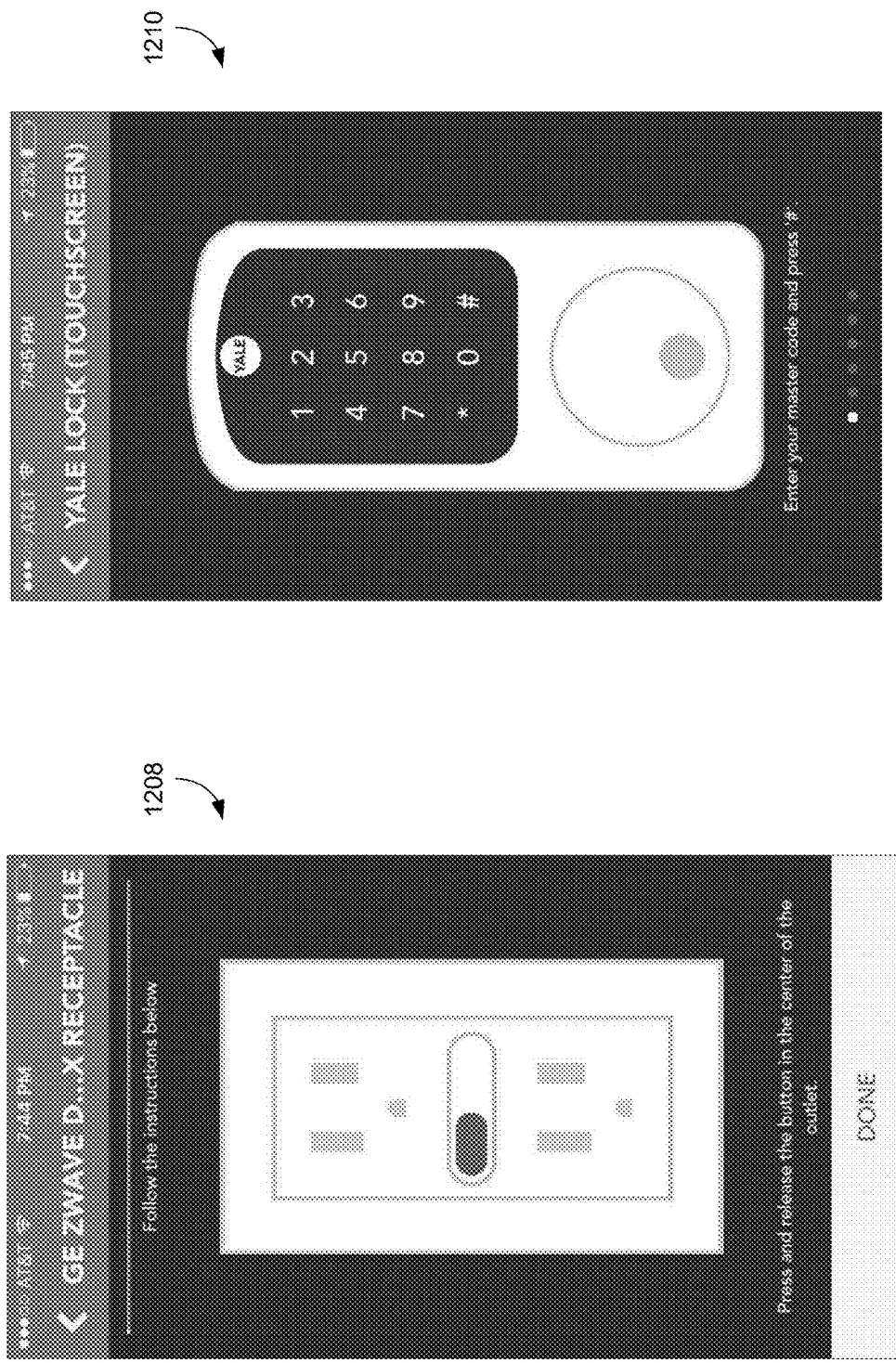
Figure 12E:
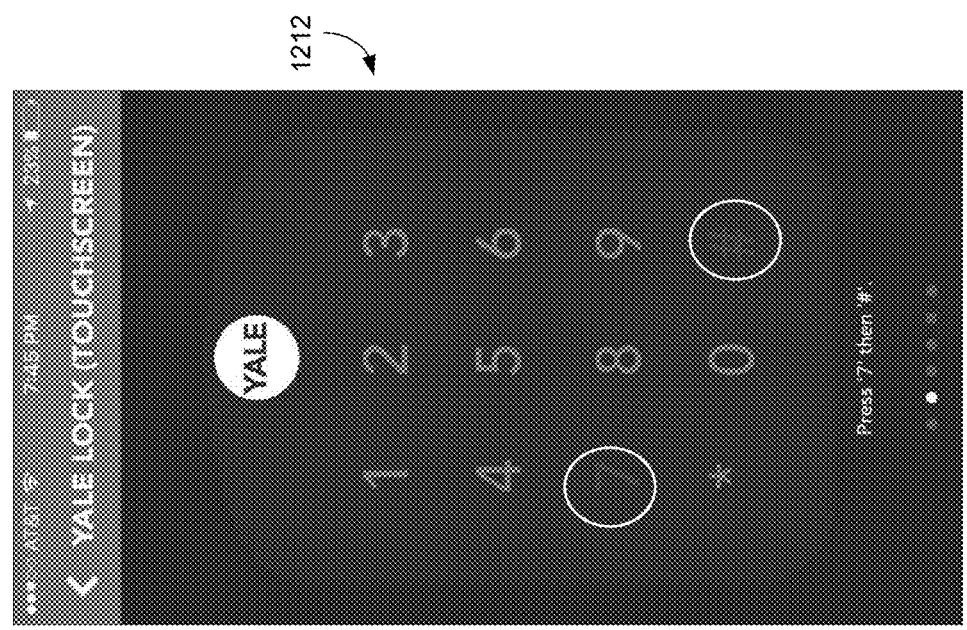
Figure 12E:
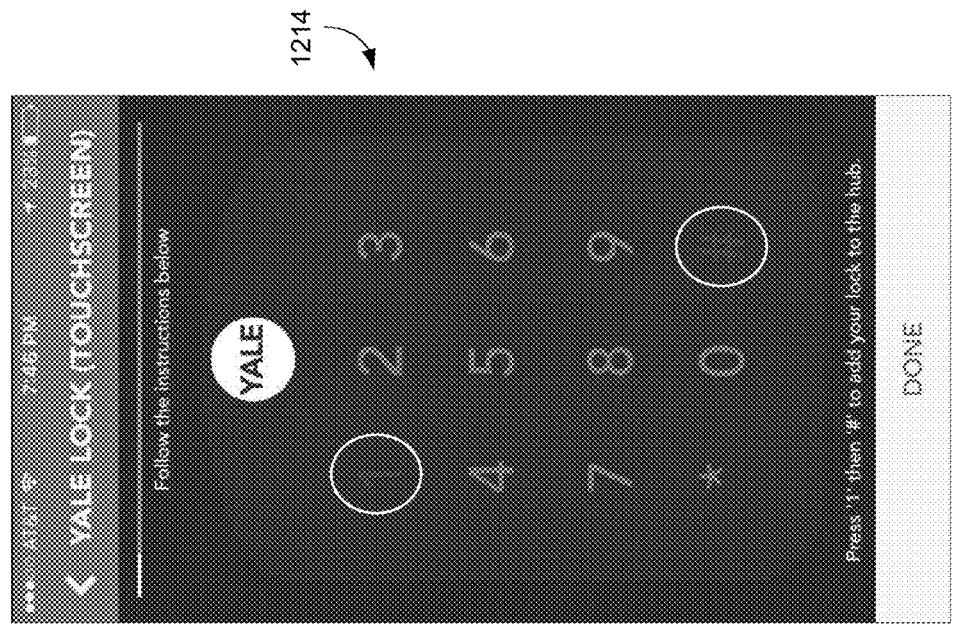
Figure 12F:
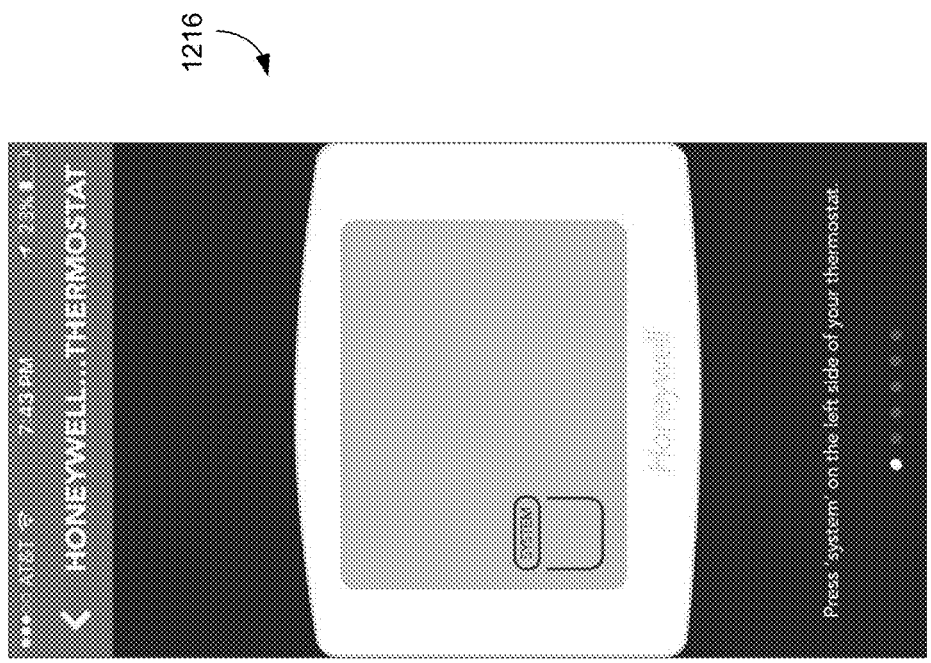
Figure 12F:
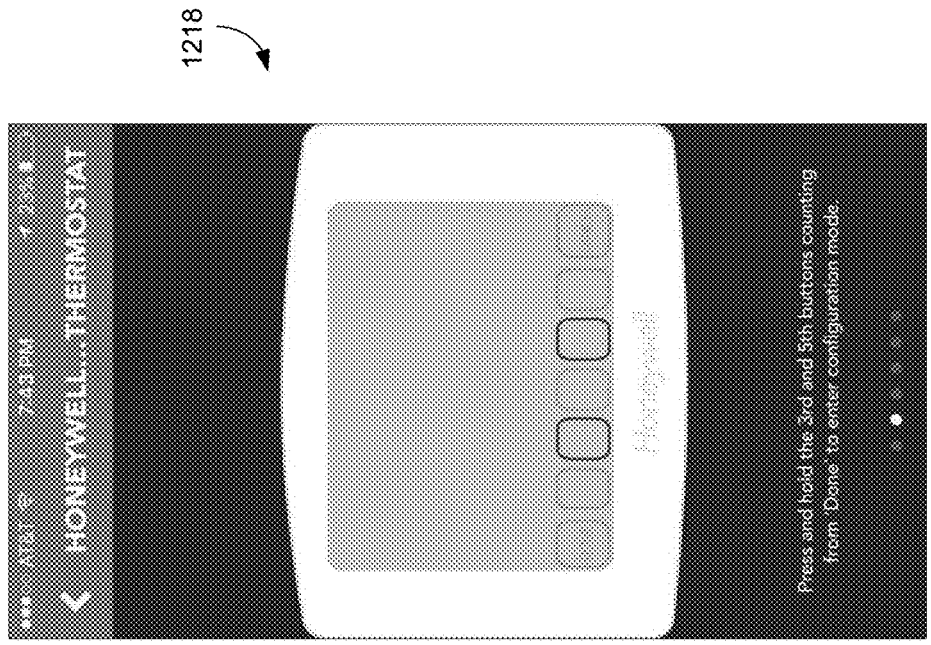
Figure 12G:
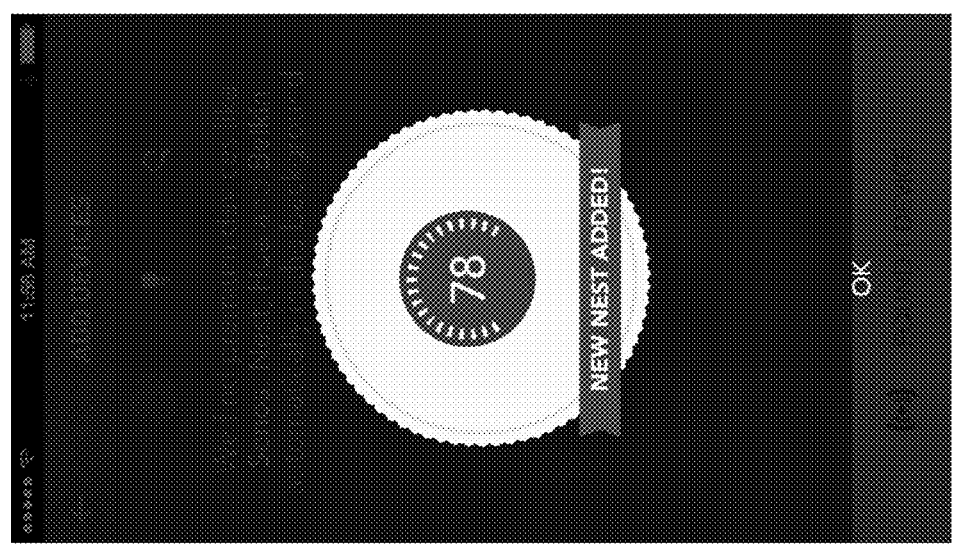
Figure 12G:
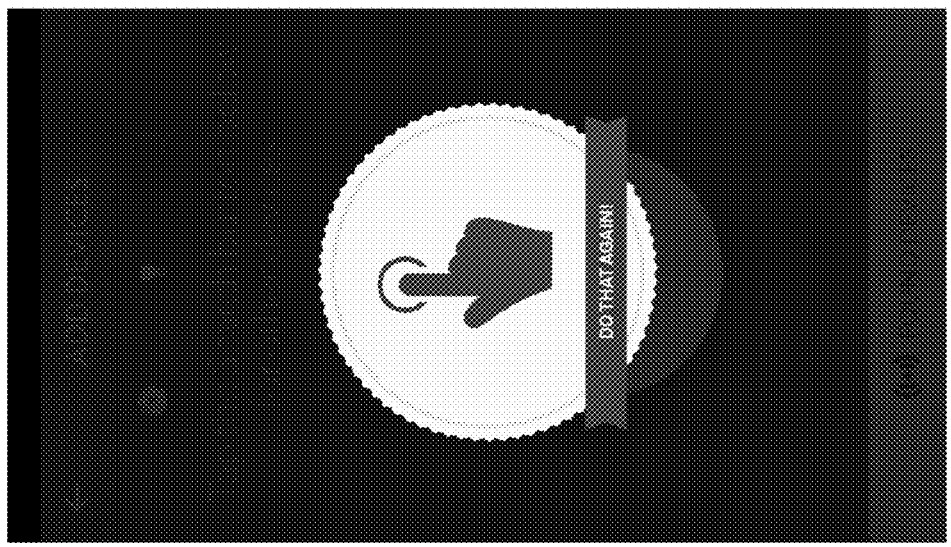

FIG. 10 illustrates graphic user interfaces (GUI) displayed for commissioning a hub and controlling smart devices that are communicatively coupled to the hub in accordance with some implementations. The GUIs allow a user to interact with the hub and monitor the commissioning/controlling status on the display of the client device 902. When the hub is commissioned, the GUIs are refreshed to display different interfaces for controlling smart devices that are coupled to the hub device 904 in different manners. Exemplary smart device control methods that are enabled by the GUIs include, but are not limited to, geo-information dependent smart device control (see FIG. 13), device location dependent device control (see FIG. 15), and timeline/event dependent device control (see FIGS. 14A and 14B).

FIGS. 11A-11G are example GUIs displayed for commissioning a hub in accordance with some implementations. Prior to commissioning a new hub device 904 for secure communication in the smart home environment, a user installs a client-side hub application associated with the hub device 904, registers a user account on the application, and logs onto the user account on the client device 902. A GUI display 1102 is used to remind the user that if she has the hub device 904 at her hand, the hub device 904 needs to be connected with a power outlet.

A GUI display 1104 is presented to the user for the purpose of coupling the user account to a hub device 904. As explained above with reference to FIG. 9, the hub device 904 has three possible statuses: new but available, not sold yet (i.e., need to buy from a hub provider), and existing. Three information items are displayed on the GUI display 1104 to allow the user to select the hub status associated with the hub device 904. If a first user action is received to commission an existing hub device, the GUI display 1106 is presented to prompt the user to enter a hub invite code provided by a hub owner out of the hub application. In some implementations, the user could send a hub link request to the hub owner to obtain the invite code within the hub application. If a second user action is received to buy a new hub, the GUI display 1108 is presented to allow the user to buy a new hub on site.

If a third user action is received to commission a new and available hub device 904, the GUI displays 1110, 1112 and 1114 are used to guide the user. Specifically, the example instructions include: "Hold your phone's FLASH a few inches above the hub's center," "Tilt Down," "We're busy doing science. Wait for the hub's light to Turn White" and "Tap if Hub Starts Blinks." The GUI displays 1110 also shows the commissioning status messages, such as "Engage Flashlink." For the purpose of commissioning the hub device 904, the GUI display 1116 prompts the user to enter the network credentials."

In some implementations, the client device 902 receives feedback signals from the hub device 904. Specifically, the hub device 904 includes one or more LED indicators. The GUI displays 1118-1126 requests a user input of the color of the one or more LED indicators the user observes, and uses the user's color input to determine whether the hub device 904 has been properly commissioned. For instance, if the color is yellow, the GUI display 1122 displays a warning message to check whether the user has inputted the network credentials correctly.

For a hub device (e.g., a hub device applied in a Revolv Home Automation System), an important part of the Revolv-based system was the process by which users added a smart device to their hub. The details of adding a device vary both with protocol and with each individual device but we tried to hide as much of this complexity as possible from the user.

The hub as originally released supported adding devices using the WiFi, Insteon and ZWave radios. The goal was to "magically" automatically discover all the smart devices the user has in their home, without requiring any action from the user. The devices would just appear in the Revolv app as soon as they were present in the home. The degree to which we achieved this goal varied by device.

Sonos, WeMo: With these devices we fully achieved our goal of no user action.

Hue, Nest: These devices were discovered automatically but user action was then required to complete the process. For Hue this action was pushing the button on the Hue bridge, for Nest this action was entering account details.

Insteon: These devices required the user to enter "add device" mode in the Revolv app, then push a button on the Insteon device.

Z-Wave: As with Insteon, then the Revolv app prompted the user to push the button on the device a second time to complete the process.

The hub used various mechanisms internally to achieve the user experience described above. Some of these were running in the background and some would only run when the hub was put into a discovery mode by a user going to the "add device" screen in the app. This discovery mode was shared by all protocols—the user did not need to select the protocol or type of the device they wanted to add.

On the WiFi radio, a background arp-scan was run periodically using the Linux tool arping to gather the MAC addresses of all devices on the WiFi network. These MAC addresses were then used to recognize supported device manufacturers. UPnP discovery was run periodically, and more frequently when in discovery mode. Periodically connect to device manufacturer's Internet servers (e.g., Philips Hue) to query devices in the home.

On the Insteon radio, when the hub is in discovery mode, send a "start link" message.

On the Z-Wave radio, the Z-Wave protocol normally requires the user to indicate whether they are adding (including) or removing (excluding) a device. To avoid our users having to make this protocol-specific decision, when the hub is in discovery mode, we put the Z-Wave radio in exclude mode. The hub then detects when the device has been excluded from its previous network, puts the Z-Wave radio in include mode, and prompts the user to interact with the device a second time to complete the inclusion process.

Our goal was to allow a device to be added without requiring the user to specify the device. However, we also provided a searchable list of supported devices with detailed instructions for adding each device. This was especially helpful for devices that required a series of buttons to be pressed, with a wizard in the Revolv app to walk the user through the steps, and put the hub into the correct mode for each step.

A hub device 904 (e.g., a Revolv Hub) is configured to connect to many existing devices on the market today, with new devices continuously being added. To add a new smart device via the hub device 904, a client-side application is executed on a client device 902, and provides user interfaces including on-screen instructions for commissioning the new smart device. In some situations, the user needs to locate the "join" button on the new smart device.

The client-side application also provides instructions for un joining the device from the hub device. In some implementations, a smart device cannot be completely unjoined from the client-side application. Optionally, the user can "hide" the smart device that has been joined from a Home screen (e.g., a dashboard user interface 1200 or an inventory user interface 1204) by un-starring it in the device list. In some implementations, the user deletes a smart device that has been joined from the client-side application by performing a Hub Reset function and making all smart devices that has been joined to start over again.

FIGS. 12A-12G are example GUIs displayed for adding and controlling smart devices (sometimes also called as sensors) that are communicatively coupled to a hub in accordance with some implementations. In accordance with these GUIs, smart devices associated with different device types and commissioning options can be conveniently added via consistent user interfaces on a client-side application (e.g., an application 826 implemented by a hub and device commissioning module 830 of a client-side module 502 of a client device 504 or 902). In addition, the user interfaces enabled by the client-side application only require a user to perform essential user interventions (e.g., pushing a button on a new smart device or entering identification information) for commissioning a new smart device on a particular communication network using a particular communication network. As such, the commissioning process facilitated by such user interfaces enables consistent and smooth user experience in view of the large number of device types and commissioning options that smart devices available on the market could have.

The GUI display 1200 is associated with a dashboard, and includes a plurality of icons each representing a smart device according to their location. The type of the device is reflected from each icon displayed on the GUI 1200. The user may click on the icon with "+" to add a new smart device, and the status for adding the smart device is monitored on another GUI display 1202. Optionally, GUI display 1202 includes another affordance (e.g., circled "ADD DEVICES"), and the user is prompted to click on this affordance for adding a new smart device.

Further, in some implementations, in accordance with the user interface 1204 associated with an inventory of smart devices, a user taps the FIND NEW DEVICES button at the bottom of the user interface 1204 to add a new smart device.

In some implementations, Revolv connects to three different categories of devices, and adding each has its own flow associated with a respective commissioning option of a plurality of commissioning options. Three different categories of devices include premium devices, simple devices and complex devices. An example user interface 1205 is displayed to the user of the client device, and includes three visual affordances: "PREMIUM," "SIMPLE," and "SEARCH." Optionally, the user interface 1205 also includes a notice message to the user, requesting the user to provide a user action on one of the three visual affordances to start scanning for new smart devices.

Alternatively, in some implementations, after the user selects "FIND NEW DEVICES" on the user interface 1204 or the "ADD DEVICES" affordance on the user interface 1202, the hub device receives a request for adding a new device. In response to the request, the hub device, automatically and without user intervention, starts to search for a new smart device and initialize a process for adding a new smart device in accordance with one of the plurality of commissioning options.

In some implementations, for a first commissioning option associated with simple devices, the user of the client device is prompted to tap an affordance (e.g., "SIMPLE" on a user interface 1206) to discover devices that need some sort of interaction to become visible. Then, a user interface 1208 is displayed to prompt one or more user interventions the completion of which is necessary for commissioning of the new smart device. The simple devices includes lights and outlets, but you also need to interact with most keypads and motion sensors to make them visible to our system. Interaction is easy and usually consists of turning the device on and off, or holding a "set" button somewhere on the device. The set button is often on the bottom of a device, or hidden in the battery compartment.

Alternatively, in some implementations, the hub device automatically discovers a new smart device, and determines that that new smart device is a simple device that needs to be added into the smart home environment. It is also noted that in some implementations, the hub device adds the new smart device into the smart home environment automatically and without user intervention after it identifies the new smart device.

The user interface 1208 or an analogous user interface is displayed to reset a smart home device or activate a new smart home device. In a specific example, the user interface 1208 is associated with a Z-Wave duplex receptacle or Z-Wave outlet both of which are optionally made by General Electric Company (GE). The user of the client device 902 is prompted to press and release the button in the center of an outlet. Optionally, the user is suggested to skip this intervention of pressing and releasing the button when a new smart device is involved. In another specific example associated with a Z-Wave wall switch made by GE, user interfaces are displayed to prompt the user connect a light switch or a working light bulb (switches without a neutral will need to have a working light bulb connected to be found). The user of the client device 902 is prompted to press either end of a main rocker switch. Optionally, the user is suggested to skip this intervention of pressing either end of the main rocker switch when a new smart device is involved.

For a second commissioning option associated with complex devices, one or more user interfaces (e.g., interfaces 1210, 1212 and 1214) are displayed to prompt one or more user interventions the completion of which is necessary for commissioning of many devices on the market that require a more complex setup process. For example, most locks require the user to sequentially enter a master code (as shown in the user interface 1210) and one or more function codes (as shown in the user interfaces 1212 and 1214). Some thermostats have a specific series of button presses required to make them visible. The user of the client device needs to tap a SEARCH tab and search for a device name of the new smart device to view device specific instructions right in the client-side application.

As devices are found, they will pop up in the list at the bottom of the screen, and are added to the Dashboard user interface 1200 and/or the inventory user interface 1204 automatically. If the user is unable to add the new device, the user is prompted to check the manufacturer's manual for additional instructions, and make sure that the new smart device functions correctly with any other applications or tools designed to work with it.

The user interface 1216 and 1218 are displayed to request user interventions for commissioning a complex smart device (e.g., a Z-Wave thermostat). The user interface 1206 prompts the user to press a "system" affordance disposed on the left side of the thermostat. The user interface 1218 further requests the user to enter a configuration code (e.g., by pressing and hold the third and fifth buttons from the left). In some implementations, a reset user interface is displayed to reset the thermostat if the thermostat has been used previously. Optionally, the user is instructed to skip this intervention of the reset user interface when a new smart device is involved. In some implementations, a user interface is displayed to prompt the user to enter a single digit or multiple digit code on a keypad of the thermostat, e.g., press down a button on the keypad until "0120" changes to "rF10," select "0" to remove, press down a button once until "0120" changes to "rF20," select "1" to add the new smart device, and press "done." As such, the thermostat is reset or linked with the hub device 904. This will allow the user to read the current temperature and state of the thermostat.

For a third commissioning option associated with Premium Devices, the user of the client device needs to tap PREMIUM on a user interface 1206 to start searching for premium devices. Examples of the premium devices include, but are not limited to, Sonos, Belkin WeMo, and Philips Hue devices. Then, a user interface is displayed to prompt one or more user interventions (e.g., user inputs of user account credentials associated with the new smart device) the completion of which is necessary for commissioning of the new smart device. In a specific example, Nest Thermostats and Protect requires the user of the client device to enter his or her Nest credentials in an affordance of ACCOUNTS accessible through a user interface path (e.g., Menu>Settings>ACCOUNTS).

As explained above, after receiving a user selection of one of the plurality of options, displaying one or more additional user interfaces prompting one or more user interventions, the completion of which is necessary for commissioning of the new smart device in accordance with the selected commissioning options. A list of specific example smart devices and their associated user interventions requested on the one or more additional user interfaces to reset or add these devices include:

(1). GE—Zwave Duplex Receptacle

Reset your device (Press and release the button in the center of the outlet. Skip if this device is new.)

Activate your device (Press and release the button in the center of the outlet.)

(2). GE—Zwave Outlet

Reset your device (Press and release the button in the center of the outlet. Skip if this device is new.)

Activate your device (Press and release the button in the center of the outlet.)

(3). GE—Zwave Wall Switch

Connect your light switch (Switches without a neutral will need to have a working light bulb connected to be found.)

Reset your device (Press either end of the main rocker switch. Skip if this device is new.)

Activate your device (Press either end of the main rocker switch.)

(4). Honeywell—Zwave Thermostat

Press "system" on the left side of your thermostat

Enter configuration mode (Press and hold the 3rd and 5th buttons counting from "Done")

Reset your device (The next few steps will walk you through resetting your device if it's been used previously. If it's new skip to the add device section.)

Press down until "0120" changes to "rF10" (The top of the screen will read "Select 0 to Remove".)

Select 0 to remove (If your thermostat isn't set up for a previous network skip this step.)

Activate your device (If you didn't reset your device, press down once until "0120" changes to "rF20".)

Select 1 to add (Your thermostat will be linked with your hub. We're practically there!)

Press done on your thermostat (This will allow us to read the current temperature and state of your thermostat.)

(5). Insteon—Appliance Linc

Activate your device (Hold down "set". The LED will flash twice.)

(6). Insteon—Lamp Linc

Activate your device (Hold down "set". The LED will flash twice and turn solid, and you'll hear a beep.)

(7). Insteon—Light bulb

Activate your device (Plug in your light bulb within 30 feet of your hub. You can move it further away after discovery is complete.)

(8). Insteon—Motion Sensor

Open the battery slot (You'll find a small black button inside, this is the "set" button.)

Hold down "set" (This will take about 5 seconds.)

Hold down "set" a second time (Wait until the sensor starts blinking red, about 3 seconds. Once it's blinking red, click next)

Almost there . . . (Once the sensor stops blinking red, you're done.)

(9). Insteon—Wall Switch

Activate your device (Easy! Hold down the small clear plastic button until you hear a beep.)

(10). Kwikset—Zwave Lock

Remove the top of your Kwikset (It will slide upwards and off)

Reset your device (Press and hold the small white button on the left. Skip if this device is new.)

Activate your device (Press and hold the small white button on the left.)

(11). Leviton—Vizia Appliance Module

Reset your device (Press and release the button on the outlet. Skip if this device is new.)

Activate your device (Press and release the button on the outlet.)

(12). Philips—Bridge

Connect your Philip's Hue Bridge (Make sure your Hue bridge is plugged into the wireless router that your hub uses, and your bulbs are joined to it.)

Activate your Hue Bridge (Press and release the button in the center of the bridge (13). Philips—Additional Bulb(s)

Connect additional Hue bulbs (Make sure your additional Hue bulb(s) are currently are plugged in and joined to the bridge.)

Activate your bulb(s) (Your new bulbs will be joined to the hub!)

(14). Sonos—Speaker

Connect your speaker (Plug your speaker into the wireless router that your hub uses Set up your playlist from the Sonos application (You'll be able to play/pause and control volume from Revolv.)

(15) Sonos—Bridge

Connect your bridge

Plug your speaker into the wireless router that your hub uses (You'll be able to play/pause and control volume from Revolv.)

(16). Trane—Thermostat

Press "menu" and select "zwave install" (Don't begin the add/remove process until you tap next.)

Reset your device (The next few steps will walk you through resetting your device if it's been used previously. If it's new skip to the add device section.)

Press "up" to remove your thermostat from its current network (If your thermostat isn't set up for a previous network skip this step.)

(17). Activate your device

Select "zwave install" a second time

Press "up" to add your thermostat (Almost there . . . )

(18). Yale—Lock (Buttons)

Enter your master code and press "#" (Welcome to "Menu Mode".)

Press "7" then "#" (Pop and lock baby.)

Press "2" then "#" (This will unlink your lock from any old networks.)

Enter your master code and press "#" (Repetition breeds success.)

Press "7" then "#" (This seems so familiar.)

Press "1" then "#" (This adds your lock to the Revolv hub!)

(19). Yale—Lock (Touchscreen)

Enter your master code and press "#" (Welcome to "Menu Mode".)

Press "7" then "#" (Pop and lock baby.)

Press "3" then "#" (This will unlink your lock from any old networks.)

Enter your master code and press "#" (Repetition breeds success.)

Press "7" then "#" (This seems so familiar.)

Press "1" then "#" (This adds your lock to the Revolv hub!)

When a smart device (e.g., a Nest thermostat) is successfully commissioned, a user interface 1220 is displayed to indicate that the new smart device is commissioned. On the other hand, if an error occurs and interrupts the commissioning process, a user interface 1222 is displayed to request a user input to determine whether to initiate anther commissioning process on the same smart device.

Figure 13:
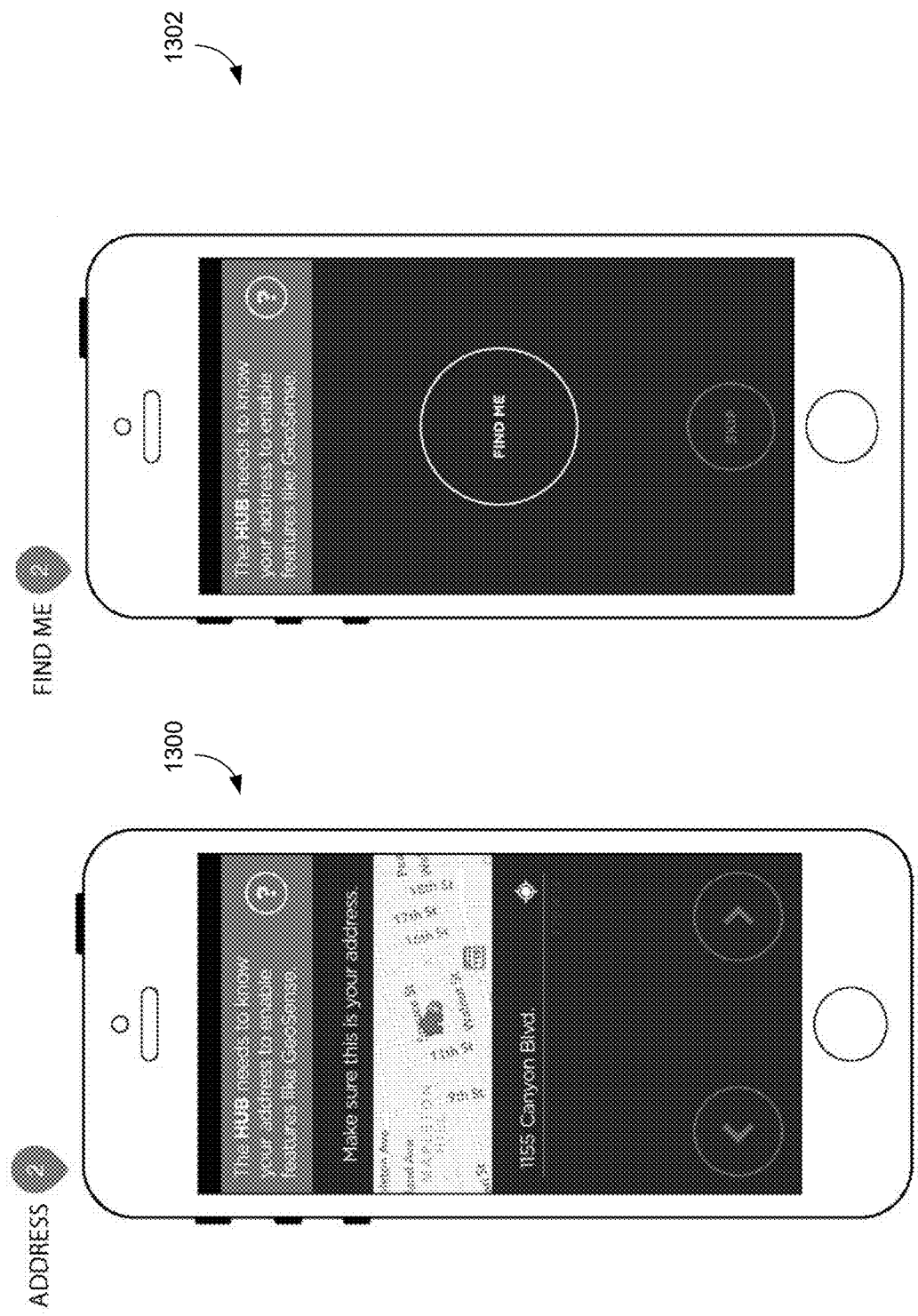
FIG. 13 illustrates example GUIs displayed for controlling sensors based on geographical information provided by a client device in accordance with some implementations.

FIG. 13 illustrates example GUIs displayed for controlling sensors based on geographical information provided by a client device in accordance with some implementations. The hub device 904 can uses the geographic information of the user to control the smart devices smartly. The GUI displays 1300 and 1302 prompt the user to enter location information, and confirm the location information by displaying a map marked with the location indicated by the location information. Optionally, such location information could be used to monitor whether the user is closed to the smart home environment and calculate sunset/sunrise times for geo-information dependent sensor control.

Figure 14A:
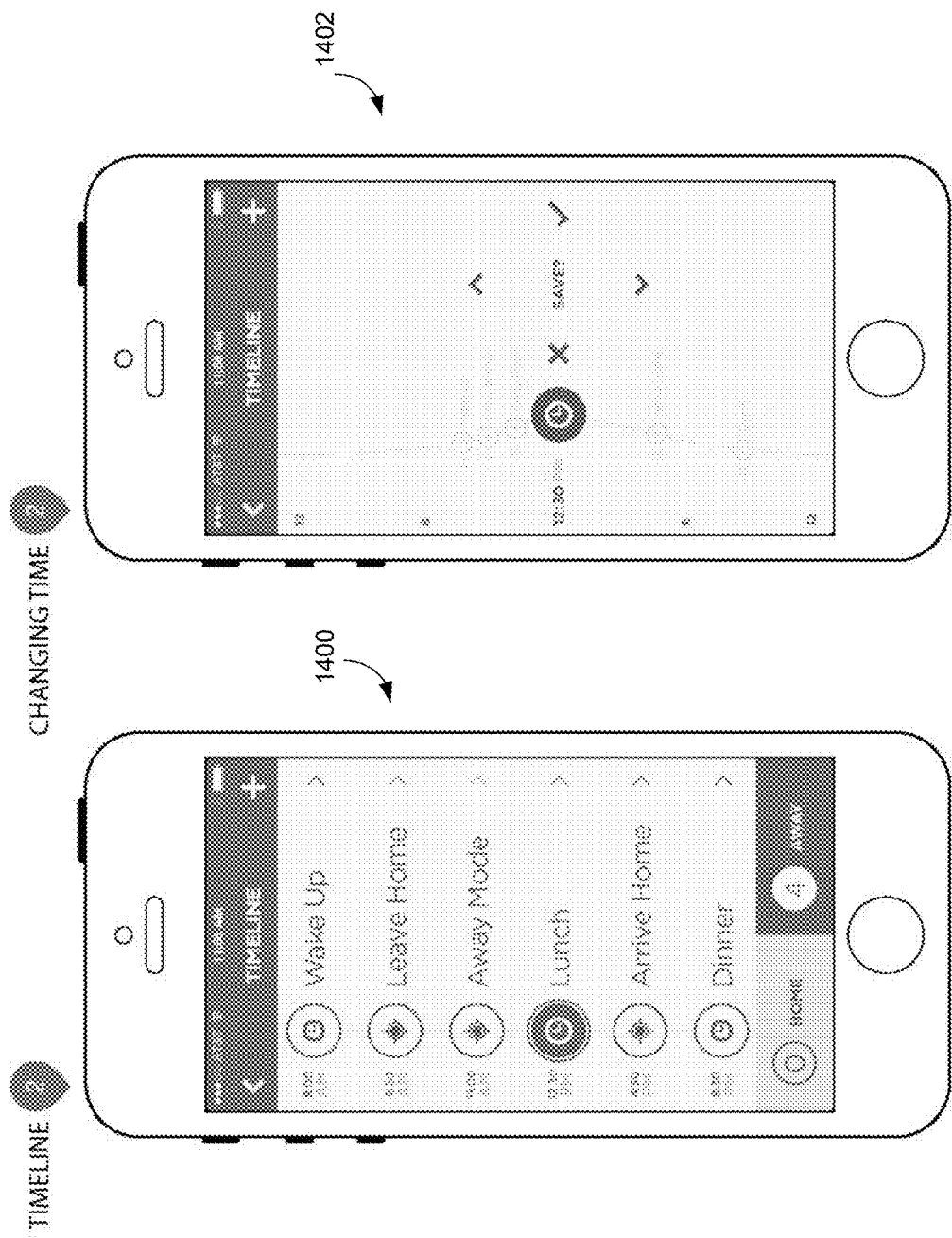
FIGS. 14A and 14B illustrate example GUIs displayed for controlling sensors based on a sequence of events in a user's daily life in accordance with some implementations.
Figure 14B:
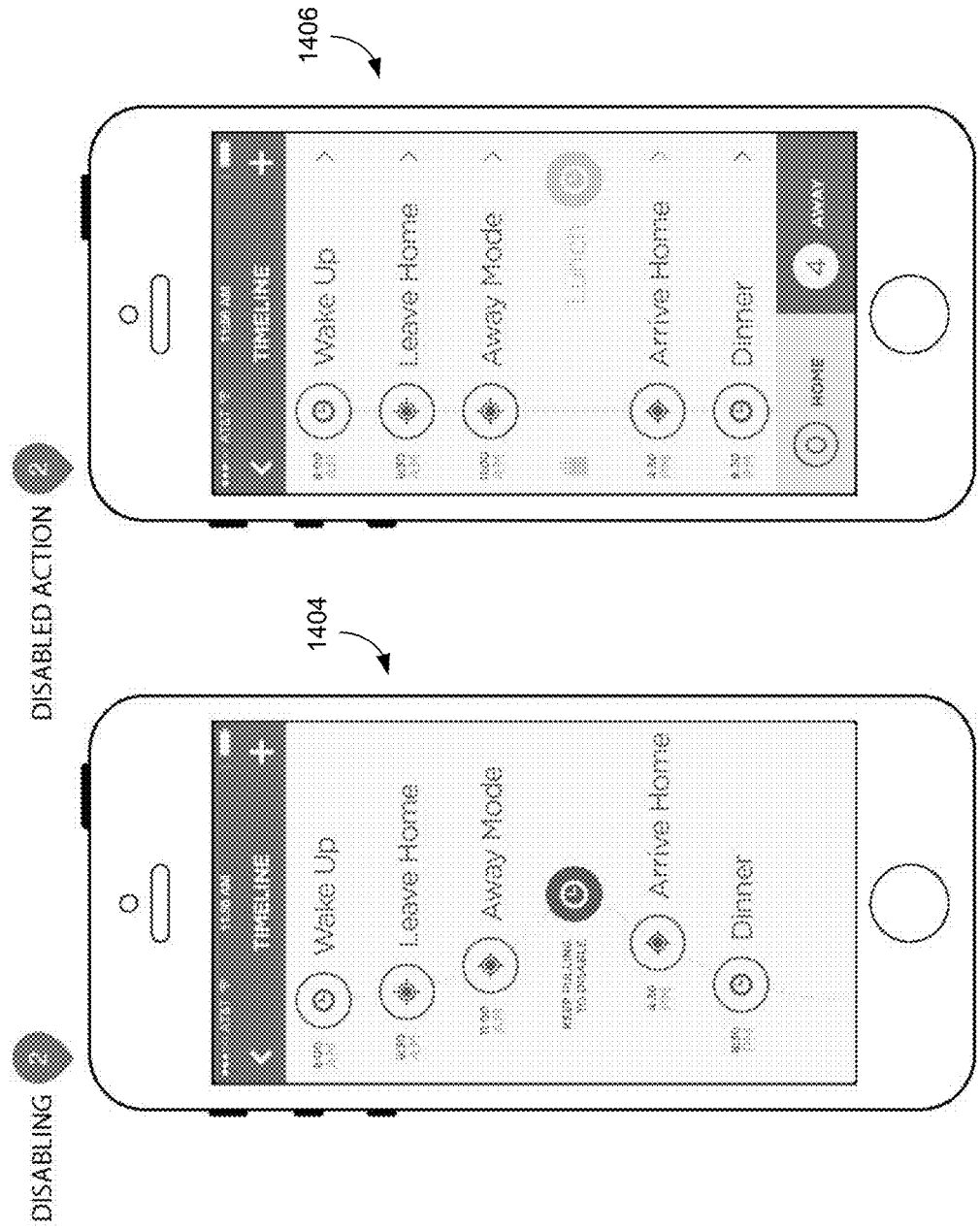

FIGS. 14A and 14B illustrate example GUIs displayed for controlling sensors based on a sequence of events in a user's daily life in accordance with some implementations. The GUI displays 1400-1406 allow a user to manage multiple sensors on a universal hub application according to the timeline or events in the user's daily life.

Figure 15A:
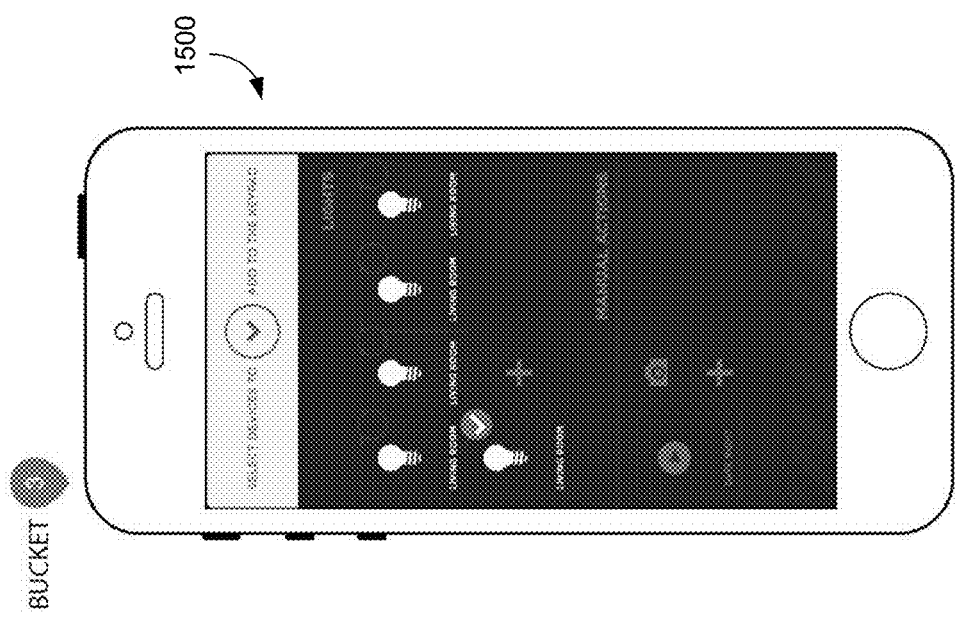
FIGS. 15A and 15B illustrate example GUIs displayed for controlling sensors based on their physical locations in a smart home environment in accordance with some implementations.
Figure 15B:
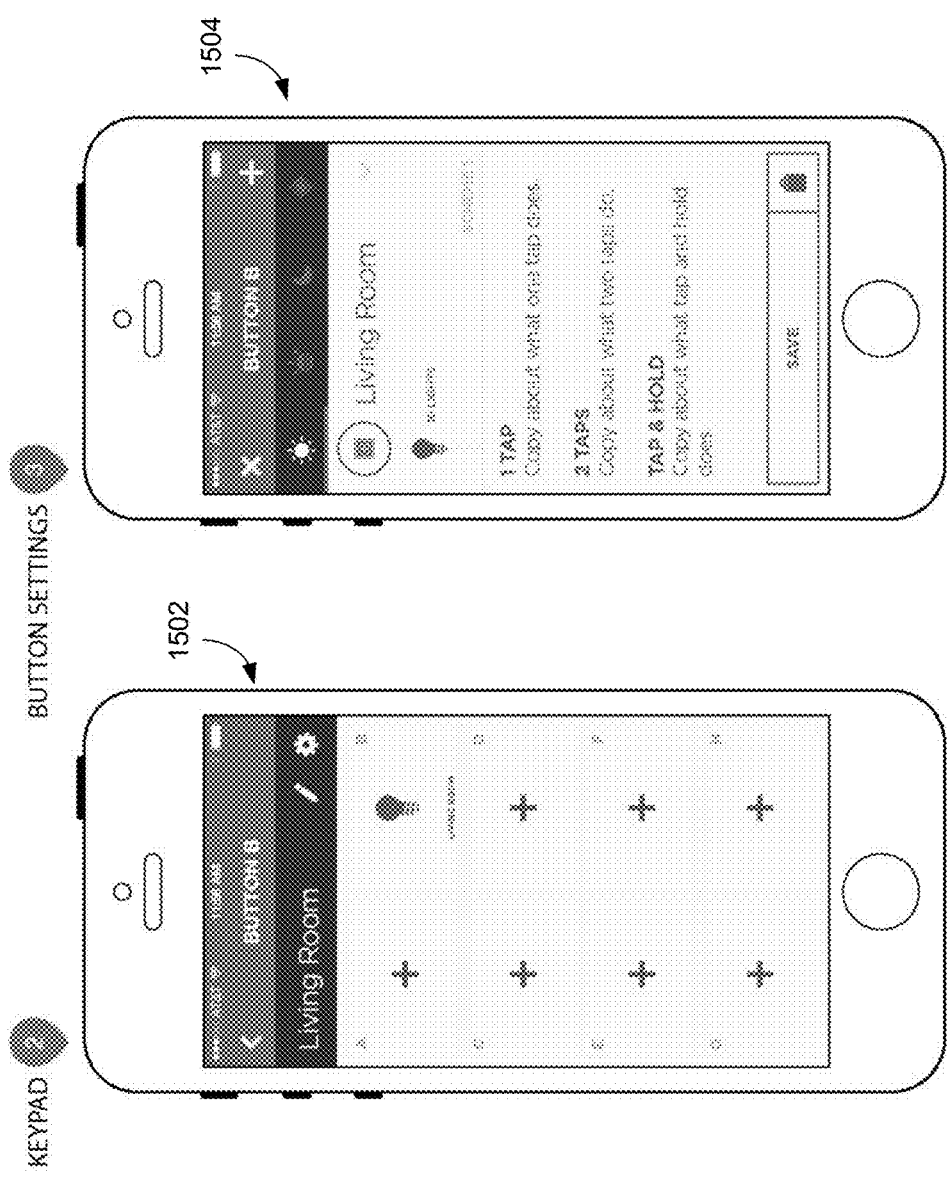

FIGS. 15A and 15B illustrate example GUIs displayed for controlling sensors based on their physical locations in a smart home environment in accordance with some implementations. The GUI displays 1400-1406 allow a user to manage multiple sensors on a universal hub application according to their specific locations at the smart home environment.

It should be understood that the particular order in which the operations in FIGS. 15A and 15B have been described are merely example and are not intended to indicate that the described order is the only order in which the operations could be performed. One of ordinary skill in the art would recognize various ways to implement the same method as described herein. Additionally, it should be noted that details of other processes described herein with respect to method 1500 (e.g., FIG. 15) are also applicable in an analogous manner to method 1200, 1300 and 1400 described above with respect to FIGS. 12A-12G, 13 and 14A and 14B, respectively. For brevity, these details are not repeated here.

Figure 16:
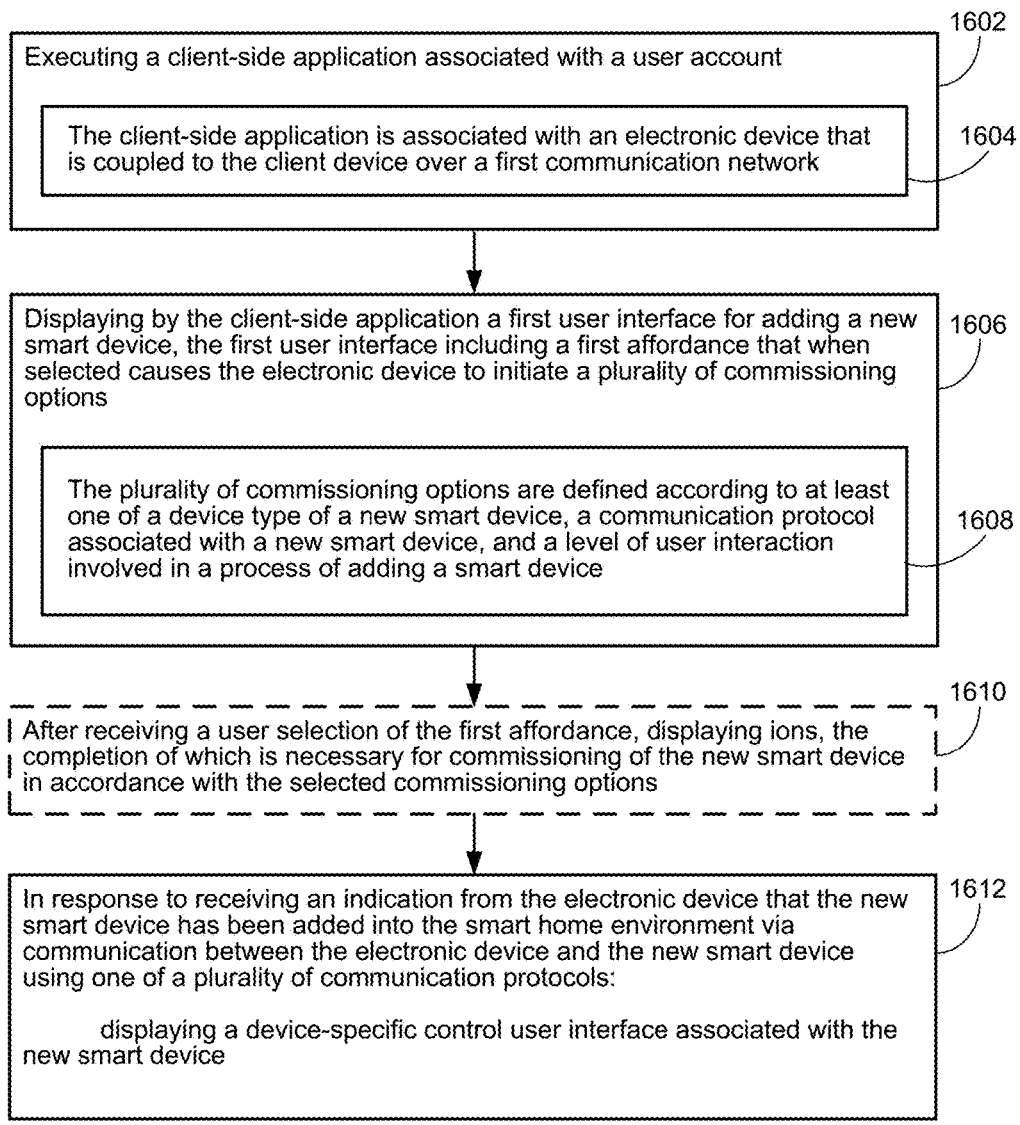
FIG. 16 is a flow chart for an example method of adding a smart device to a smart home environment in accordance with some implementations of the application.

FIG. 16 is a flow chart for an example method 1600 of adding a smart device (e.g., smart devices 204 or 522) to a smart home environment 100 in accordance with some implementations of the application. The method 1600 is implemented at a client device (e.g., the client device 902) having one or more processors and memory storing one or more programs for execution by the one or more processors. The client device executes (1602) a client-side application associated with a user account. The client-side application is (1604) associated with an electronic device that is coupled to the client device over a first communication network. The client-side application displays (1606) a first user interface for adding a new smart device. The first user interface includes a first affordance that when selected causes the electronic device to initiate a plurality of commissioning options. In some implementations, the client device sends to the electronic device a user request to search for a new smart device in the smart home environment. In some situations, the client device automatically identifies a commissioning option for the new smart device, and adds the new smart device in the smart home environment without user intervention.

The plurality of commissioning options are defined (1608) according to at least one of a device type of a new smart device, a communication protocol associated with a new smart device, and a level of user interaction involved in a process of adding a smart device. In some implementations, after receiving a user selection of the first affordance, the client device displays (1610) one or more additional user interfaces prompting one or more user interventions, the completion of which is necessary for commissioning of the new smart device in accordance with the selected commissioning options. However, user interventions are not necessary. In some implementations, after receiving a user selection of the first affordance, the client device identifies a new mart device and adds it to the smart home environment automatically and without user intervention.

Further, the client device displays (1612) a device-specific control user interface associated with the new smart device in response to receiving an indication from the electronic device that the new smart device has been added into the smart home environment via communication between the electronic device and the new smart device using one of a plurality of communication protocols. In some implementations, to display the device-specific control user interface associated with the new smart device, the client device obtains device information, and displays the device information on the device-specific control user interface. Optionally, the device information includes at least one of a device name, a location, and descriptive information of the new smart device.

In some implementations, an inventory of the smart home environment is displayed on the first user interface, and the first user interface further includes a plurality of second visual affordances each associated with a respective smart device that has been installed in the smart home environment. After commissioning of the new smart device, the client device displays on the first user interface the plurality of second visual affordances refreshed to include a third visual affordance that represents the new smart device.

In some implementations, the plurality of commissioning options includes a first commissioning option associated with simple smart devices, In accordance with the first commissioning option, the client device displays on the one or more additional user interfaces an instruction to the user of the client device to instruct the user to press a button on the new smart device. Further, in some implementations, the instruction is displayed to instruct the user to press one of a power button, a set button, and a motion sensor button on the new smart device.

In some implementations, the plurality of commissioning options includes a second commissioning option associated with complex smart devices. After the new smart device is identified, the client device generates a sequence of instructions to guide the user to install the new smart device according to a manufacturer predetermined commissioning procedure. The sequence of instructions is optionally displayed on the on the one or more additional user interfaces. The sequence of instructions include a first instruction that instructs the user to select a configuration mode on a keypad of the new smart device, and a second instruction that instructs the user to enter one or more codes on the keypad. Alternatively, in some implementations, the new smart device is an electronic lock, and the sequence of instructions are configured to instruct the user to enter a master code on a keypad of the lock.

In some implementations, the plurality of commissioning options includes a third commissioning option associated with premium smart devices. In accordance with the third commissioning option, the client device generates a request for user inputs of user account credentials associated with the new smart device. Alternatively, in some implementations, the new smart device is associated with a new smart device application that is distinct from the client-side application, and the user account credentials associated with the new smart device are used to access a corresponding user account of the new smart device application.

In some implementations, the client device causes the electronic device to establish communication with the new smart device over one or the one or more second communication networks that are distinct from the first communication network. Specifically, in some implementations, the one or more second communication networks are implemented based on at least one communication protocol of a group consisting of Insteon, IEEE 802.15.4, Wi-Fi, ZigBee, 6LoWPAN, Thread, Z-Wave, Bluetooth Smart, Bluetooth Low Energy, ISA100.11a, WirelessHART, MiWi, OSIAN, Ethernet, and HomePlug.

In some implementations, the new smart device has been associated with another user account of the client-side application, or commissioned to communicate with another hub device in another smart home environment.

Another aspect of the application is directed to a client device including one or more processors, and memory storing one or more programs for execution by the one or more processors. The one or more programs include instructions causing the one or more processors to implement the method 1600 for adding a new smart device. Further, another aspect of the application includes non-transitory computer-readable storage medium storing one or more programs for execution by one or more processors of a client device. The one or more programs include instructions causing the one or more processors to implement the method 1600 for adding a new smart device. Specifically, for both the client device and the non-transitory computer-readable storage medium, the one or more programs include at least a client-side application 826 and a device addition module 832 that function together to add a new smart device in the smart home environment.

More details on the user interface perspective of the method 1600 for adding a new smart device in a smart home environment are explained above with reference to FIGS. 12A-12G.

Figure 17:
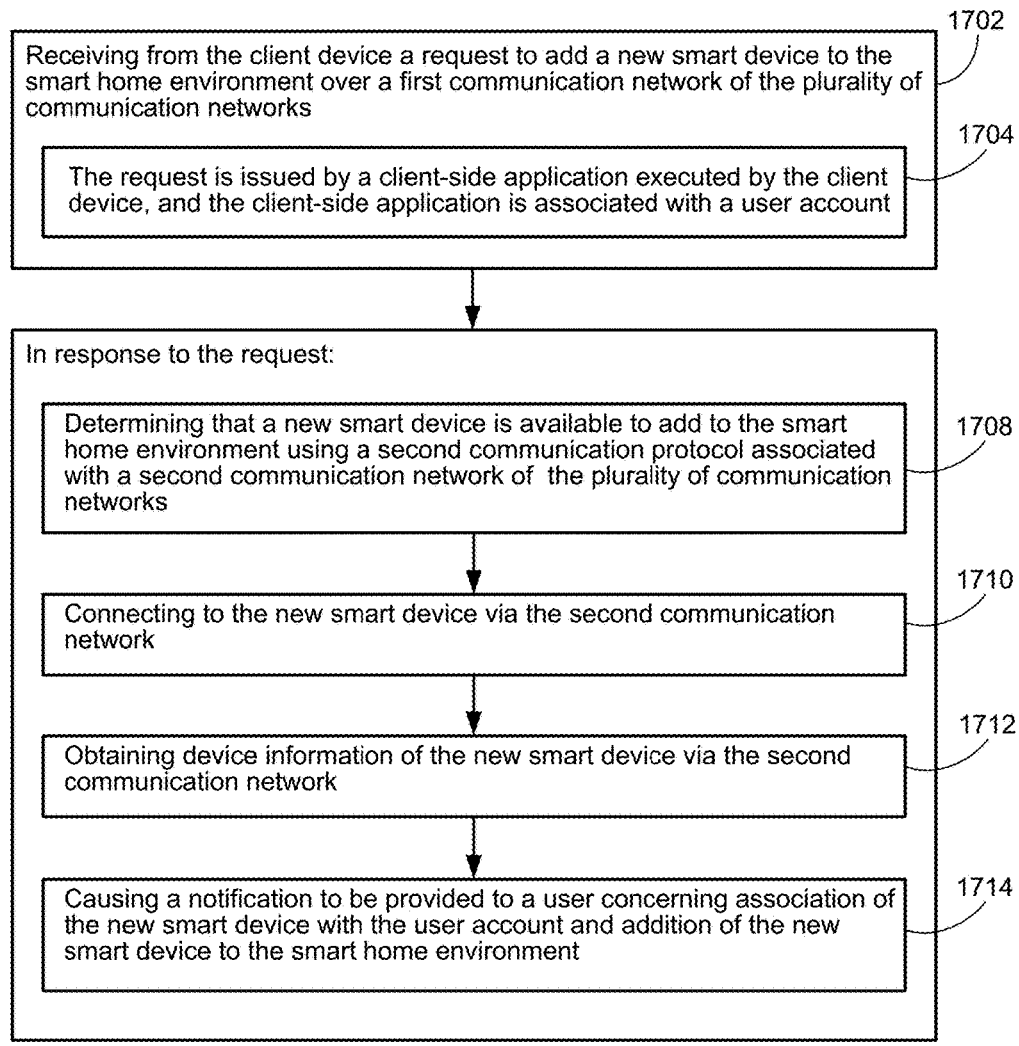
FIG. 17 is a flow chart for another example method of adding a smart device to a smart home environment in accordance with some implementations of the application.

FIG. 17 is a flow chart for another example method 1700 of adding a smart device (e.g., smart devices 204 or 522) to a smart home environment 100 in accordance with some implementations of the application. The method 1700 is implemented at an electronic device (e.g., a hub device 180 or 904, or a smart device having a capability) having one or more processors and memory storing one or more programs for execution by the one or more processors. The electronic device is configured to communicate with a client device (e.g., a client device 504 or 902) and a plurality of smart devices through a plurality of communication networks 162. In some implementations, the new smart device is one of a camera, a duplex receptacle, a wall switch, a smart light bulb, a thermostat, a smart power outlet, a motion sensor, an electronic lock, an appliance module, a hue bridge, an audio device and a security device.

The electronic device receives (1702) from the client device a request to add a new smart device to the smart home environment 100 over a first communication network of the plurality of communication networks 162. The request is issued (1704) by a client-side application executed by the client device, and the client-side application is associated with a user account.

In response to the request, the electronic device determines (1708) that a new smart device is available to add to the smart home environment using a second communication protocol associated with a second communication network of the plurality of communication networks. In some implementations, prior to determining the new smart device is available, the electronic device scans a subset of the plurality of communication networks for a new smart device in a substantially simultaneous manner, and the subset of the plurality of communication networks includes the second communication network.

Further, in response to the request, the electronic device connects (1710) to the new smart device via the second communication network, obtains (1712) device information of the new smart device via the second communication network, and causes (1714) a notification to be provided to a user concerning association of the new smart device with the user account and addition of the new smart device to the smart home environment. In some implementations, the electronic device provides the device information to a server for the association of the new smart device with the user account. In some implementations, the device information of the new smart device includes one or more of a device type, a device identification, one or more device features, device settings, and descriptive information of the new smart device.

In some implementations, the second communication protocol associated with the second communication network includes one of a group consisting of Insteon, IEEE 802.15.4, Wi-Fi, ZigBee, 6LoWPAN, Thread, Z-Wave, Bluetooth Smart, Bluetooth Low Energy, ISA100.11a, WirelessHART, MiWi, OSIAN, Ethernet, and HomePlug. In some implementations, the second communication network is a short range communication network, and distinct from the first communication network.

In some implementations, the second communication network is a WiFi local area network. The electronic device determines that a new smart device is available to add to the smart home environment by starting a WiFi device search, scanning for one or more predetermined MAC address prefixes, and causing a user interface displayed on the client device for prompting the user to press a button on the new smart device. Alternatively, in some implementations, In some implementations, the electronic device determines that a new smart device is available to add to the smart home environment by starting a WiFi device search, broadcasting one or more requests for a discovery protocol (e.g., simple service discovery protocol (SSDP)), and receiving a response from the new smart device. Optionally, the response from the new smart device includes device type information of the new smart device. More details on a unified pairing process for adding a new smart device based on a WiFi protocol is explained as below with reference to FIG. 18.

In some implementations, the second communication network is based on a point-to-point communication protocol (e.g., Thread and Bluetooth) or a Z-Wave protocol. The electronic device determines that a new smart device is available to add to the smart home environment by at least causing display of a user interface on the client device for prompting the user to press a button on the new smart device. Further, in some implementations based on the Z-Wave protocol, the electronic device obtains the device information of the new smart device via the second communication network by causing another user interface displayed on the client device for prompting the user to press the button on the new smart device for a second time. More details on a unified pairing process for adding a new smart device based on a Z-Wave protocol is explained as below with reference to FIGS. 20A-20D.

In some implementations associated with a point-to-point communication protocol, the electronic device obtains device information of the new smart device via the second communication network at least by receiving a pairing request from the new smart device, and determining that the new smart device is a slave device associated with one or more point-to-point protocols. Then, the electronic device responds to the pairing request by sending a pairing confirmation to the slave device. Alternatively, in some implementations associated with a point-to-point communication protocol, the electronic device obtains the device information of the new smart device via the second communication network by receiving a group indicator sent by the new smart device; in response to the group indicator, determining that the new smart device is a controller device associated with one or more point-to-point protocols, and broadcasting a pairing request; and receiving from the new smart device a pairing confirmation in response to the pairing request. More details on a unified pairing process for adding a new smart device based on a point-to-point protocol is explained as below with reference to FIG. 19.

Another aspect of the application includes an electronic device that is configured to communicate with a client device and a plurality of smart devices through a plurality of communication networks. The electronic device includes one or more processors, and memory storing one or more programs for execution by the one or more processors, and the one or more programs include instructions causing the one or more processors to implement the method 1700 for adding a new smart device.

Further, another aspect of the application includes non-transitory computer-readable storage medium storing one or more programs for execution by one or more processors of an electronic device. The one or more programs include instructions causing the one or more processors to implement the method 1700 for adding a new smart device. Specifically, for both the electronic device and the non-transitory computer-readable storage medium, the one or more programs include a device addition interface module 6244 and a device addition module 622 that function together to add a new smart device in the smart home environment.

It should be understood that the particular order in which the operations in FIGS. 16 and 17 have been described are merely example and are not intended to indicate that the described order is the only order in which the operations could be performed. One of ordinary skill in the art would recognize various ways to implement the respective smart device adding method as described herein. Additionally, it should be noted that details of other processes described herein with respect to method 1600 (e.g., FIG. 16) or method 1700 (e.g., FIG. 17) are also applicable in an analogous manner to the other methods discussed in this application. For brevity, these details are not repeated here.

Figure 18:
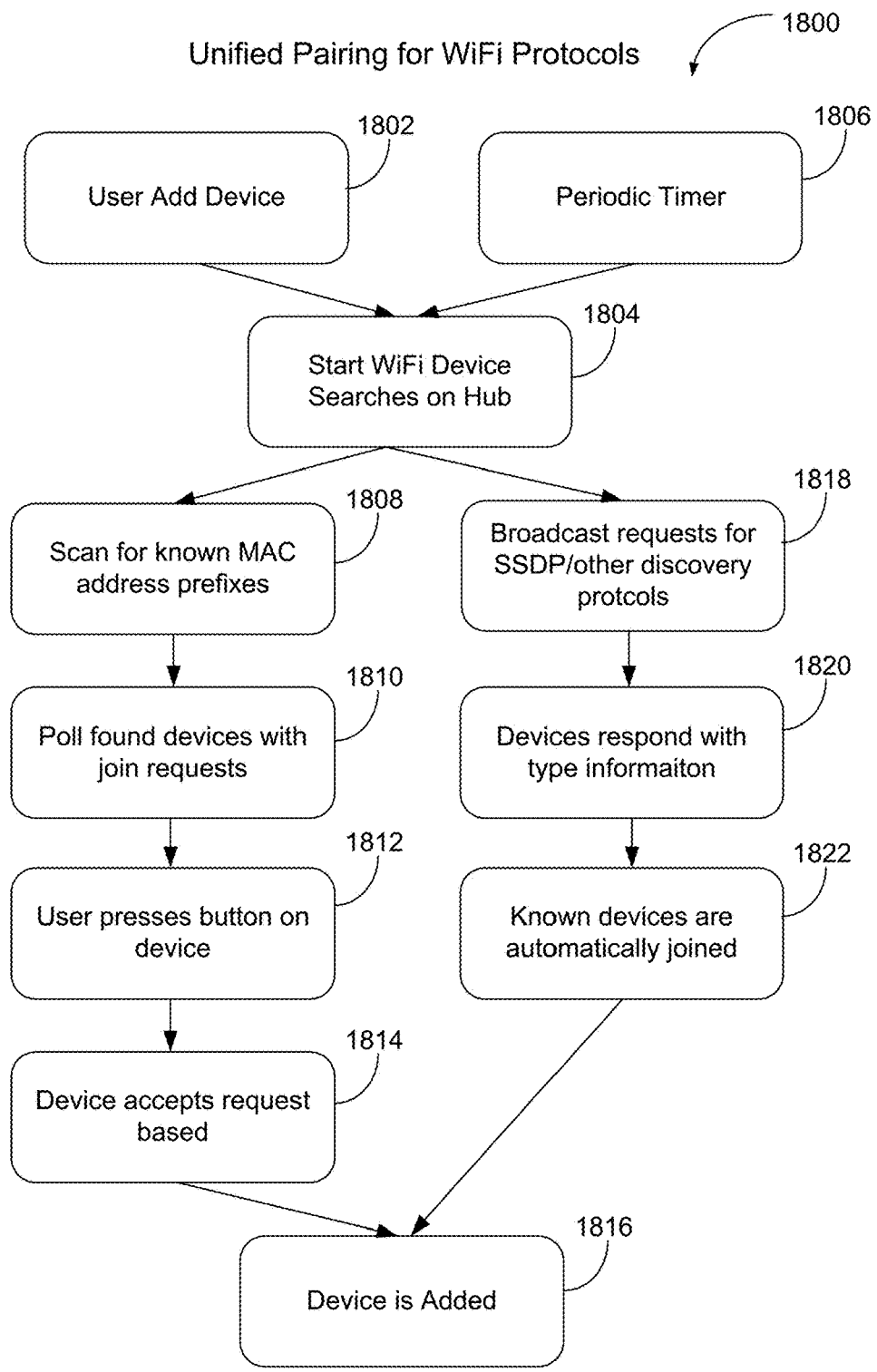
FIG. 18 is a flow chart for an example method of adding a smart device that communicates based on a WiFi protocol in accordance with some implementations of the application.

FIG. 18 is a flow chart for an example method 1800 of adding a smart device that communicates based on a WiFi protocol in accordance with some implementations of the application. In some implementations, a client-side application 826 is executed at a client device 902 in association with a user account. The client-side application 826 is associated with an electronic device (e.g., a hub device 904 or an existing smart device) that is coupled to the client device 902 over a first communication network, and the electronic device is coupled to one or more smart devices over one or more second communication networks (e.g., a WiFi network). The client-side application enables a display of a user interface for adding a new smart device, and receives (1802) on the user interface user instructions of adding a new smart device according to one of a plurality of commissioning options. Specially, in accordance with the method 1800 of adding the new smart device, the selected commissioning option is defined to support a commissioning process that are compatible with one or more communication protocols including a WiFi protocol, such that a new smart device that can communicate based on the WiFi network would be successfully commissioned according to the selected commissioning option. Here, after a hub device receives from the client device 902 the user instructions of adding a new smart device according to the selected commissioning option, it starts (1804) a search for a new WiFi-based smart device. Alternatively, in some implementations, the hub device initializes (1806) a search for a new WiFi-based smart device periodically.

In some implementations, the hub device scans (1808) for predetermined MAC address prefixes. When a predetermined MAC address prefix is identified in association with a new smart device, the hub device polls (1810) the identified smart device with a join request that requests to add the new smart device into a smart home environment associated with the hub device. On the client-side application, the user makes the joint request, and the join request optionally includes a request for a user intervention (e.g., pressing a button on the new smart device). When the user intervention occurs (1812) and the new smart device accepts (1814) the join request, the new smart device is added (1816) to the smart home environment.

In some implementations, the hub device broadcasts (1818) requests for a simple service discovery protocol (SSDP) or other discovery protocols. In response to receiving the request, the new smart device responds (1820) with information concerning its device type. The hub device determines (1822) that the device type is known and automatically joins (1816) the new smart device in the smart home environment.

Figure 19:
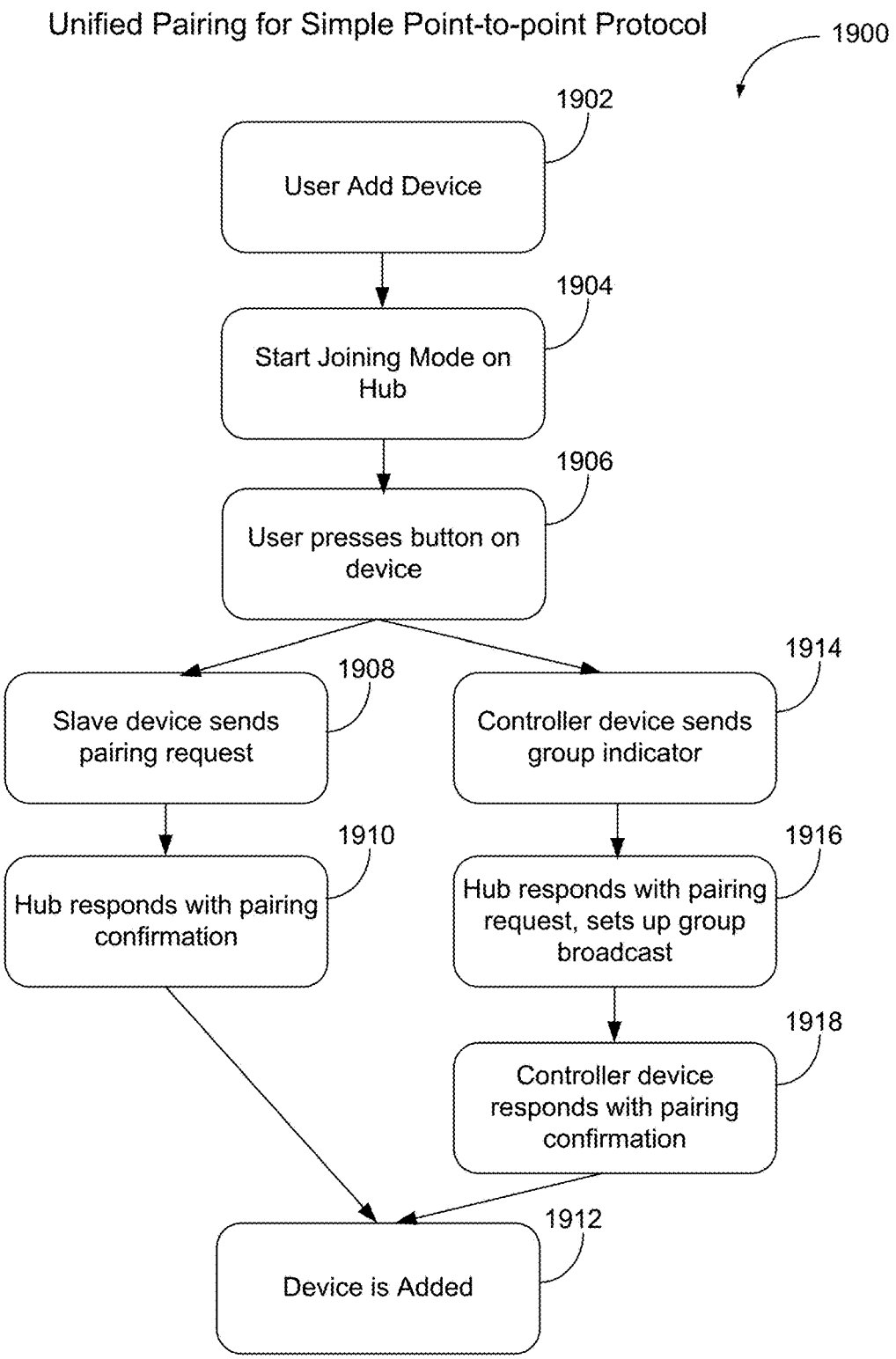
FIG. 19 is a flow chart for an example method of adding a smart device that communicates based on a point-to-point protocol in accordance with some implementations of the application.
Figure 20A:
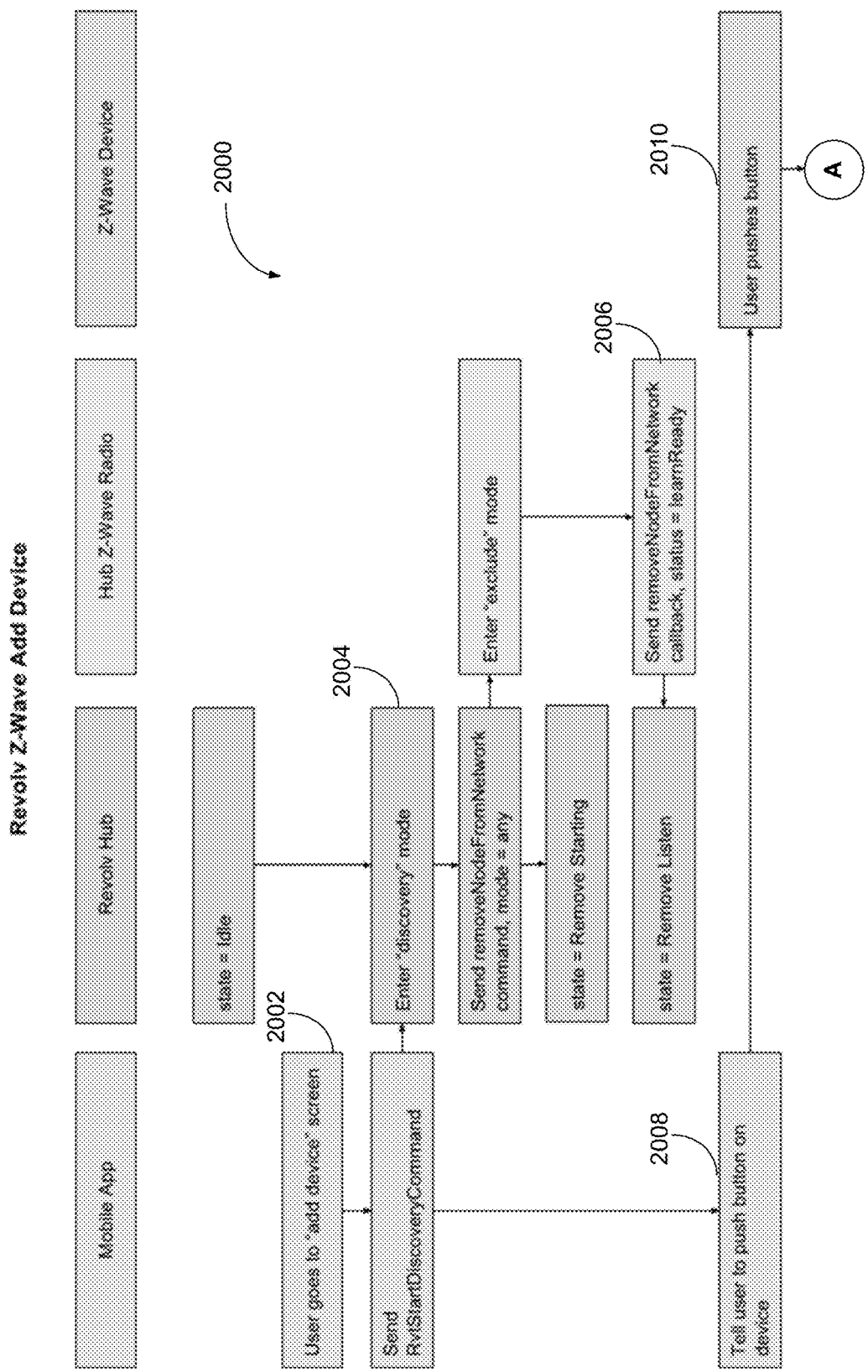
FIGS. 20A-20D is a flow chart for a method of adding a smart device that communicates based on a Z-Wave protocol in accordance with some implementations of the application.
Figure 20B:
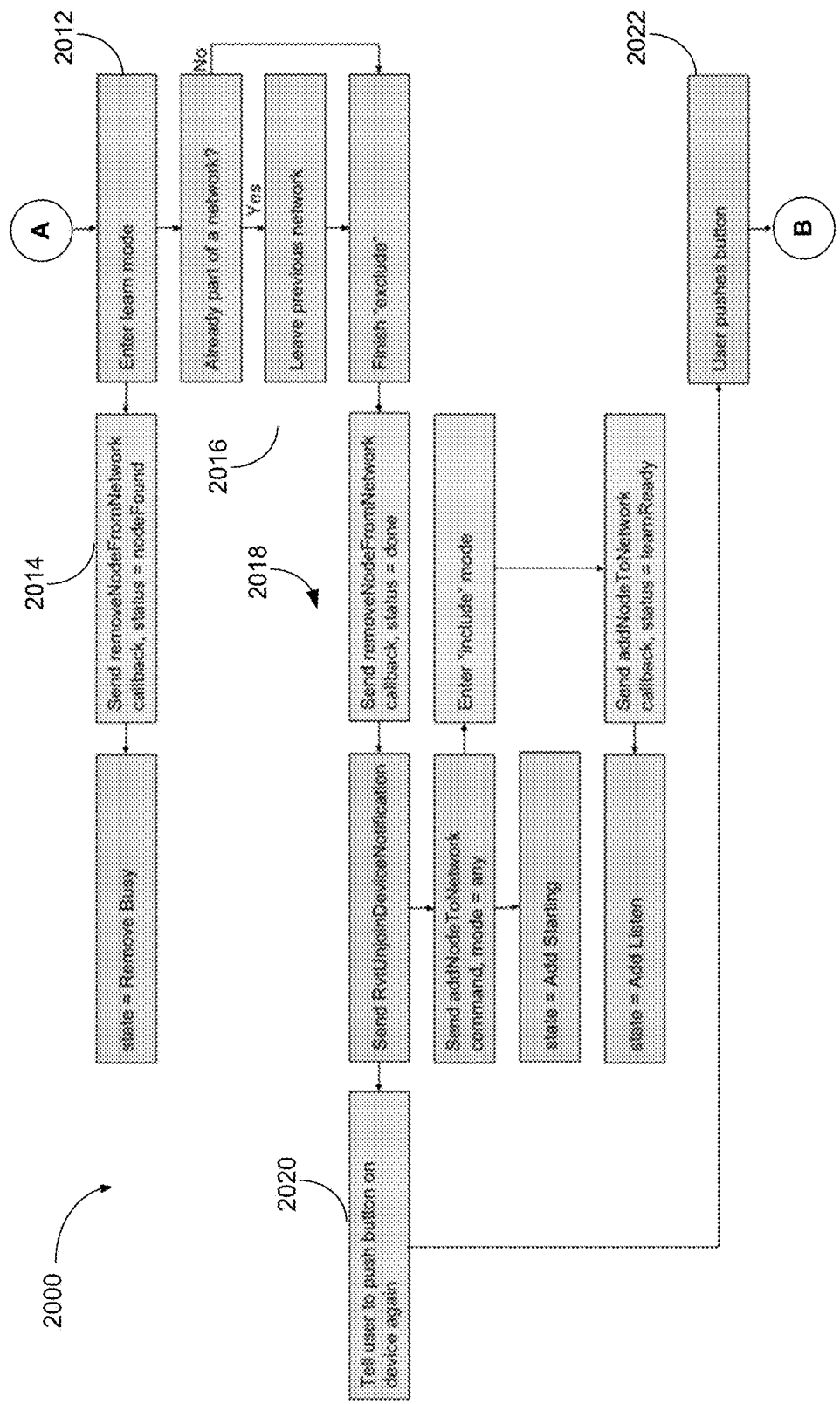
Figure 20C:
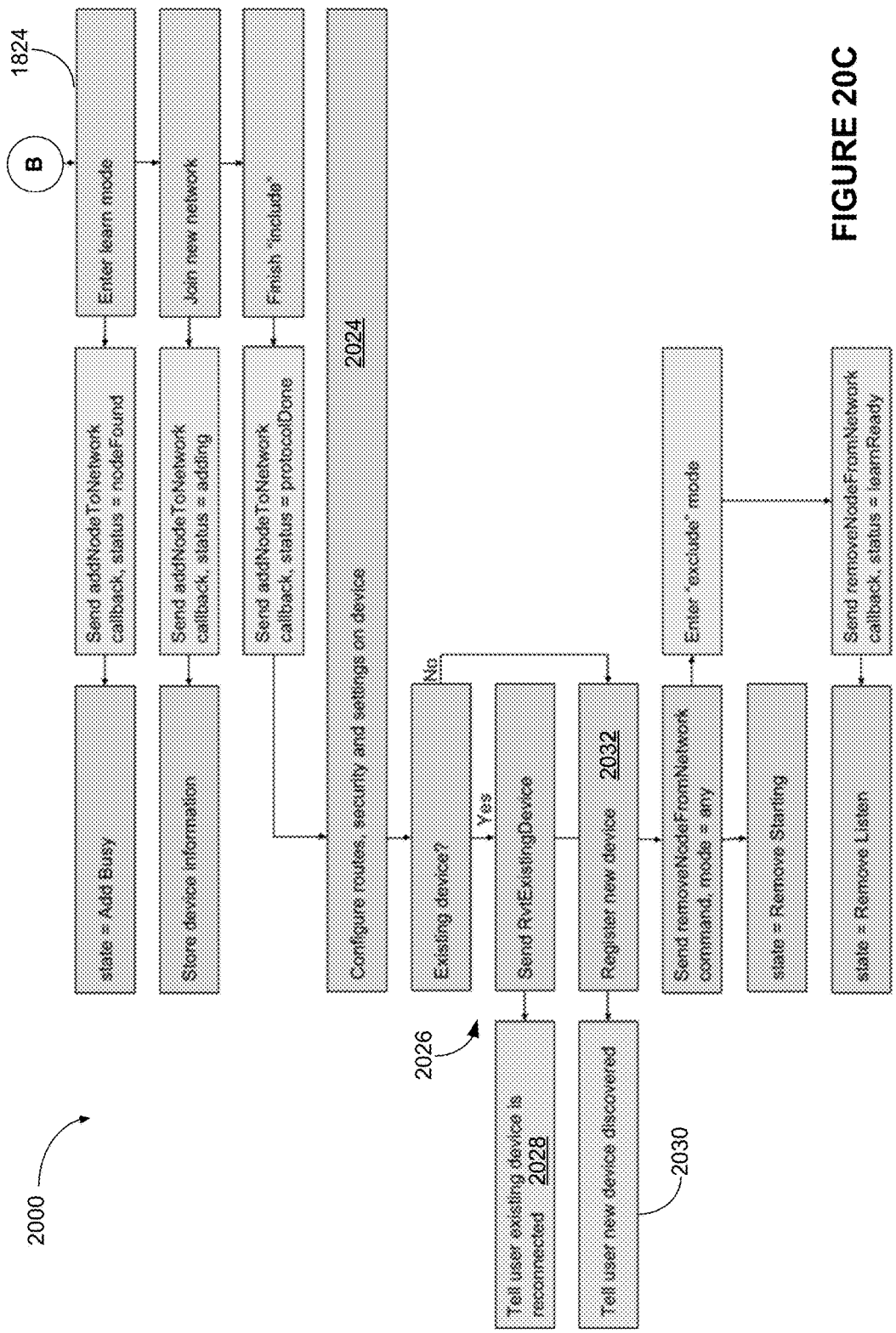
Figure 20D:
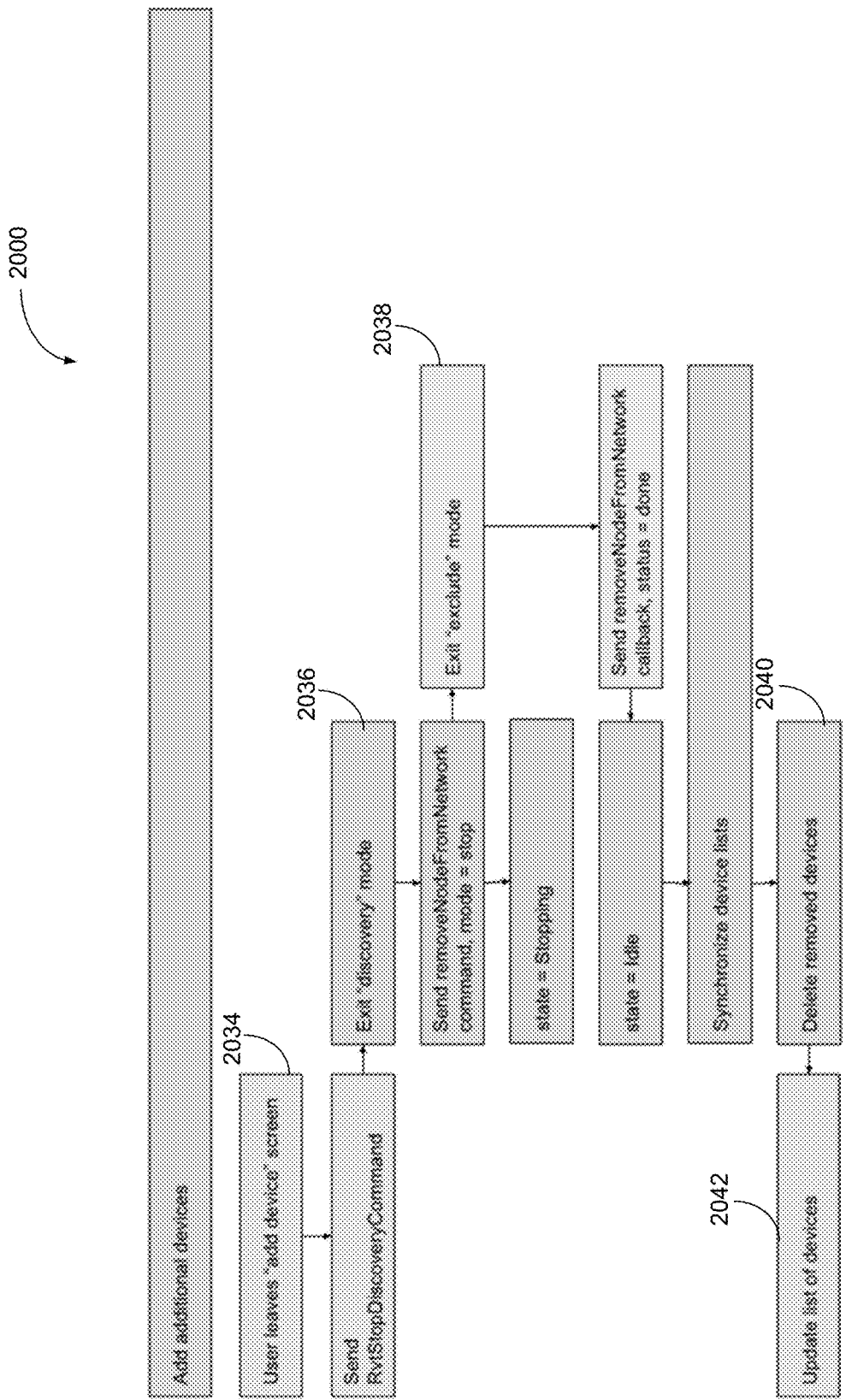

FIG. 19 is a flow chart for an example method 1900 of adding a smart device that communicates based on a point-to-point protocol in accordance with some implementations of the application. In accordance with the method 1900 of adding the new smart device, the commissioning option selected on the client-side application 826 of the client device 504 or 902 is defined to support a commissioning process that are compatible with one or more communication protocols including a point-to-point protocol, such that a new smart device that can communicate based on a point-to-point protocol would be successfully commissioned according to the selected commissioning option. After the hub device 904 receives (1902) from the client device 902 the user instructions of adding a new smart device according to the selected commissioning option, it starts (1904) a joining mode associated with a point-to-point protocol. In accordance with the joining mode, a user is instructed (1906) to provide a user intervention (e.g., pressing a button on a new smart device that needs to be added).

In some implementations, the point-to-point protocol (e.g., Insteon) is associated with a distinction between devices which can be controlled (slave, like a light bulb or thermostat) and those that are controllers (such as a keypad or a switch). When used in a point-to-point mode, one would pair a particular button on a controller with a particular device or devices to be controlled through a complex and error prone pairing process. Thus, there are two sides to the process, so a Hub that is trying to connect to both has to go through the opposite half of the joining process for each. Normally this would require a different user process for each (for example on an 8 button keypad pairing each of the 8 buttons individually to the hub), but we were able to create an identical user experience with our two different backend implementations. For these cases, the client device includes a mobile application with which the user interacts, communicating through a service to the Hub. The server is mostly irrelevant for this application.

In some implementations, the new smart device is a slave device of the hub device, and has to send (1908) a pairing request to the hub device. In response to receiving the pairing request, the hub device determines whether to send a pairing confirmation to the new smart device and allow it to be added into the smart home environment associated with the hub device. When the hub device (e.g., the hub device 904) responds (1910) with the pairing confirmation, the new smart device is successfully commissioned and added (1912) into the smart home environment associated with the hub device.

In some implementations, the new smart device is a controller device that sends (1914) a group indicator. In response to the group indicator, the hub device sets up a group broadcast, and sends (1916) to the new smart device a pairing request. In response to receiving the pairing request, the new smart device (i.e., the controller device) determines whether to send a pairing confirmation to the hub device. When the new smart device responds (1918) with the pairing confirmation to the hub device, the new smart device is successfully commissioned and added (1912) into the smart home environment associated with the hub device.

FIGS. 20A-20D is a flow chart for a method 2000 of adding a smart device that communicates based on a Z-Wave protocol in accordance with some implementations of the application. Z-Wave is a wireless home automation protocol that runs on a 908.42 MHz frequency band. One of the key features of Z-Wave is that it utilizes a mesh network, and stated another way, a Z-Wave smart device passes signals along to another smart device or a hub device 904 until it reaches its intended destination.

A client device 902 receives (2002) on a user interface user instructions of adding a new smart device according to one of a plurality of commissioning options. Specially, in accordance with the method 2000 of adding the new smart device, the selected commissioning option is defined to support a commissioning process that are compatible with one or more communication protocols including a Z-Wave protocol, such that a new smart device that can communicate based on the Z-Wave network would be successfully commissioned according to the selected commissioning option. A hub device (e.g., a Revolv hub) receives (2004) from the client device 902 the user instructions of adding a new smart device according to the selected commissioning option, and enters a "discovery" mode. In accordance with the discovery mode, the hub device configures (2006) a Z-Wave radio associated with the hub device to a learnReady mode, such that the hub device is ready to commission a Z-Wave based smart device.

Further, the client device displays one or more additional user interfaces prompting one or more user interventions, including displaying (2008) an instruction to push a button on the new smart device. In some implementations, after the user pushes (2010) the button, the new smart device enters (2012) a learn mode. In accordance with the learn mode, the new smart device acknowledges (2014) to the hub device of its existence via the Z-wave radio associated with the hub device, and determines (2016) whether it is already part of a Z-Wave network. After determining whether the smart device is part of a Z-Wave network, the smart device communicates the determination result to the hub device, such that the hub device is configured (2018) accordingly (e.g., resetting its communication with the new smart device) to get prepared for commissioning the new smart device. The hub device sends a notification concerning its status to the client device.

Then, the client device displays (2020) to push a button on the new smart device, and after the user pushes (2022) the button for a second time, the new smart device re-enters (2024) a learn mode to join a new network (e.g., a new Z-Wave network). During the course of commissioning the new smart device, a plurality of parameters are configured (2025) for both the hub device and the new smart device. The plurality of parameters includes, but is not limited to, routes, security and device settings. In some implementations, the hub device determines and notifies (2026) the client device that the new smart device is an existing device. The client device displays (2028) a notification indicating that an existing device is reconnected. Alternatively, in some implementations, the hub device determines and notifies (2030) the client device that the new smart device is a new smart device. The hub device is configured to register (2032) the new smart device, and the new smart device is therefore added into the smart home environment associated with the hub device.

Further, in some implementations, a user controls (2034) the client-side application to exit the user interface for adding a new smart device (e.g., the user interface 1205). The hub device receives a command from the client device, and accordingly, exits (2036) the discovery mode. The hub device also controls (2038) its Z-Wave radio to exit a corresponding mode, and synchronizes a device list with the Z-Wave radio. The smart devices that are removed from the Z-Wave network are deleted (2040) from the device list, and the client device updates (2042) its device list accordingly.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

In the description of this application, "sensor" and "smart device" are used in an exchangeable manner in some places.

Revolv Home Automation System

A. Overview

Revolv Home Automation System is a set of hardware and software that allows for secure local and remote control of home automation devices. A typical setup comprises a Gateway that resides within the LAN of a user's home to communicate with various HA Devices, Revolv's Cloud services which enable remote access, and mobile Apps and other Clients which allow users to interact with the system. These components interact with each other using Apache Thrift, an IDL and binary protocol which ensures correct-by-design communications. This document describes the system and the Thrift protocol needed to set up and control the Revolv system.

B. Terminology

App—A single client endpoint, usually a single phone/tablet

Cloud—The Revolv backend, comprising Sugarmill and PubNub

Sugarmill—The Revolv backend, used for authentication and backup

PubNub—Third-party service used for real-time communication with the gateway

Gateway—the Revolv hardware that controls Devices from within the home

Rule—a.k.a Actions, triggers and conditionals that cause automated control

Scene—A collection of device states that can be applied by the Gateway

Device—A home automated device attached to the Gateway, not to be confused with a mobile phone/tablet Feature—A set of states and functionality that can be implemented on a Device Thrift—Revolv's interface description, specified in Apache Thrift C. Architecture FIG. 5B illustrates the overall architecture of an example Revolv Home Automation System.

1. Gateway

The Gateway is Revolv's hardware which is typically joined to a user's WiFi router within their home. It communicates with the Devices within the user's home directly via various radio protocols, and through the LAN to IP-based devices. The Gateway is the main command and control center of the System, including command queuing, scenes, and the rules engine for automating devices.

2. Cloud

The Cloud facilitates communications and persistence between Clients and the Gateway, and comprises Revolv's RESTful service called Sugarmill, and a third-party Pub-Sub service called PubNub. Sugarmill provides component authentication, authorization, and persistence of all relational data that can be accessed regardless of the online state of the various components. For example, a Client can access the Gateways it is connected to, Devices on each Gateway, and access and modify Rules controlling those devices even if the Gateway itself is disconnected. Sugarmill uses standard HTTPS endpoints with POST, PUT, and DELETE methods.

Beyond the standard endpoints used for normal user operation, Sugarmill provides a set of admin endpoints used for management of multiple systems. This is used by Revolv customer support, but certain of these can be exposed as needed via developer key.

All real-time command and control is done over PubNub, a third-party solution which provides secure, reliable real-time message passing with minimal latency over the internet. This allows normal remote Revolv communication to operate in an efficient asynchronous manner, while keeping all system components up to date with the current state. It also optimizes battery and data usage on mobile devices.

Revolv also offers a more direct socket mode which can be used for even faster communications when a Client is operating locally within the same LAN as the Gateway.

3. SDKs

On the Client side, Revolv offers an iOS and an Android app designed for user-friendly operation of the Revolv system. Each of these is built on top of a platform specific SDK, which Revolv will provide to third parties for building their own clients. The Android SDK is built on top of a Java SDK, which allows command and control of Revolv from any JVM based platform. The SDK's generally manage all of the communications between the Client, Cloud, and Gateway, providing the developer with a simple live data model to operate upon.

D. Thrift

All interfaces and data objects used in the system are described by an Apache Thrift definition. These compile to language specific bindings that are available for most commonly used languages, and provide a compact and correct-by-design protocol for the Revolv system. While the SDKs hide much of the detail around building and manipulating Thrift objects for most Client's needs, it is necessary to understand the Thrift when building administrative applications that fall outside of the normal end-user use cases.

Revolv's Thrift definition is split into files by functional unit, with data model, real-time (PubNub), and Sugarmill request interfaces required for a given unit maintained in one file. A maven build file is included in the source repository, which first combines these into a single Thrift file with all dependency ordering handled, then build language bindings for Java, Objective C, Python, Go, and JavaScript. Thrift also supports many other language bindings.

A Thrift definition comprises structs, unions, and enums, and also has sets, lists, and maps for collection objects. In most fields are optional, so it is easy to pass partial values for an object and have the recipient detect empty fields.

E. Object Model

This section outlines the components of the Revolv data model.

1. App

Every Client is represented by an App in Sugarmill. An App can associate with one or more Gateways, although currently only one is exposed in the Revolv application. Apps are associated to a Gateway through either the FlashLink commissioning process, or through an invite code.

```
struct RvtApp {
    1:  RvtUuid appId
    2:  RvtSerialNumber serialNumber
    3:  set<RvtGateway> gateways
    4:  string appName
    5:  string appMakeModel
    6:  RvtVersion appVersion
    7:  set<RvtAppGatewaySettings> appGatewaySettings
    8:  list<RvtDashboard> dashboards }
```

2. Gateway

A Gateway represents a single Revolv hardware Gateway. It is brought online through the FlashLink commissioning process, at which point it is also associated with an App.

```
struct RvtGateway {
    1:  RvtUuid gatewayId
    2:  RvtSerialNumber serialNumber
    3:  RvtName name
```

```
    4:      set<RvtDevice> devices
    5:      string firmwareVersion
    6:      RvtGatewaySettings settings
    // Only returned in Query requests
    7:      i32 deviceCount
    8:      list<RvtUuid> appIds
    // The gateway's status.
    9:      RvtGatewayStatus gatewayStatus
    // Accounts associated with this gateway
    10:     set<RvtExternalAccount> accounts
    11:     RytTimestamp updateStarted // APPROXIMATE
    12:     i32 groupId // Used for admin groups
    13:     RytTimestamp lastHeartbeat
    14:     string desiredFirmwareVersion
    15:     bool forceUpdate }
```

3. Device

A Device represents a single physical controllable piece of home automation hardware, such as a switch or a lock. Devices are tied to a single Gateway. Devices have a deviceType field, which describes at a high level what the Device is, and a set of Features that describe the capabilities of the device. For example, two Devices may have OnOff and Level features, but one could have a deviceType of LIGHT (i.e. a lightbulb) and the other SWITCH (i.e. a wall dimmer). The Device id is the identifier used for accessing and controlling the Device.

```
struct RvtDevice {
    1:      RvtUuid id
    2:      RvtName name
    3:      RvtSerialNumber serialNumber
    4:      RvtManufacturer manufacturer
    5:      RvtDeviceType deviceType
    6:      RvtFeatures features
    7:      RvtDiscoveryState discoveryState
    8:      RvtProtocol protocol
    9:      RvtDeviceStatus deviceStatus
    10:     string metadata
    11:     RvtAuthenticationState authenticationState
    12:     RvtUuid accountId
    13:     RvtAssociationOptions options }
enum RvtDeviceType {
    UNKNOWN         = 1
    OUTLET          = 2
    SWITCH          = 3
    LIGHT           = 4
    KEYPAD          = 5
    MOTION_SENSOR   = 6
    WATER_SENSOR    = 7
    THERMOSTAT      =       8
    DOOR_LOCK       =       9
    MUSIC_PLAYER    =       10
    CAMERA          =       11
    MULTILIGHT      =       12
    ACCOUNT         =       13
    LIGHT_STRIP     =       14
    SHADES          =       15
    GARAGE_DOOR     =       16
    OPEN_SENSOR     =       17
    BRIDGE          =       18
    FIREPLACE       =       19
    FAN             =       20
    FANLIGHT        =       21
    ALARM           =       22
    SAFETY_SENSOR   =       23
}
```

4. Feature

Devices contain one or more Features which describe various functionalities offered by the Device. For example, a media player might have a MediaPlayer Feature for controlling the current media and play mode, and a separate Volume Feature for setting the volume, fades, etc.

The Features object in Thrift is used in several ways, from indicating the existence of particular Features on a Device, to conveying current state of the Device, to sending commands and state changes to be executed on the Device. This is accomplished through a mix of fields, one or more which are available on every Feature:

States—state variables of the Feature that can be read or written, for example the Level Feature has a level state variable that is a double. Most state variables that are continuous values have a normalized range of 0.0 to 1.0; the exception being where it has a standard unit such as temperature. Some state variables are read only, they have a "ro" prefix on their name.

Command—commands that can be run on the Device. Every Feature that contains writable state has at minimum a "setState" command, which when requested sets the values in "states". Other commands allow for causing behavior that can't be expressed by setting state, for example nextTrack or setChannel on a media player.

Details—for (relatively) static information about a device, such as the layout of a keypad or the max keycodes that can be stored on a lock. Unlike state and commands which are only communicated in real time over PubNub, details are stored on the Cloud and get retrieve when Devices are retrieved from Sugarmill.

Here is the Level feature, used for dimmers. It has a state of level, some commands to allow continuous adjustment of the level, and no details:

```
struct RvtLevelStates { 1: RvtLevel level
}
// Command for adjusting a value in a continuous manner, call
StopAdjust when done struct
        RvtStartAdjustCommand {
    1:      bool up
// If specified, how long the device would take to adjust through its full
range
    2:      RvtMilliseconds timeToFull }
// Stop adjusting a value in a continuous manner struct
RvtStopAdjustCommand {
}
union RvtLevelCommands {
    1:      RvtSetStateCommand setState
    2:      RvtStartAdjustCommand startAdjustLevel
    3:      RvtStopAdjustCommand stopAdjustLevel }
struct RvtLevelFeature {
    1:      RvtLevelStates states
    2:      RvtLevelCommands command }
```

The TemperatureControl Feature, used for setting temperature goals on thermostats, has some writable state variables, one read-only state, and details describing the supported modes of a particular thermostat:

```
enum RvtTemperatureControlMode {
    OFF     = 1
    HEAT    = 2
    COOL    = 3
    AUTO    = 4
}
enum RvtTemperatureControlFan {
    AUTO    = 1
    ON      = 2
    TIMER   = 3
}
struct RvtTemperatureControlDetails {
1: set<RvtTemperatureControlMode> supportedModes
2: set<RvtTemperatureControlFan> supportedFanModes
}
```

-continued

```
struct RvtTemperatureControlStates {
1:      RvtTemperature goal // To be deprecated in favor of
        heat/coolGoal
2:      RvtTemperatureControlMode mode
3:      RvtTemperatureControlFan fan
4:      RvtTemperature heatGoal
5:      RvtTemperature coolGoal
6:      RvtTimestamp roFanTimerExpiration // Nest fan_timer_timeout }
// Thermostats have no ON mode; this command changes the mode from
        OFF to the // previously-seen non-OFF mode
struct RvtSetModeOnCommand {
}
union RvtTemperatureControlCommands {
1:      RvtSetStateCommand setState
2:      RvtSetModeOnCommand setModeOn }
struct RvtTemperatureControlFeature {
1:      RvtTemperatureControlStates states
2:      RvtTemperatureControlCommands command
3:      RvtTemperatureControlDetails details }
```

Individual Features are combined into an overall RvtFeatures Thrift structure:

```
struct RvtFeatures {
1:      RvtOnOffFeature onOff
2:      RvtLevelFeature level
3:      RvtLockFeature lock
4:      RvtTemperatureSensorFeature temperatureSensor
5:      RvtTemperatureControlFeature temperatureControl
6:      RvtMotionSensorFeature motionSensor
7:      RvtWaterSensorFeature waterSensor
8:      RvtColorFeature color
9:      RvtImageFeature image
10:     RvtVolumeFeature volume
11:     RvtMediaPlayerFeature mediaPlayer
12:     RvtContentDirectoryFeature contentDirectory
13:     RvtButtonPadFeature buttonPad
14:     RvtGroupFeature group
15:     RvtOpenableFeature openable
16:     RvtOpenSensorFeature openSensor
17:     RvtBatteryLevelFeature batteryLevel
18:     RvtUserCodeFeature userCode
19:     RvtBridgeFeature deviceBridge
20:     RvtPositionFeature position
21:     RvtCOSensorFeature coSensor
22:     RvtSmokeSensorFeature smokeSensor
23:     RvtAlarmModeFeature alarm
24:     RvtEnergySavingFeature energySaving
25:     RvtAwayFeature away
26:     RvtActiveFeature active
27:     RvtDiscreteFeature discrete }
```

5. Scene

A Scene describes a set of states and behaviors for various device to be set. For example, lock the doors, turn down the lights, and put on some jazz. A scene can be activated via a Gateway command, or can be included in a Rule as the action to take.

```
struct RvtSceneItem {
1:      RvtCommandDevices command
2:      bool enabled }
struct RvtScene {
1:      RvtUuid id
2:      string name
3:      RvtDiscoveryState discoveryState
4:      list<RvtSceneItem> commands
5:      list<RvtBehavior> behaviors // more complicated series of things
        to do. }
```

6. Rule

A Rule combines a Scene with a trigger and conditions which cause the scene to activate automatically. A trigger is an event, such as a time of day, a change in a device, or change in occupancy, while conditions are checks on current status that can additionally be met.

```
union RvtTrigger {
1:      RvtNotification notificationTrigger
2:      RvtEvent eventTrigger
3:      RvtTimeSchedule timeSchedule
4:      RvtEnvironment environment
5:      RvtTriggerOperator operator // RPN operators }
struct RvtRule {
1:      RvtUuid ruleId
2:      RvtUuid gatewayId
3:      string name
4:      RvtTrigger trigger
6: bool active
// Send a push notification if this is set
9:      list<RvtPushRecipient> pushRecipients
10:     RvtUuid sceneId
11:     list<RvtTrigger> conditions // RPN list of conditions }
```

F. Sugarmill

Sugarmill is a RESTful service that persists the overall relational state of the system—which Apps are connected to which Gateways, and the Devices, Rules, and other operating parameters of a given Gateway. The main exception is that the real-time state of Devices (i.e. is this light on) is not persisted in Sugarmill. It also manages authorization and connecting Gateways to Apps during commissioning.

1. Identity

Revolv maintains several installations of Sugarmill besides the production version, for development and staging purposes. The App and the Gateway can both be talking with the same installation of Sugarmill in order to communicate properly. Revolv dynamically assigns Gateways to particular installation endpoints using the Identity service. To determine the endpoint assigned to a particular Gateway, call the Identity service with the serial number of the Gateway (its MAC address, printed on the bottom):

```
https://identity.revolv.com/v1/gateway/endpoint {
"serialNumber": "B0:79:3C:00:12:34"
}
Response:
{
"name": 1,
"url": "https://api-v2.revolv.com"
}
```

The endpoint returned will be one of:
Production—https://api-v2.revolv.com
Beta—https://sugarmill-beta.revolv.com
Stage—https://sugarmill-stage.revolv.com 2. Request Format While the examples in this document use JSON for readability, the proper way to communicate with Sugarmill is using the Revolv's Thrift interface definition, serialized using Thrift's "TBinaryProtocol" protocol. Sugarmill accepts and returns three different serializations moderated by "Content-Type" and "Accept" headers, but due to limitations in Thrift JSON parsing, only very simple requests will work with the "application/x-j son" content type:
application/x-thrift—preferred, thrift's standard binary protocol
application/json—ok, thrift's unreadable json version of its binary protocol
application/x-json—unreliable, readable json as shown in this documentation Here is an example of how to generate a thrift binary request to set the name of a Device in Java. Different language bindings for Thrift accomplish this in different ways, but the principle is the same. First, the thrift for the request:

```
// Update an existing device.
// PUT    /gateway/{gatewayId}/device/IdeviceId}
struct RvtUpdateDeviceRequest {
1:         RvtApiRequestData requestData
2:         RvtDevice device }
struct RvtUpdateDeviceResponse { 1: RvtDevice device
}
struct RvtDevice {
1:         RvtUuid id
2:         RvtName name ...
}
```

The pretty JSON for this request would look like:
PUT https://api-v2.revolv.com/gateway/my-gateway-id/device/my-device-id
{
"requestData": {"id": "my-app-id", "apikey": "key"},
"device":
{
"name": "Some name"
}
}

The Java code for this would be:

```
import com.revolv.thrift.*;
RvtApiRequestData reqData = new RvtApiRequestData( );
reqData.setId("my-app-id");
reqData.setApikey("key");
RvtDevice devData = new RvtDevice( ); devData.setName("Some name");
RvtUpdateDeviceRequest request = new RvtUpdateDeviceRequest( );
request.setRequestData(reqData);
request.setDevice(devData);
TProtocolFactory protocolFactory = new TBinaryProtocol.Factory( );
byte[ ] requestBytes = (new
TSerializer(protocolFactory)).serialize(request);
```

Then requestBytes would be sent as the body of the request, with application/x-thrift as the Content-Type. A similar TDeserializer will unmarshall the response back into the RvtUpdateDeviceResponse thrift object. Note that the protocolFactory can be a singleton, but the TSerializer is not thread-safe and should be created for every serialization.

3. Security

Every request may be accompanied by an RvtApiRequestData, which contains an identity and an access token for that identity. In normal operation these are generated during Gateway/App pairing, authorizing an App id to access a particular Gateway id. For administrative purposes, an id/token pair will be provided by Revolv, which gives access to the Gateways under your purview. Tiered administrative access for third parties is currently under development.

4. Making Requests

All requests are documented in the Revolv Thrift definition, with the endpoint path and the request and response body. Due to limitations on GET in various http libraries, only the POST, PUT and DELETE methods are used in Sugarmill calls. Get is accomplished with a POST request on the . . . /type/id endpoint, while adding a new object would use a . . . /addType POST request.

The following is the set of request/response bodies for Devices:

```
// Add a new device
// POST /gateway/{gatewayId}/addDevice
struct RvtNewDeviceRequest {
1:         RvtApiRequestData requestData
2:         RvtDevice device
3:         RvtUuid gatewayId }
struct RvtNewDeviceResponse { 1: RvtUuid deviceId
}
// Retrieve a single device
// POST /gateway/{gatewayId}/device/{deviceId}
struct RvtGetDeviceRequest {
1:         RvtApiRequestData requestData
2:         RvtUuid deviceId
3:         RvtUuid gatewayId }
struct RvtGetDeviceResponse { 1: RvtDevice device
}
// Update an existing device.
// PUT /gateway/{gatewayId}/device/{deviceId}
struct RvtUpdateDeviceRequest {
1:         RvtApiRequestData requestData
2:         RvtDevice device }
struct RvtUpdateDeviceResponse { 1: RvtDevice device
}
// Update multiple devices in a single call. I-F the device ID is set,
// update. Otherwise, add it.
// PUT /gateway/{gatewayId}/devices
struct RvtUpdateDevicesRequest {
1:         RvtApiRequestData requestData
2:         list<RvtDevice> devices }
struct RvtUpdateDevicesResponse {
// Success -Flags, in the same order as the provided list. 1: list<RvtUuid>
deviceIds
}
// Retrieve multiple devices. I-F the set o-F device IDs is empty,
return // all devices -For this gateway.
// POST /gateway/{gatewayId}/devices
struct RvtGetDevicesRequest {
1:         RvtApiRequestData requestData
2:         set<RvtUuid> devices }
struct RvtGetDevicesResponse { 1: set<RvtDevice> devices
}
// Delete a device
// DELETE /gateway/{gatewayId}/device/{deviceId}
struct RvtDeleteDeviceRequest {
1:         RvtApiRequestData requestData
2:         RvtUuid deviceId }
struct RvtDeleteDeviceResponse { 1: bool deleted
}
```

G. PubNub

PubNub is a third-party service that provides fast efficient messaging using publish/subscribe based channels. Revolv uses PubNub for asynchronous communications between the App and the Gateway, and also to receive asynchronous notifications from the Cloud. The Java and iOS SDKs manage all of the actual client-side interactions with PubNub and expose them in their respective data models, so the following is mainly for reference and debugging.

1. Channels

Channels are PubNub's message pipelines, which can be independently published and subscribed to by multiple clients. These channels use several levels of security, and are authenticated for access by Sugarmill. In the Revolv system, each Gateway creates three channels for communications:

Notify—subscribed to by both Gateway and Apps
    App→GW—for Apps to send messages to the Gateway, which is the only subscriber
    GW→App—for Gateways to send to all Apps, subscribed by all Apps Gateways and Apps receive their channel list using RvtGatewayChannelsRequest and RvtAppChannelsRequest calls to Sugarmill, respectively. These also contain the keys and origin needed to publish and subscribe to Revolv's channel sets. See PubNub documentation for more details on how to subscribe and publish to these channels.

2. Message Format

PubNub requires short, JSON/ASCII messages, while Revolv requires variable length messages using Thrift. The pubnub.thrift file describes the messages used, as shown here:

```
struct RvtMessageHeader {
    1:      RvtUuid senderId
    2:      RvtMessageId messageId
    3:      RvtTimestamp timestamp
    4:      i32 packetNumber
    5:      i32 totalPackets }
struct RvtMessage {
    1:      RvtMessageHeader header
    2:      RvtMessageContents contents }
struct RvtMessageJson {
    1:      string header
    2:      string contents
    3:      string contentPart }
```

RvtMessage describes a message, which comprises a header and contents. However the actual message sent over PubNub is RvtMessageJson, in simple readable JSON format. The header and contents are the binary RvtMessageHeader and RvtMessageContents, base64 encoded to ASCII strings. When a message is too large for PubNub (>1400 bytes), the base64 contents string is broken up and sent in multiple messages, with the current and total packet count placed in each header, and the packet contents placed in contentPart.

The header contains other metadata for the message. SenderId is the UUID of the App or Gateway (and occasionally Cloud) which sent the message, useful for ignoring messages on the Notify channel that were self-sent. MessageId is a unique id generated by the sender of the message, used both for identifying parts of a multi-packet message, and for synching responses to requests. As described below in Control Traffic, all follow-on response messages to a request message use the same messageId.

Here is an example message as posted to PubNub, with base-64 encoded header and message:

```
{
"header": "ADD142JB...",
"contents": "DJ43BBnAjd0..."
}
```

3. Control Traffic

The contents of the message are contained in RvtMessageContents:

```
struct RvtMessageContents {
1:          RvtCommandGateway commandGateway
2:          RvtCommandDevices commandDevices
3:          list<RvtEvent> events
4:          RvtNotification notification }
This allows for three types of message:
1           commandGateway - gateway-wide commands, such
            as start discovery mode
1           commandDevices + events - device control and monitoring
1           notification - global notification of changes
```

1) Gateway Commands

Gateway commands affect or retrieve information about global gateway operation, that are sent from the App to the Gateway on the App→GW channel. They often cause a response message to be broadcast to the GW→App channel:

```
union RvtCommandGateway {
    1:      RvtGetStateCommand getState
    2:      RvtStartDiscoveryCommand startDiscovery
    3:      RvtStopDiscoveryCommand stopDiscovery
    4:      RvtFactoryResetCommand factoryReset
    5:      RvtStartUnjoinCommand startUnjoin
    6:      RvtManufacturerLoginCommand manufacturerLogin
    7:      RvtGetMediaChannelsCommand getMediaChannels
    8:      RvtGetOccupancyCommand getOccupancy
    9:      RvtSetCurrentSceneCommand setCurrentScene
    10:     RvtGetCurrentSceneCommand getCurrentScene
    11:     RvtProtocolCommand protocolCommand
    12:     RvtCaptureSceneCommand captureCurrentScene
    13:     RvtGetAssociationSchemesCommand getAssociationSchemes
    14:     RvtGetGatewayStatusCommand getGatewayStatus }
```

Some key commands are:

GetState—returns the current operating state of all (or a specified list of) Devices. Since this is not maintained on Sugarmill, this is how to retrieve whether lights are on, etc. This will cause a message to be returned with the events field set, which will include all Device state.

Start/stopDiscovery—Many protocols have a discovery mode for finding new devices, this starts and stops this mode on the Gateway across protocols. If a stop is not explicitly sent, the Gateway will timeout after 2 minutes. A RvtGatewayStatusChangeNotification will be sent with DISCOVERY set when the Gateway is in discovery mode, and back to OK when the discovery mode ends.

Get/set/capture scene—The current Scene showing can be manipulated, and new Scenes captured with these commands.

2) Device Control

The commandDevices and events fields are used in concert to request Device changes and monitor the results. A commandDevices can contain one or more Devices, and set states and commands within the various Features of the Devices. A state is a discreet read-write value on a Feature of a Device. For example, a dimmable light switch will have a Feature called "Level", which has a state called "level" which is a value between 0.0 and 1.0 of the brightness of the light. A command is requesting the Device do something other than set a simple state value, for example going to the next track on a media player.

The commandDevices, status, and events structures are:

```
struct RvtCommandDevices {
    1: set<RvtUuid> deviceIds
    2: RvtFeatures commands
    9:          RvtPushData pushSuccessMessage
    10:         RvtPushData pushFailMessage }
struct RvtStatus {
    1: RvtStatusCodes code
    3: RvtLiveTime timeToComplete
    4: RvtLevel percentToComplete // 0.0 - 1.0
    5: RvtStringMsg messageStr
}
struct RvtEvent {
    1:          set<RvtUuid> deviceIds
    2:          RvtStatus status
    3:          RvtFeatures events }
```

RvtFeatures, as described in the Object Model section, is used both to send commands and state changes to Devices, and to return state events.

The following is a Device command sent from an app to start a media player playing at a volume of 30%:

```
{
"header": {
"senderId": "my-app-id",
"messageId": "my-app-id:1234"
},
"contents": {
"commandDevices": {
"deviceIds": ["mediaplayerId"],
"commands": {
"volume": {
"state": {
"volume": 0.3,
"mute": false
},
"command": {
"setState": { }
}
},
"mediaPlayer": {
"command": {
"play": {
"speed": 1.0
}
}
}
}
}
}
}
```

This command is affecting 2 Features of the Device, the Volume and the MediaPlayer. For the Volume Feature, the command is to setState, and the values of state to set are volume to 0.3 and mute to off. For the MediaPlayer Feature, the command is to play, and we are passing a parameter to play at full speed.

Once this command is passed to the Gateway via the App→GW channel, the Gateway will verify that the command is valid and pass back a message over the GW→App channel indicating that it will be executed:

```
{
"header": {
"senderId": "my-gateway-id",
"messageId": "my-app-id:1234"
},
"contents": {
"commandDevices": {
"deviceIds": ["mediaplayerId"],
"commands": {
"volume": {
"state": {"volume": 0.3, "mute": false},
"command": {"setState": { }}
},
"mediaPlayer": {
"command": {"play": {"speed": 1.0}}
}
}
},
"events": [{
"deviceIds": ["mediaplayerId"],
"status": {
"code": 202,
"message": "DeviceCommand Received"
}
}]
}
}
```

Note that this contains the same messageId as the request message, although now has the senderId of the Gateway. It also contains a copy of the command requested to be executed, and events filled out with just a status indicating that the command for the media player was received and will be executed. This allows Apps other than the one which sent the request to update their UI to indicate Device operation is in progress. Invalid values could have returned a failure message.

When the command succeeds or fails, a final message is sent, also with the same messageId, with the final status and state of the Devices:

```
{
"header": {
"senderId": "my-gateway-id",
"messageId": "my-app-id:1234"
},
"contents": {
"commandDevices": {
"deviceIds": ["mediaplayerId"],
"commands": {
"volume": {
"state": {"volume": 0.3, "mute": false},
"command": {"setState": { }}
},
"mediaPlayer": {
"command": {"play": {"speed": 1.0}}
}
}
},
"events": [{
"deviceIds": ["mediaplayerId"],
"status": {
"code": 200,
"message": "DeviceCommand Succeeded"
},
"events": {
"volume": {
"state": {"volume": 0.3}
},
"mediaPlayer: {
"state": {
"roPlayMode": "PLAY",
"roCurrentTrack": 3,
"roTotalTracks": 12,
"roTrackPosition": {
"time": 0.23,
"speed": 1.0,
"timestamp": 1409877649920
},
"roTrackInfo": {
"trackDuration": 127.5,
"title": "Some Song",
"album": "Some Album"
}
}
}
}
}]
}
}
```

Now in addition to a success status indicating that the command executed successfully on the Device, all state that changed as a result is being returned. For the Volume Feature, the new volume of 0.3 is being returned, but the mute value is not because it was already unmuted. For the MediaPlayer Feature, a command was executed which cause multiple changes in read-only state, including the current track changing, and information about the track position and the song currently being played.

Because the Gateway only returns state deltas, a Client that is starting up (or reconnecting with PubNub more than 5 minutes from a previous PubNub connection) should first request the full state of the Devices on the Gateway using a getState gateway command. The result of the getState command is a response message with the events filled in for every Device and Feature. Thereafter it should be tracking the current state by applying deltas from the events messages. This also works if a user manually controls a Device, or if a Rule is executed on the Gateway causing a change. In this case, an asynchronous message with no command will be set over the GW→App channel, for example if a light is changed:

```
{
"header": {
"senderId": "my-gateway-id",
"messageId": "my-gateway-id:5678"
},
"contents": {
"events": [{
"deviceIds": ["lightId"],
"events": {
"level": {
"state": {"level": 0.74}
}
}
}]
}
}
```

In this example, there is no commandDevices field set, and no status under events since this is simply reporting an external change in Device state.

If a Scene is activated (either directly or as a result of a Rule triggering), a message would first be sent with just a "202 Device Command Received" status for each device, followed by a message including success/failure status and any resulting state changes. Unlike a commandDevice, a Scene can contain many disparate Devices, each which can independently succeed or fail. The following example shows a Scene activation with the media player and light from above, where the light fails to activate:

```
Initial Message:
{
"header": {
"senderId": "my-gateway-id",
"messageId": "my-gateway-id:112358"
},
"contents": {
"events": [{
"deviceIds": ["mediaplayerId", "lightId"],
"status": {
"code": 202,
"message": "DeviceCommand Received"
},
}]
}
}
Final Result:
{
"header": {
"senderId": "my-gateway-id",
"messageId": "my-gateway-id:112358"
},
"contents": {
"events": [{
"deviceIds": ["mediaplayerId"],
"status": {
"code": 200,
"message": "DeviceCommand Succeeded"
},
"events": {
"volume": {
"state": {"volume": 0.3}
},
"mediaPlayer": {
"state": {
"roPlayMode": "PLAY",
"roCurrentTrack": 3,
"roTotalTracks": 12,
"roTrackPosition": {
"time": 0.23,
"speed": 1.0,
"timestamp": 1409877649920
},
"roTrackInfo": {
"trackDuration": 127.5,
"title": "Some Song",
"album": "Some Album"
}
}
}
}
},
{
"deviceIds": ["lightId"],
"status": {
"code": 500,
"message": "DeviceCommand failed"
}
}],
"notification":{
"changeScene":{
"sceneId":"sceneId",
"editable":0
}
}
}
}
```

3) Notifications

Notifications are sent on the Notify channel to both Gateways and Apps, and generally communicate asynchronous changes in the system:

```
union RvtNotification {
    1:   RvtCommissionGatewayNotification commissionGateway
    2:   RvtNewDeviceNotification newDevice
    3:   RvtDeviceUpdateNotification deviceUpdate
    4:   RvtGeofenceNotification geofence
    6:   RvtRuleNotification ruleUpdate
    7:   RvtDeviceDeleteNotification deviceDelete
    8:   RvtGatewayNotification gatewayUpdate
    9:   RvtUnjoinDeviceNotification unjoinDevice
    10:  RvtGatewayHeartbeatNotification gatewayHeartbeat
    11:  RvtGatewayLogLevelNotification gatewayLogLevel
    12:  RvtManualTriggerNotification manualTrigger
    13:  RvtNewLogEntryNotification newLogEntry
    14:  RvtGatewayPermissionsNotification gatewayPermissions
    15:  RvtGatewayStatusChangeNotification gatewayStatusChange
    16:  RvtExistingDeviceNotification existingDevice
    17:  RvtChangeAttentionNotification changeAttention
    18:  RvtResetDemoGatewayNotification resetDemoGateway
    19:  RvtGetMediaChannelsNotification mediaChannelsUpdate
    20:  RvtExternalAccountUpdateNotification externalAccountUpdate
    21:  RvtOccupancyUpdateNotification occupancyUpdate
    22:  RvtOccupantNotification occupant
    23:  RvtSceneChangeNotification changeScene // Current scene
    24:  RvtSceneUpdateNotification updateScene
    25:  RvtAssociationUpdateNotification updateAssociation
    26:  RvtAssociationSchemeNotification associationScheme
    27:  RvtGatewayDeleteNotification deleteGateway //
         factory reset is complete
    28:  RvtResourceUpdateNotification updateResource }
```

The most common notifications are sent by Sugarmill when something about a Device, Rule, or any other entity it persists is changed. For example, if the above call to change the Device name was made, a RvtDeviceUpdateNotification will be sent out indicating that Sugarmill should be queried to get the updated Device information:

```
{
"header": {
"senderId": "my-app-id",
"messageId": "some-unique-id"
},
"contents": {
"notification": {
"deviceUpdate": {
"updatedDeviceIds": ["my-device-id"]
}
}
}
}
```

Note that the senderId of the entity which made the change request to Sugarmill is passed through as the senderId on the notification, so that sender may ignore its own notifications if desired.

Other notifications are used to communicate overall changes in App or Gateway state. For example, an app may change its Occupancy from Away to Home:

```
{
"header": {
"senderId": "my-app-id",
"messageId": "my-app-id:13579"
},
"contents": {
"notification": {
"occupant": {
"occupantId": "my-app-id",
"occupancyStatus": "HOME"
}
}
}
}
```

In response, the Gateway would update the overall Occupancy to reflect this change:

```
{
"header": {
"senderId": "my-gateway-id",
"messageId": "my-app-id:13579"
},
"contents": {
"notification": {
"occupancyUpdate": {
"occupancyStatus": "HOME",
"occupants": [
{
"occupantId" : "my-app-id",
"occupancyStatus": "HOME"
},
{
"occupantId" : "another-app-id",
"occupancyStatus": "AWAY"
}
],
"homeCount": 1,
"awayCount": 1
}
}
}
}
```

4. Pubnub Protocol
RTM Protocol 1.
Using PubNub Channels:
Each app→GW connection has 2 channels, one for each direction (reduces "self" message traffic)
Each GW also has a single "notification" or "broadcast" channel for notifications to reach gw and all devices A sequence of messages (command+ACK1 and ACK2, REQ/RES) will contain originator+msgid fields that uniquely identify the sequence sent on individual channels vs the broadcast channel due to security.

Commands are responded to by a broadcast ACK for receiving the message, and one for successful completion of an action. JSON outside of the header can be packetized aata. Examples of the commands include, but are not limited to:

(O, default value) means a value is optional, and what the default is

Header (all messages, not packetized)

originator—UUID of the originator of a related set of messages, for instance command and its acks msgId—Unique (per originator) id generated by the originator for this message timeStamp—sender long of current time version—major.minor protocol version packetNumber (O)—which packet this is packetTotal (O)—total number of packets that make up this complete message Command (sent by an app to gw channel to control a device)

cmd—name of the command setState (state:{name:value . . . })

play (speed)

gotoTrack (tracknumber)

devIds—list of device/group/program UUIDs to apply this command to timeout (O, dev dependent)—how long in ms to try this command for ramp (O, instant)—time to "ramp" to this state sync (O, true)—if multi/group of devices, whether it is more important to sync them to change together or just change them quickly continuous (O, false)—whether the user is still setting this value, i.e. finger still down. May only send initial and final ACKs if this is set args (O)—map of arguments for a given command event (sent by anyone, generally from gw about device changes. Can be an array of:)

type—type of the event deviceState (changed state: {name: value . . . })

geoFence (threshold, lat, long)

devId (O)—device this event is from mergable (O, true)—whether this can be merged with other events, or can be received individually timeout (O, forever)—how long this event is relevant for args—map of arguments for the given event Ack (sent in response to command to all apps, first when received and mirroring the command, second once executed with the event(s))

status—status of the execution of the command—2xx=success, 4xx=failed fatally, 5xx=failed retry-ably 202—Received—command received by gw and in progress (command also included)

201—Success—command received and executed (events also included)

509—Superseded—command received but overridden by another command

424—FailedFatal—(generic) command execution failed and cannot be successful without some change 404—NoSuchDevice 405—InvalidCommand 422—InvalidArguments 400—FormatError 500—FailedRetry—(generic) command failed but could be retried message (O)—human readable message for failure Request (request from app to gw for a specific piece of info, currently only device state)

type—what is requested

DeviceState (devId[s], or none to get all)

args (O)—args for the request

Response (returned to app from gw from a request)

type—what was requested data—array of results state: {name: value . . . }

Generally, a hub device is configured to support one or more smart home devices used as a lighting source, a light switch, a thermostat, a keypad, a remote, a power outlet, an audio device, a sensor (e.g., a motion sensor, a door sensor and a water leak sensor), and a security device (e.g., an electronic deadbolt). An example hub device 904 works to manage a plurality of smart home devices, including Nest Learning Thermostat (2nd Generation), Sonos Play: 1, Philips Hue Starter Pack, Belkin WeMo Insight Switch, Yale Real Living Touch Screen Lever Door Lock with Z-Wave, and Insteon RemoteLinc Wireless 4-button Keypad.

Example smart devices associated with lighting applications include, but are not limited to, Philips Hue Starter Pack, Philips Hue Bulb, Philips Friends of Hue LED Bloom, Philips Friends of Hue LED Light Strip, Philips Hue Downlight Lamp, and Insteon 2672-222 LED Light Bulb.

Example smart devices used as light switches include, but are not limited to, GE Z-Wave 2-way Dimmer Switch (#45606), GE Z-wave In-Wall Dimmer (#45612), GE Z-Wave 3-way Switch Kit (#45614), GE Z-Wave 3-way Dimmer Switch Kit (#45613), Cooper Wiring Devices RF9501AW Single-Pole Wireless Light Switch, Belkin WeMo Light Switch, Leviton VRS05-1LZ Vizia Z-wave Light Switch 5A, Leviton VRS15-1LZ Vizia RF+Z-wave Light Switch 15A, Leviton VRI06-1LZ Vizia RF+Z-wave 600W Dimmer, Leviton VRI10-1LZ Vizia RF+Z-wave 1000W Dimmer, Leviton VRF01-1LZ Vizia RF+Z-wave 1.5A Scene-Capable Quiet Fan Speed Control, INSTEON 2477D SwitchLinc Dual-Band Dimmer, GE Z-wave In-Wall Switch (#45609), and INSTEON 2477S SwitchLinc Dual-Band Switch.

Example smart devices used thermostats include, but are not limited to, Nest Learning Thermostat (2nd Generation), Honeywell YTH8320ZW1007/U Z-wave Enabled Programmable Thermostat, Trane TZEMT400BB3NX N N SL Z-wave Thermostat, Nest Learning Thermostat (1st Generation), Honeywell RTH6580WF1001/W Wi-Fi 7-Day Programmable Thermostat, Honeywell TH8320WF1029 Wi-Fi Touchscreen Programmable Digital Thermostat, Honeywell RTH8580WF Wi-Fi 7-Day Programmable Touchscreen Thermostat, Honeywell RTH9580WF Wi-Fi Thermostat, and INSTEON 2441TH Thermostat, Example smart devices used keypads or remotes include, but are not limited to, INSTEON 2444A3WH RemoteLinc Wireless 2-button Keypad, INSTEON 2342-222 RemoteLinc Wireless 8-button Keypad, INSTEON 2444A2WH4 RemoteLinc Wireless 4-button Keypad, Aeotec DSA03202W-ZWUS Mini Remote Control, Leviton VRCS4-MOZ Vizia 4-button Scene Controller, and Leviton VRCS1-1LZ Vizia 1-button Scene Controller.

Example smart devices associated with audio applications include, but are not limited to, Sonos Play:1, Sonos Play:3, Sonos Play:5, Sonos PlayBar, Sonos Sub, Sonos Connect, and Sonos Connect:Amp.

Example smart devices used as power outlets include, but are not limited to, GE Z-wave Fluorescent Light & Appliance Module (#45603), GE Z-Wave Duplex Receptacle (#45605), GE Z-Wave Lighting Control Outdoor Module (#45604), GE Z-Wave Wireless Lighting Control Lamp Module with Dimmer Control (#45602), Leviton VRP15-1LW Vizia RF+Plug-in Appliance Module, Belkin WeMo Switch, Belkin WeMo Insight Switch, INSTEON 2456S3 ApplianceLinc Plug-In Appliance Module, Leviton VRP03-1LW Vizia RF+Z-wave Plug-in Lamp Dimming Module, Leviton VRR15-1LZ Vizia RF+Z-wave Receptacle, INSTEON 2457D2 LampLinc Plug-In Dual-Band Lamp Dimmer, INSTEON 2635-222 Plug-in Appliance On/Off Module, and INSTEON 2634-222 On/Off Dual-Band Outdoor Module.

Example smart devices used as Sensors include, but are not limited to, Belkin WeMo Motion Sensor, INSTEON 2843-222 Wireless Open/Close Sensor, INSTEON 2845-222 Hidden Door Sensor, Aeotec DSB29-ZWUS Z-wave Door/Window Sensor, 2nd Edition, Ecolink Z-wave Door/Window Sensor, Schlage RS100HC V N N SL Z-wave Home Door/Window Sensor, Everspring SM103-1 Z-wave Door/Window Sensor, Aeotec Z-wave Water Sensor, INSTEON 2852-222 Water Leak Sensor, and INSTEON 2842-222 Wireless Motion Sensor.

Example smart devices associated with security applications include, but are not limited to, Kwikset 910 Z-wave SmartCode Electronic Deadbolt, Kwikset 912 Z-wave SmartCode Electronic Deadbolt w/Tustin Lever, Yale Real Living Electronic Push Button Deadbolt with Z-wave YRD210-ZW-619, Yale Real Living Electronic Push Button Lever Door Lock with Z-wave YRL-210-ZW-0BP, Yale Real Living Electronic Touch Screen Deadbolt with Z-wave YRD220-ZW-619, Yale Real Living Touch Screen Lever Door Lock with Z-wave YRL-220-ZW-619, Schlage BE369 Home Keypad Deadbolt with Z-wave, Schlage BE469 Camelot Touchscreen Deadbolt with Z-wave Schlage FE599 Home Keypad Lever with Z-wave, Nest Protect Smoke Plus Carbon Monoxide, Battery S2001BW, and Danalock Bluetooth Z-Wave Smart Lock, compatible with iOS and Android 4.4, Wink and other Z-wave Devices.

Example smart devices used as shades include, but are not limited to,

Somfy Z-wave to Digital Motor Interface (ZDMI).

A. Schlage Lock Support Notes

Below is a list of Schlage lock models supported by Revolv.

1) BE469 Model: touch screen model

2) BE369 Model: keypad model with non-motorized deadbolt

3) FE599 Model: keypad model with lever

1. How to Add Schlage Lock to Revolv:

1) From Revolv App, go to Add Devices

2) For model BE469 (touch screen), on the lock, press 'Schlage' button, then punch in 6-digit program code (which can be found on the back of the user guide), then press '0'.

For model BE369 and FE599 (keypad), on the lock, punch in 6-digit program code (which can be found on the back of the user guide) and wait for three beeps, then press 'Schlage' button. When the keypad is illuminated, press '0'.

3) Note that Revolv may ask the user to repeat step 2 above twice in order to successfully include the lock to the Revolv system. (The first time is used to determined whether we need to remove the lock from previously joined network or not).

4) Schlage requires that there is a 20-second wait after adding the lock before user can control it over the radio (using Z-Wave protocol) via Revolv App. This is to give priority to manual control first.

2. Known Issues

Since the Schlage BE369 is not motorized, the Revolv App will not lock or unlock the deadbolt for you. You may manually turn the knob to lock or unlock the door. We advise against creating a GeoSense Action to unlock the BE369 because the App can't report the state of this lock.

When the Schlage BE369 is manually unlocked with a key, the lock/unlock status is not correctly represented in the Revolv App. A lock command will not lock the door and the state will display as "locked." This is a well-documented problem found with the BE369 on all Z-wave controllers.

Schlage deadbolt entry sets can only be locked or unlocked by the Revolv App when the key is in the locked position.

If a Schlage lock is set to manual key unlock override, then it's status is not reported to Revolv via Z-wave. This is a well-documented problem found with these locks on all Z-wave controllers.

Lock codes cannot be retrieved from any Schlage lock as Schlage does not allow this. The workaround is to create all of your codes from the Revolv App so that we can keep a record of them for you.

Locking or Unlocking the Schlage BE369 and FE599 cannot be used as a trigger for Actions. This only works with the Schlage BE469 model.

B. Philips Hue

Philips has built a line of color LED lighting solutions under its Hue line, which are controlled by a hub that you plug in to your router. They offer a variety of bulbs, ambient lighting, and lightstrip products.

1. Supported

Revolv supports the full line of Philips hue products. Currently you may own a Hue hub connected to your home network to control them using Revolv.

2. Discovery

If you have set up your Hue Hub properly on your home network, Revolv will discover it automatically, and it will show up on the app Dashboard as "Hue Hub". You may also manually search for it by entering "Add Device" mode. Tap the SIMPLE tab in the Add Device view and then press the button on the Hue Hub. This allows Revolv to authenticate with it. Once you press the button, you should see All Hues and each individual bulb added to your Dashboard.

You can also add new bulbs to your Hue Hub using Revolv. Simply go into Add Device mode in the App, plug in the new bulbs somewhere near the hub, and watch as they pop up as new devices. Note that you CANNOT take bulbs that are associated with one Hue Hub, and move them to another Hue Hub with this method. Revolv may try to support this in the future, however for now you can use Hue's special Lampstealer app.

3. Operation

Revolv allows you to control each Hue light individually, as well as all of them at once using All Hues. Pick Colors lets you set both the color and the saturation (whiteness) of the light.

4. Troubleshooting

Revolv is not finding my Hue hub

While Revolv should find your hub automatically, sometimes you can help it along by manually going into Add Device mode. From you Inventory, just click "FIND NEW DEVICES".

Check the LEDs on your Hue Hub. All 3 should be solid white. If the far right LED is blinking that indicates that your Hue Hub is offline. Try checking your Ethernet cable, or power cycling.

All my hues are on full white when I got home!

Chances are you had a power outage that caused them all to turn on when the power came back on.

Revolv says it was able to adjust the Hue, but the light didn't change

Occasionally we've seen Hue bulbs lose connection with the Hue Hub, which means we cannot control it. We've seen this more often if the bulbs are installed near WiFi equipment. When this happens, unplugging/replugging in the bulb seems to restore the connection.

I've lost/broken a bulb, but I still see it?

Revolv doesn't get any indication that a bulb is missing or broken, it will still appear to be functioning properly through the Hue Hub. If you have a bulb that is no longer connected, you have 2 options. You can remove it from the Dashboard by un-starring it in the Inventory. Second, you can tap on the bulb in question, tap the edit button next to the name at the top, tap HIDE THIS DEVICE in the popup dialog. The only way to completely remove it from the Hue Hub is to factory reset the Hue Hub, re-link it to Revolv, and re-add all of the working bulbs.

I factory reset my Hue Hub and now it no longer works with Revolv.

Go into your Add Device screen and select "Philips Hue Hub" under "Lights". Rejoin your Hub by pressing the button on the top of the device.

C. Nest Thermostat

Nest is a smart, energy-conscious thermostat that learns to predict your behaviours and preferences over time. Two former Apple brains developed the idea, and subsequently revolutionized the thermostat. The Nest team has now taken on Smoke and Carbon Monoxide Detectors with the Nest Protect as their further contribution to the connected home.

1. Supported

Revolv supports the Nest thermostats, both 1st and 2nd generation. Revolv is capable of multiple Nest Thermostats in the household, as long as they are all on the same Nest Account. Once you authorize Revolv with your Nest credentials, you will have access to all Nest Thermostats in the home. We will release support for the Nest Protect at a later date. Check out our Supported Devices FAQ for the most up-to-date list!

2. Discovery

Revolv will automatically detect any Nest Thermostats that are on the same WiFi network as your Hub. There is no need to go in to Add Devices mode, it should be automatically found within 5-10 minutes of adding it to your home network.

Once your Nest Thermostat is discovered, you can tap on it and enter your Nest account username and password. If it doesn't show up automatically, you can enter your nest credentials manually by following the "Nest password change" instructions below.

If your Revolv is not discovering your Nest, then double-check your username and password to make sure that they are entered correctly (See "Nest password change" instructions below).

3. Operation

Home/Away:

Revolv currently only controls the "Home" setting. When the Nest is in "Away" mode, changing the temperature setting using the Revolv App doesn't have any effect until you switch the Nest back to "Home"—then it has the value that we set. We will support switching between Home and Away in the future.

You can disable the "Auto Away" feature of your Nest by going to Settings in the Nest app, tap on "Nest Sense" and flip the switch to "off." Now you can use the Revolv App to control your Nest thermostat when you're out and about.

4. Troubleshooting

Nest password change/Manual addition of a Nest Account:

If your Nest password (or username) changes, your Revolv App will no longer be able to control your thermostat until you enter the new credentials. You can reenter them in the Revolv App by doing the following:

Go to Settings
Select Accounts
Tap on your Nest Account
Select the Trash icon
Now select the "+" in the upper right corner
Re-add your credentials
You should be all set!

D. Z-Wave

Z-Wave is a wireless networking protocol which has a large array of relatively inexpensive but reliable, fast smart devices, from bulbs and switches to thermostats and sprinkler controls. The protocol is governed by a standard group called Z-Wave alliance. Each smart device goes through certificate process to ensure their interoperability.

The protocol is designed to work in a mesh network like fashion, meaning devices can route messages for each other over multiple hops.

1. Supported

Currently Revolv supports most Z-Wave wall and plug-in switches, thermostats from Trane and Honeywell, locks from Yale, Kwikset and Schlage. We're currently working on expanding the support and are looking for input from customers like yourself regarding which devices to support next.

2. Discovery

Z-Wave devices keep state regarding joined and unjoined. The device needs to be unjoined first in order to join to the network. Revolv hub is acting as a master controller in the network which all devices need to join to.

To join Z-Wave device to Revolv network, you first go into the "Add Device" screen in the app, and then perform some action on the device to initiate joining. For most Z-Wave devices, this means press the (join) button on the device. Pressing the button normally alternates between joining and unjoining. If the device is already joined, it will unjoin and vice versa.

While in "Add Device" screen, Revolv will notify you when the device is successfully joined to the network. You may see the 'We see your device, please interact with it one more time' message asking you to interact with the device again; that means Revolv has just unjoined the device from its previous network and is now ready to join the device to the Revolv network. If the device is already joined to the Revolv network, Revolv intelligently recognizes that and will not unjoin or rejoin the device.

Joining other complex Z-Wave devices like thermostat and door lock is best to following our in-app wizard. From "Add Device" screen, user can select to search for the device to join and follow the step by step instructions.

Note that due to limitation with Z-Wave protocol, adding/joining and removing of devices from the Revolv Hub (or any other controllers) need to be done within a one hop range. For Revolv Hub, the one hob distance is about 65 ft through a few walls (this number will be different for other controllers). Once the device is added to the Hub, it can be moved further away and can be controlled over multiple hops.

3. Operation Notes

Revolv is currently designed to be the primary Z-Wave controller in the Z-Wave network. If user has existing Z-Wave network with other 3rd party controllers like Micasa Verde, user needs to create a new Z-Wave network with Revolv hub being the primary controller.

4. Troubleshooting

My lock stops working

The most common cause for this is low battery. For some locks like Yale, the low battery icon will blink when this happens. For others, the status LED may flash red. It's best to replace all batteries when this happens. Once the battery is replaced, the lock can continue to work. We are working on adding a feature in Revolv to indicate low battery in the future release.

My user code on the lock stops working

For Kwikset lock, if you have user code set up, after you join the lock to Revolv, the code will be erased. This seems to be an extra security measure implemented by Kwikset to erase previous setting at join. This does not happen with Yale locks. Hence, user needs to reprogram the user code after the lock is joined to Revolv.

E. Sonos

Spelled the same forwards, backwards, and upside down, SONOS builds a variety of awesome wireless speakers that let you stream your favorite music and radio stations all over your house.

1. Supported:

Revolv supports the Connect, Connect:Amp, Sub, Play-Bar, Play:3, Play:5, and the Play:1 speakers from Sonos. For now, you still need to use the Sonos app to set the current playlist/stream to listen to before you can control via the Revolv App. You can choose whether to use Sonos with a Bridge or ethernet cable, makes no difference to Revolv, we'll still be able to communicate with your speakers!

2. Discovery:

Lucky for you, Sonos discovery is as easy as doing nothing at all. In most cases, if your Sonos is connected to your home's network and you have already set-up and run your Sonos app, Revolv will automatically detect it for you. If you get impatient, feel free to start the Add Devices screen to double-check finding them.

3. Troubleshooting:

My Sonos isn't being discovered by Revolv

It can take a while for Revolv to discover all of your Sonos devices. This is especially true if you have lots of networked devices such as WeMo switches and Philips Hue. Sometimes temporarily disconnecting the Hue hub or a few WeMos can speed up the discovery of Sonos devices. Also, rebooting your router can help.

Check your "Hidden Devices" list. It's possible that the Revolv App discovered your Sonos speaker but marked it as "Hidden" in the "Hub Settings." This usually happens if your speaker was previously included as part of a group in the Sonos app. You'll want to open the Sonos app and un-group your speakers if you want individual control over them in Revolv.

App doesn't show any current song playing

The very first time that you join your Sonos speakers to Revolv, you'll need to open the Sonos app and select a source or playlist for them to play and tap the "play" button in the Sonos app. After you've done this for the first time, you should be able to control your Sonos speakers from the Revolv App.

App doesn't let me select a Channel. It just says "Any Channel."

You may have to pick and choose your favorite sources and playlists from the Sonos App for a few days while Revolv learns your preferences. After the first day of picking different music selections, Revolv should have enough of them to begin displaying within the Revolv App.

I have some Sonos speakers in a group to play together, but Revolv only shows one speaker When Sonos speakers are grouped together, Revolv automatically hides all but the "Master" speaker that controls the group and changes the icon to a double beamed musical note set. The "hidden" speaker(s) can be seen in "Hub Settings."

Next Track stopped working on Pandora for me

Some Pandora accounts are limited to 5 "Skip Track" operations per hour, at which point you will no longer be able to use the Next Track feature for awhile Internet connection issues after adding Sonos devices (Network Storm)

Sonos requires that one device be connected (bridge or speaker) to your home network via Ethernet. Be advised that ONLY one device should be connected (unless you want to get into advanced setup). If you connect more than one Sonos device to Ethernet, you will likely experience degraded network performance. See: http://bit.ly/1eu7PSu F. Belkin WeMo Belkin builds a number of WiFi based WeMo devices including outlets, switches, and motion sensors.

1. Supported

Revolv supports WeMo wall switches, outlet switches, and in the next update motion sensors.

2. Discovery

Currently you may first connect each WeMo device to your Wifi network using the WeMo app; see this video for details. Once connected, Revolv should be able to automatically detect it. If you don't see it, you can speed the process by going into the Add Device screen.

3. Troubleshooting

My WeMo device just stopped working

Occasionally these appear to lose their connection to your WiFi network. Try unplugging/replugging them in (or in the case of the wall switch, opening and closing the air gap) to reset the device. You might also check the WeMo app to ensure that they are visible there. In rare cases, you may need to factory reset the device and set it up again.

G. Insteon

Insteon has a large array of relatively inexpensive but reliable, fast smart devices, from bulbs and switches to thermostats and sprinkler controls. We're particularly fond of their remotes, which give you bedside remote control of your whole house when you forget your phone downstairs.

These are designed to be integrated into your house as a standalone system, where you can connect controlling devices like switches to controlled devices like light bulbs. Adding them to Revolv, however, is much easier, and opens them up to many more possibilities.

1. Supported

Currently Revolv supports most Insteon bulbs, wall and plug-in switches, motion sensors, remotes, switch/keypads, open/close (contact) sensors, and thermostats, and will eventually add garage door openers, and sprinkler controls. If there is enough interest, we can also add X-10 (powerline) support.

2. Discovery

Insteon devices require that you first go into the "Add Device" screen in the app, and then perform some action on the device to "link" it up. For light bulbs this is plugging it in, while for most other devices it's pressing and holding a Set button for about 5 seconds until you hear a double beep or see a double LED flash on the device.

Insteon devices are connected to each other outside of Revolv through a complex linking operation. If you already have an Insteon system connected in this way, we highly recommend unlinking the system and connecting the devices individually to the Revolv hub. Otherwise the devices will continue to talk to and control each other in addition to the Revolv control, and will also greatly slow the performance of the system down as they try to talk to each other.

You can do this via the Unlink procedures on each link you have, or (far easier) factory reset each device. Factory reset is generally done by turning off/unplugging/opening the air gap on the device, then holding down the Set button while reconnecting it. Wait for a long beeeeeep, and when it stops let go of the set button.

3. Operation Notes

Insteon devices build a "mesh network" between each other, which means if you add more plugged-in devices you can extend the range and reliability of your Insteon system.

4 scene remotes—these have a limitation that if you press the "On" button for a scene, you cannot press it again until you press the "Off" button for that scene 4. Troubleshooting My Hue bulb/wall switch is not working We've found that these devices can be susceptible to shielding inside metal enclosures, for instance a bulb put into canned lighting or a metal wall outlet box. Try moving the hub closer or taking the device out of the enclosure to see if this is the problem. If so, you may try putting another non-shielded Insteon device nearby, or (best) changing the enclosure to plastic.

My Insteon devices are slow to respond

If you had a standalone Insteon setup before, you devices may still be trying to talk to each other. Your best bet is to factory reset the device as mentioned in Discovery above.

My Insteon devices are turning on even though not linked in the Revolv app

If you had a standalone Insteon setup before, you devices may still be trying controlling each other. Your best bet is to factory reset the devices as mentioned in Discovery above.

H. Mesh Networking

Revolv supports protocols like Z-Wave, Insteon, and Zigbee which utilize mesh networking to extend their range. This means that any plugged-in device that communicates via one of these radios acts as a repeater, or extender, of the network. While the radios in Revolv itself can cover at least 60 feet, adding more Insteon or Z-Wave devices will extend the range and robustness of those networks, allowing Revolv to cover a much greater distance.

What is claimed is:

1. A method for adding a smart device in a smart home environment, wherein the smart home environment includes one or more smart devices, comprising:

at a client device having one or more processors and memory storing one or more programs for execution by the one or more processors:

executing a client-side application associated with a user account, wherein the client-side application is associated with an electronic device that is coupled to the client device over a first communication network to manage the electronic device and one or more smart devices coupled to the electronic device, wherein the electronic device is communicatively coupled to each of the one or more smart devices using a corresponding one of a plurality of different communication protocols;

displaying by the client-side application a first user interface for adding a new smart device to the smart home environment, the first user interface including a first affordance that when selected causes the electronic device to initiate one of a plurality of commissioning options for adding a new smart device to the smart home environment, wherein the plurality of commissioning options for adding a new smart device are defined according to at least a level of user interaction involved in a process of adding a smart device;

in accordance with at least the level of user interaction involved in the process of adding a smart device, selecting by the client-side application one of a plurality of device commissioning user interfaces, each device commissioning user interface corresponding to a respective one of the plurality of commissioning options for adding a new smart device; and in response to receiving an indication from the electronic device that the new smart device has been added into the smart home environment via communication between the electronic device and the new smart device using the corresponding one of the plurality of communication protocols, displaying a device-specific control user interface associated with the new smart device.

2. The method of claim 1, further comprising:
after receiving a user selection of the first affordance, displaying the selected one of the plurality of device commissioning user interfaces prompting one or more user interventions, the completion of which is necessary for commissioning of the new smart device in accordance with the selected commissioning options.

3. The method of claim 1, wherein displaying the device-specific control user interface associated with the new smart device further comprises:
obtaining device information, and
displaying the device information on the device-specific control user interface.

4. The method of claim 3, wherein the device information includes at least one of a device name, a location, and descriptive information of the new smart device.

5. The method of claim 1, wherein an inventory of the smart home environment is displayed on the first user interface, and the first user interface further includes a plurality of second visual affordances each associated with a respective smart device that has been installed in the smart home environment, further comprising:
after commissioning of the new smart device, displaying on the first user interface the plurality of second visual affordances refreshed to include a third visual affordance that represents the new smart device.

6. The method of claim 1, further comprising:
sending to the electronic device a user request to search for a new smart device in the smart home environment.

7. The method of claim 1, wherein the plurality of commissioning options includes a first commissioning option associated with simple smart devices, further comprising:
in accordance with the first commissioning option, displaying on the selected one of the plurality of device commissioning user interfaces user interfaces an instruction to the user of the client device to instruct the user to press a button on the new smart device.

8. The method of claim 7, wherein the instruction is displayed to instruct the user to press one of a power button, a set button, and a motion sensor button on the new smart device.

9. The method of claim 1, further comprising:
causing the electronic device to establish communication with the new smart device over one or the one or more second communication networks, wherein the one or more second communication networks are distinct from the first communication network.

10. The method of claim 1, wherein the one or more second communication networks are implemented based on at least one communication protocol of a group consisting of Insteon, IEEE 802.15.4, Wi-Fi, ZigBee, 6LoWPAN, Thread, Z-Wave, Bluetooth Smart, Bluetooth Low Energy, ISA100.11a, WirelessHART, MiWi, OSIAN, Ethernet, and HomePlug.

11. A client device, comprising:
one or more processors; and
memory storing one or more programs for execution by the one or more processors, the one or more programs including instructions for:
executing a client-side application associated with a user account, wherein the client-side application is associated with an electronic device that is coupled to the client device over a first communication network to manage the electronic device and one or more smart devices coupled to the electronic device, wherein the electronic device is communicatively coupled to each of the one or more smart devices using a corresponding one of a plurality of different communication protocols;

displaying by the client-side application a first user interface for adding a new smart device to the smart home environment, the first user interface including a first affordance that when selected causes the electronic device to initiate one of a plurality of commissioning options for adding a new smart device to the smart home environment, wherein the plurality of commissioning options for adding a new smart device are defined according to at least a level of user interaction involved in a process of adding a smart device;

in accordance with at least the level of user interaction involved in the process of adding a smart device, selecting by the client-side application one of a plurality of device commissioning user interfaces, each device commissioning user interface corresponding to a respective one of the plurality of commissioning options for adding a new smart device; and in response to receiving an indication from the electronic device that the new smart device has been added into the smart home environment via communication between the electronic device and the new smart device using the corresponding one of the plurality of communication protocols, displaying a device-specific control user interface associated with the new smart device.

12. The client device of claim 11, wherein the plurality of commissioning options includes a second commissioning option associated with complex smart devices, the one or more programs further comprising instructions for:
after the new smart device is identified, generating a sequence of instructions to guide the user to install the new smart device according to a manufacturer predetermined commissioning procedure.

13. The client device of claim 12, wherein the sequence of instructions is displayed on the on the selected one of the plurality of device commissioning user interfaces user interfaces, and includes:
 a first instruction that instructs the user to select a configuration mode on a keypad of the new smart device; and
 a second instruction that instructs the user to enter one or more codes on the keypad.

14. The client device of claim 13, wherein the new smart device is an electronic lock, and the sequence of instructions are configured to instruct the user to enter a master code on a keypad of the lock.

15. The client device of claim 11, wherein each device commissioning user interface further includes one or more instructions for a user action associated with the level of user interaction, the user action being one of pressing a button on the new smart device, entering a code on the new smart device and entering user account credentials on the device commissioning user interface.

16. A non-transitory computer-readable storage medium storing one or more programs for execution by one or more processors of a client device, the one or more programs comprising instructions for:
 executing a client-side application associated with a user account, wherein the client-side application is associated with an electronic device that is coupled to the client device over a first communication network to manage the electronic device and one or more smart devices coupled to the electronic device, wherein the electronic device is communicatively coupled to each of the one or more smart devices using a corresponding one of a plurality of different communication protocols;
 displaying by the client-side application a first user interface for adding a new smart device to the smart home environment, the first user interface including a first affordance that when selected causes the electronic device to initiate one of a plurality of commissioning options for adding a new smart device to the smart home environment, wherein the plurality of commissioning options for adding a new smart device are defined according to at least a level of user interaction involved in a process of adding a smart device;
 in accordance with at least the level of user interaction involved in the process of adding a smart device, selecting by the client-side application one of a plurality of device commissioning user interfaces, each device commissioning user interface corresponding to a respective one of the plurality of commissioning options for adding a new smart device; and
 in response to receiving an indication from the electronic device that the new smart device has been added into the smart home environment via communication between the electronic device and the new smart device using the corresponding one of the plurality of communication protocols, displaying a device-specific control user interface associated with the new smart device.

17. The non-transitory computer-readable storage medium of claim 16, wherein the plurality of commissioning options includes a third commissioning option associated with premium smart devices, further comprising:
 in accordance with the third commissioning option, generating a request for user inputs of user account credentials associated with the new smart device.

18. The non-transitory computer-readable storage medium of claim 17, wherein the new smart device is associated with a new smart device application that is distinct from the client-side application, and the user account credentials associated with the new smart device are used to access a corresponding user account of the new smart device application.

19. The non-transitory computer-readable storage medium of claim 16, wherein the new smart device has been associated with another user account of the client-side application, or commissioned to communicate with another hub device in another smart home environment.

20. The non-transitory computer-readable storage medium of claim 16, wherein the new smart device is one of a camera, a duplex receptacle, a wall switch, a smart light bulb, a thermostat, a smart power outlet, a motion sensor, an electronic lock, an appliance module, a hue bridge, an audio device and a security device.

\* \* \* \* \*

UNITED STATES PATENT AND TRADEMARK OFFICE
CERTIFICATE OF CORRECTION

PATENT NO. : 10,397,013 B1
APPLICATION NO. : 14/940139
DATED : August 27, 2019
INVENTOR(S) : Hill et al.

Page 1 of 1

It is certified that error appears in the above-identified patent and that said Letters Patent is hereby corrected as shown below:

In the Claims

Claim 7, Column 71, Line 67, please delete "interfaces user interfaces an" and insert --interfaces an--;

Claim 9, Column 72, Line 9, please delete "one or the one" and insert --one of one--;

Claim 13, Column 73, Line 4, please delete "the on the selected" and insert --the selected--;

Claim 13, Column 73, Lines 5-6, please delete "interfaces user interfaces and" and insert --interfaces and--;

Claim 14, Column 73, Line 14, please delete "are configured" and insert --is configured--.

Signed and Sealed this
Fifth Day of November, 2019

Andrei Iancu
*Director of the United States Patent and Trademark Office*